US012682483B2

(12) United States Patent
Norris et al.

(10) Patent No.: US 12,682,483 B2
(45) Date of Patent: Jul. 14, 2026

(54) METHODS AND DEVICES FOR DETECTING AND IDENTIFYING FEATURES IN AN AR/VR SCENE

(71) Applicant: Apple Inc., Cupertino, CA (US)

(72) Inventors: Jeffrey S. Norris, Saratoga, CA (US); Alexandre Da Veiga, San Francisco, CA (US); Bruno M. Sommer, Sunnyvale, CA (US); Ye Cong, Santa Clara, CA (US); Tobias Eble, Sunnyvale, CA (US); Moinul Khan, San Jose, CA (US); Nicolas Bonnier, Campbell, CA (US); Hao Pan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 18/384,352

(22) Filed: Oct. 26, 2023

(65) Prior Publication Data

US 2024/0062413 A1     Feb. 22, 2024

Related U.S. Application Data

(63) Continuation of application No. 16/424,937, filed on May 29, 2019, now Pat. No. 11,830,214.
(Continued)

(51) Int. Cl.
G06V 20/20     (2022.01)
G02B 27/01     (2006.01)
(Continued)

(52) U.S. Cl.
CPC .............. G06T 7/73 (2017.01); G02B 27/017 (2013.01); G06V 10/245 (2022.01);
(Continued)

(58) Field of Classification Search
None
See application file for complete search history.

(56) References Cited

U.S. PATENT DOCUMENTS 8,284,202 B2    10/2012  Hodgins et al.
8,397,181 B2     3/2013  Hartman et al.
(Continued)

FOREIGN PATENT DOCUMENTS

CN          102509104 B      6/2012
CN          107428004 A     12/2017

OTHER PUBLICATIONS

Stückler et al. "Dense real-time mapping of object-class semantics from RGB-D video", J Real-Time Image Proc (2015) 10:599-609 (Year: 2015).*
(Continued)

*Primary Examiner* — Randolph I Chu
(74) *Attorney, Agent, or Firm* — Fernando & Partners, LLP

(57) ABSTRACT

A method includes obtaining first pass-through image data characterized by a first pose. The method includes obtaining respective pixel characterization vectors for pixels in the first pass-through image data. The method includes identifying a feature of an object within the first pass-through image data in accordance with a determination that pixel characterization vectors for the feature satisfy a feature confidence threshold. The method includes displaying the first pass-through image data and an AR display marker that corresponds to the feature. The method includes obtaining second pass-through image data characterized by a second pose. The method includes transforming the AR display marker to a position associated with the second pose in order to track the feature. The method includes displaying the second pass-through image data and maintaining display of (Continued)

the AR display marker that corresponds to the feature of the object based on the transformation.

20 Claims, 32 Drawing Sheets

Related U.S. Application Data

(60) Provisional application No. 62/679,166, filed on Jun. 1, 2018.

(51) Int. Cl.
　　*G06T 7/73* 　　　　(2017.01)
　　*G06V 10/24* 　　　(2022.01)
　　*G06V 10/46* 　　　(2022.01)

(52) U.S. Cl.
　　CPC ............ *G06V 10/462* (2022.01); *G06V 20/20* (2022.01); *G06T 2207/30204* (2013.01)

(56) References Cited

U.S. PATENT DOCUMENTS

| | | | | |
|---|---|---|---|---|
| 10,026,218 | B1 * | 7/2018 | Mertens | ............... H04N 13/332 |
| 11,741,669 | B2 * | 8/2023 | Bell | .......................... G06T 3/40 |
| | | | | 345/423 |
| 11,775,052 | B1 * | 10/2023 | Douglas | ............... G06F 3/0304 |
| | | | | 600/431 |
| 2008/0285854 | A1 | 11/2008 | Kotake et al. | |
| 2011/0044536 | A1 | 2/2011 | Cobb et al. | |
| 2013/0148851 | A1 | 6/2013 | Leung et al. | |
| 2013/0184005 | A1 | 7/2013 | Hieronimi | |
| 2016/0093058 | A1 | 3/2016 | Moteki et al. | |
| 2016/0267661 | A1 | 9/2016 | Moteki et al. | |
| 2017/0011553 | A1 | 1/2017 | Chen et al. | |
| 2017/0109856 | A1 | 4/2017 | Inazumi et al. | |
| 2017/0131721 | A1 * | 5/2017 | Kwak | .................. G05D 1/0044 |
| 2017/0277940 | A1 | 9/2017 | Vandonkelaar | |
| 2017/0316115 | A1 * | 11/2017 | Lewis | ........................ G06T 7/55 |
| 2018/0028079 | A1 | 2/2018 | Gurevich et al. | |
| 2018/0049622 | A1 | 2/2018 | Ryan et al. | |
| 2018/0168740 | A1 | 6/2018 | Ryan et al. | |
| 2018/0173401 | A1 * | 6/2018 | Kim | .................... G06F 3/04815 |
| 2018/0350216 | A1 * | 12/2018 | Satkin | ............. G08B 13/19639 |
| 2019/0043203 | A1 | 2/2019 | Fleishman et al. | |
| 2019/0156086 | A1 | 5/2019 | Plummer et al. | |
| 2019/0295323 | A1 | 9/2019 | Gutierrez et al. | |
| 2019/0385297 | A1 * | 12/2019 | Khosrowpour | ........ G06N 20/00 |
| 2020/0012858 | A1 | 1/2020 | Xiang | |
| 2020/0060007 | A1 * | 2/2020 | Harrison | ................ G06N 20/00 |
| 2020/0138518 | A1 | 5/2020 | Lang | |
| 2020/0197107 | A1 * | 6/2020 | Ryan | ........................ A61B 90/98 |
| 2021/0065461 | A1 * | 3/2021 | Reif | ......................... G06T 15/20 |
| 2021/0225090 | A1 * | 7/2021 | Tang | ......................... G06T 7/50 |
| 2024/0127427 | A1 * | 4/2024 | Wei | ....................... G01C 21/383 |

OTHER PUBLICATIONS

Liu et al. "FloorNet: A Unified Framework for Floorplan Reconstruction from 3D Scans", arXiv:1804.00090v1 [cs.CV] Mar. 31, 2018 (Year: 2018).*

Office Action for corresponding Chinese Application No. 201910434411.4 dated Oct. 10, 2022.

MATLAB "Object Recognition and Tracking for Augmented Reality," https://www.youtube.com/watch?v=Jlh_rE1lcQc, Apr. 9, 2014 (Year: 2014).

MATLAB matchFeatures, extracted using the Wayback machine archived on May 14, 2018. (Year: 2018).

Artemciukas Augmented Reality Tutorial Multiple Target Tracking with Wikitude, https://www.youtube.com/watch?v=vSIJnx39zM, Aug. 4, 2017 (Year: 2017).

Uchiyama et al. (Object Detection and Pose Tracking for Augmented Reality: Recent Approaches, 18th Korea-Japan Joint Workshop on Frontiers of Computer Vision (FCV), Feb. 2012, Kawasaki, Japan. ffhal-00751704 (Year: 2012).

MATLAB extractFeartures, extracted using the Wayback machine archived on May 30, 2018. (Year: 2018).

* cited by examiner

100a

100b

200a

200b

300a

300b

300c

300d

400

Device <u>120</u>

PU(s)
<u>502</u>

Comm.
Interface(s)
<u>508</u>

AR/VR
Display(s)
<u>125</u>

Memory
<u>520</u>

505

I/O Devices
& Sensors
<u>506</u>

Programming
Interface(s)
<u>510</u>

Image
Sensor(s) <u>512</u>

Operating System <u>530</u>

AR Drift Mitigator <u>540</u>

Pixel Labeler <u>550</u>

| Neural Network | 550a |
| Instructions | 550b |
| Heuristics & data | 550c |

Feature Identifier <u>560</u>

| Instructions | 560a |
| Heuristics & data | 560b |

Rendering Subsystem
<u>570</u>

| Instructions | 570a |
| Heuristics & data | 570b |

Composting Subsystem
<u>580</u>

| Instructions | 580a |
| Heuristics & data | 580b |

AR Content <u>590</u>

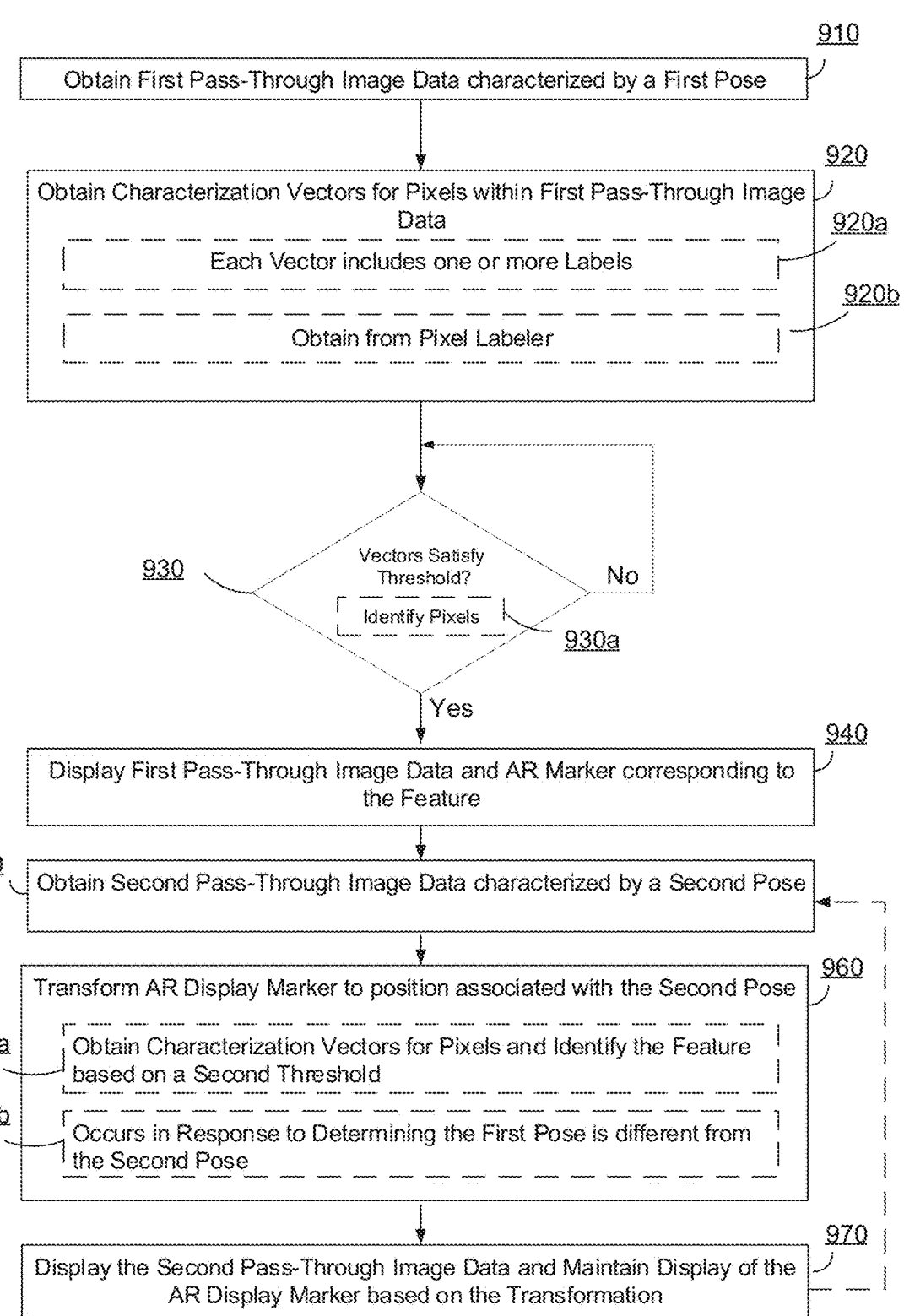

910
Obtain First Pass-Through Image Data characterized by a First Pose

920
Obtain Characterization Vectors for Pixels within First Pass-Through Image Data 920a
Each Vector includes one or more Labels 920b
Obtain from Pixel Labeler 930
Vectors Satisfy Threshold?

930a
Identify Pixels

No

Yes

940
Display First Pass-Through Image Data and AR Marker corresponding to the Feature 950
Obtain Second Pass-Through Image Data characterized by a Second Pose 960
Transform AR Display Marker to position associated with the Second Pose 960a
Obtain Characterization Vectors for Pixels and Identify the Feature based on a Second Threshold 960b
Occurs in Response to Determining the First Pose is different from the Second Pose 970
Display the Second Pass-Through Image Data and Maintain Display of the AR Display Marker based on the Transformation

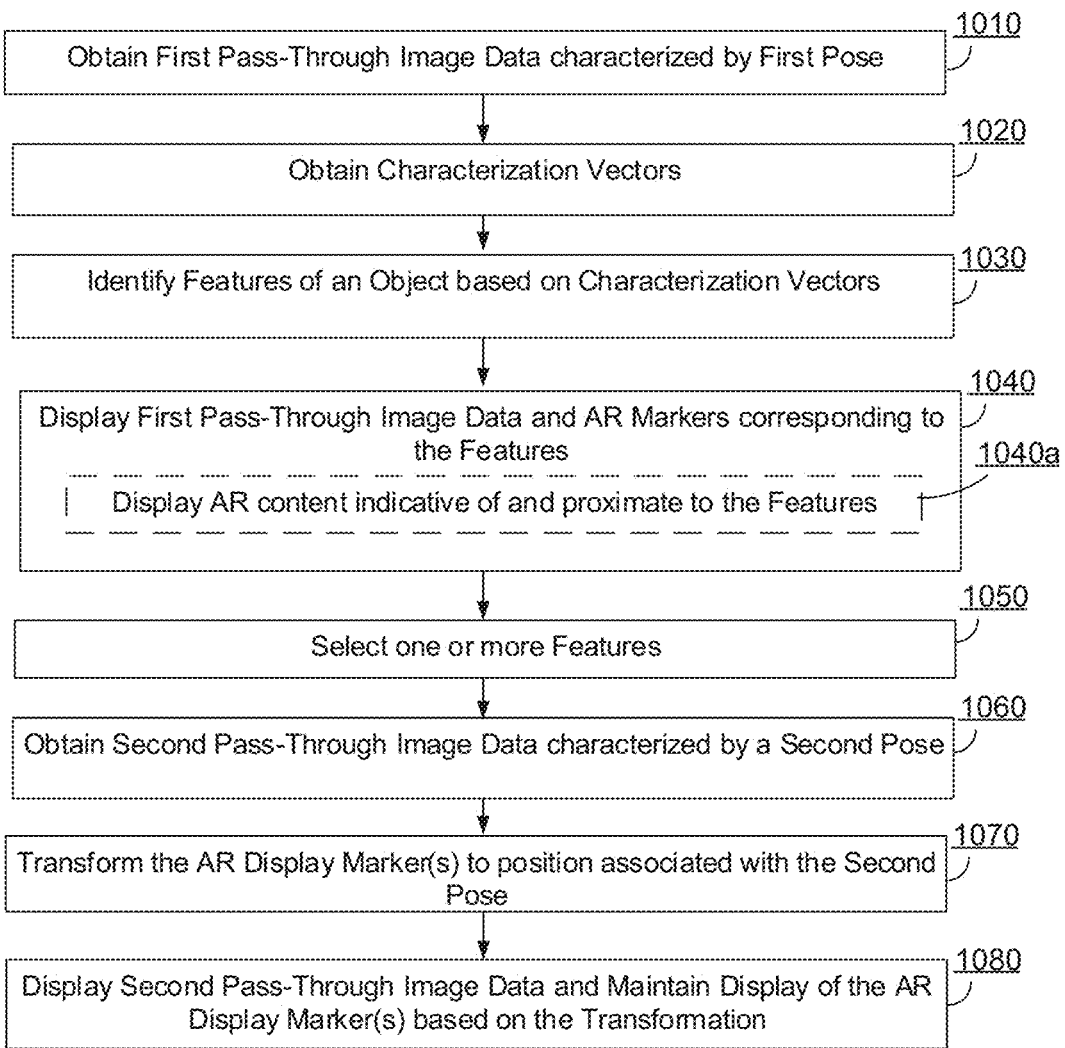

1010
Obtain First Pass-Through Image Data characterized by First Pose

1020
Obtain Characterization Vectors

1030
Identify Features of an Object based on Characterization Vectors

1040
Display First Pass-Through Image Data and AR Markers corresponding to the Features 1040a
Display AR content indicative of and proximate to the Features 1050
Select one or more Features 1060
Obtain Second Pass-Through Image Data characterized by a Second Pose 1070
Transform the AR Display Marker(s) to position associated with the Second Pose 1080
Display Second Pass-Through Image Data and Maintain Display of the AR Display Marker(s) based on the Transformation

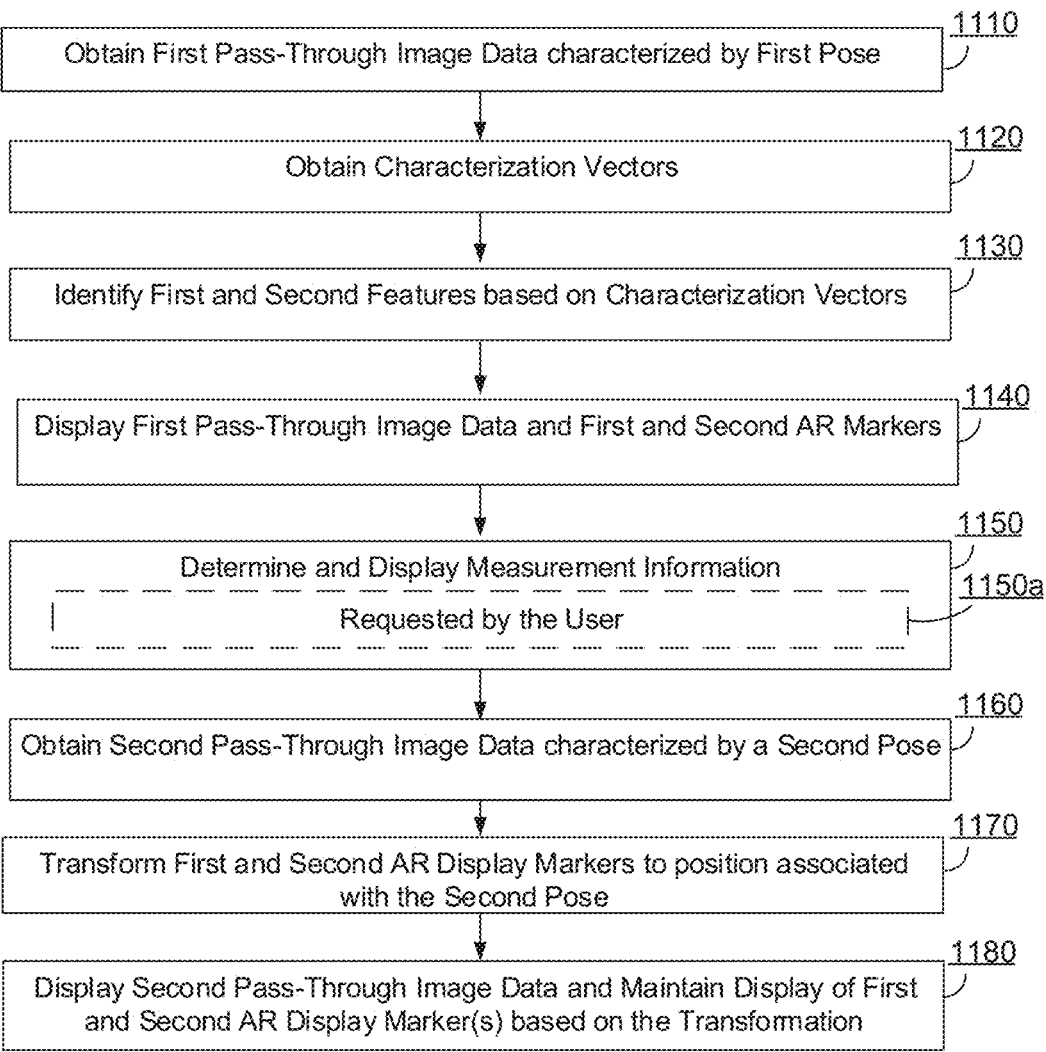

1110
Obtain First Pass-Through Image Data characterized by First Pose

1120
Obtain Characterization Vectors

1130
Identify First and Second Features based on Characterization Vectors

1140
Display First Pass-Through Image Data and First and Second AR Markers

1150
Determine and Display Measurement Information
1150a
Requested by the User

1160
Obtain Second Pass-Through Image Data characterized by a Second Pose

1170
Transform First and Second AR Display Markers to position associated
with the Second Pose 1180
Display Second Pass-Through Image Data and Maintain Display of First
and Second AR Display Marker(s) based on the Transformation

1401    Combined Plane    1410
        1470

1 foot x 5 feet

AR/VR Display 1225    AR Content 1490

1600

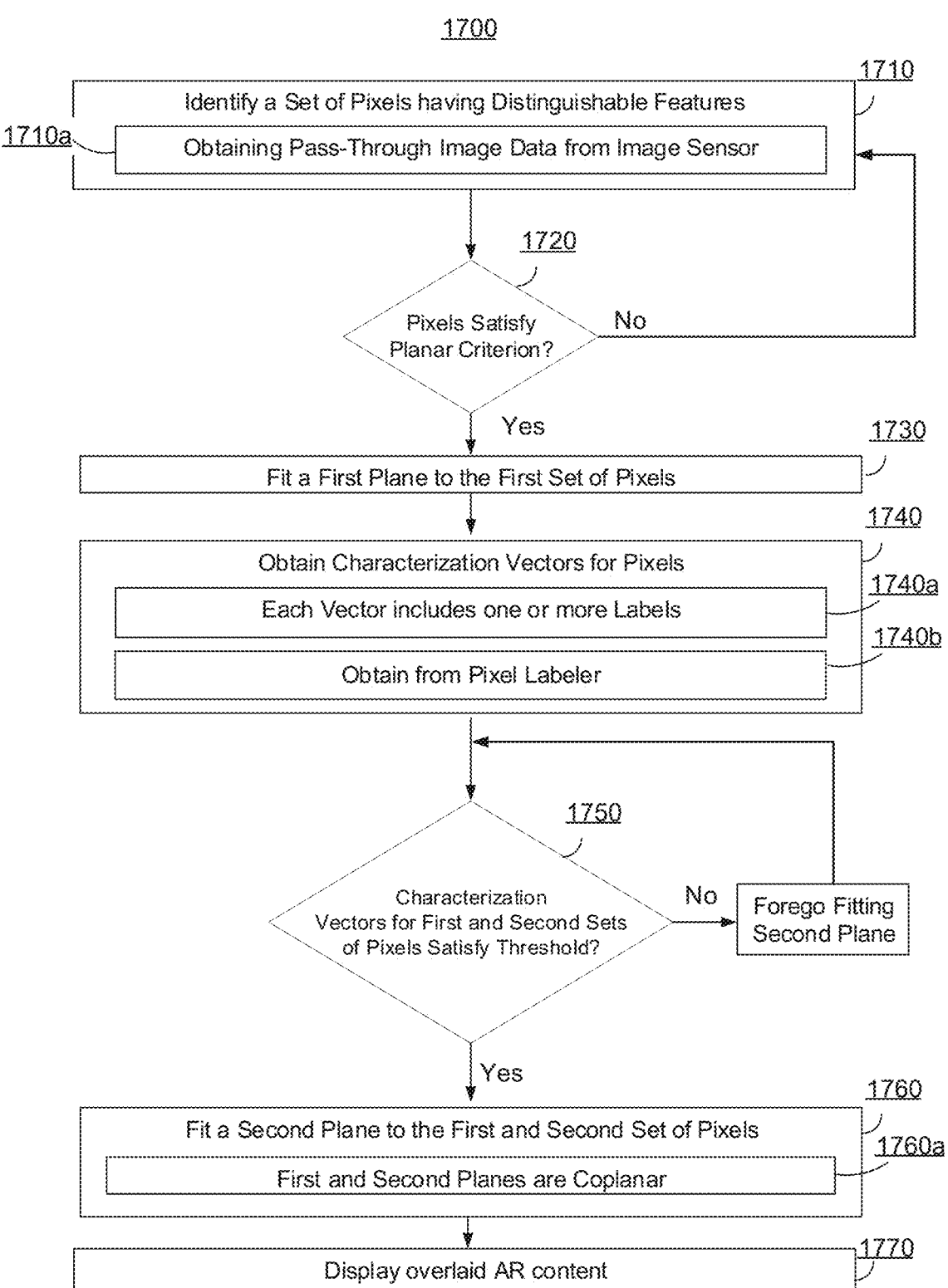

1700

1710 Identify a Set of Pixels having Distinguishable Features

1710a Obtaining Pass-Through Image Data from Image Sensor

1720 Pixels Satisfy Planar Criterion? — No

Yes

1730 Fit a First Plane to the First Set of Pixels

1740 Obtain Characterization Vectors for Pixels

1740a Each Vector includes one or more Labels

1740b Obtain from Pixel Labeler

1750 Characterization Vectors for First and Second Sets of Pixels Satisfy Threshold? — No — Forego Fitting Second Plane Yes 1760 Fit a Second Plane to the First and Second Set of Pixels 1760a First and Second Planes are Coplanar 1770 Display overlaid AR content

Device 2020

2200

2300

2400

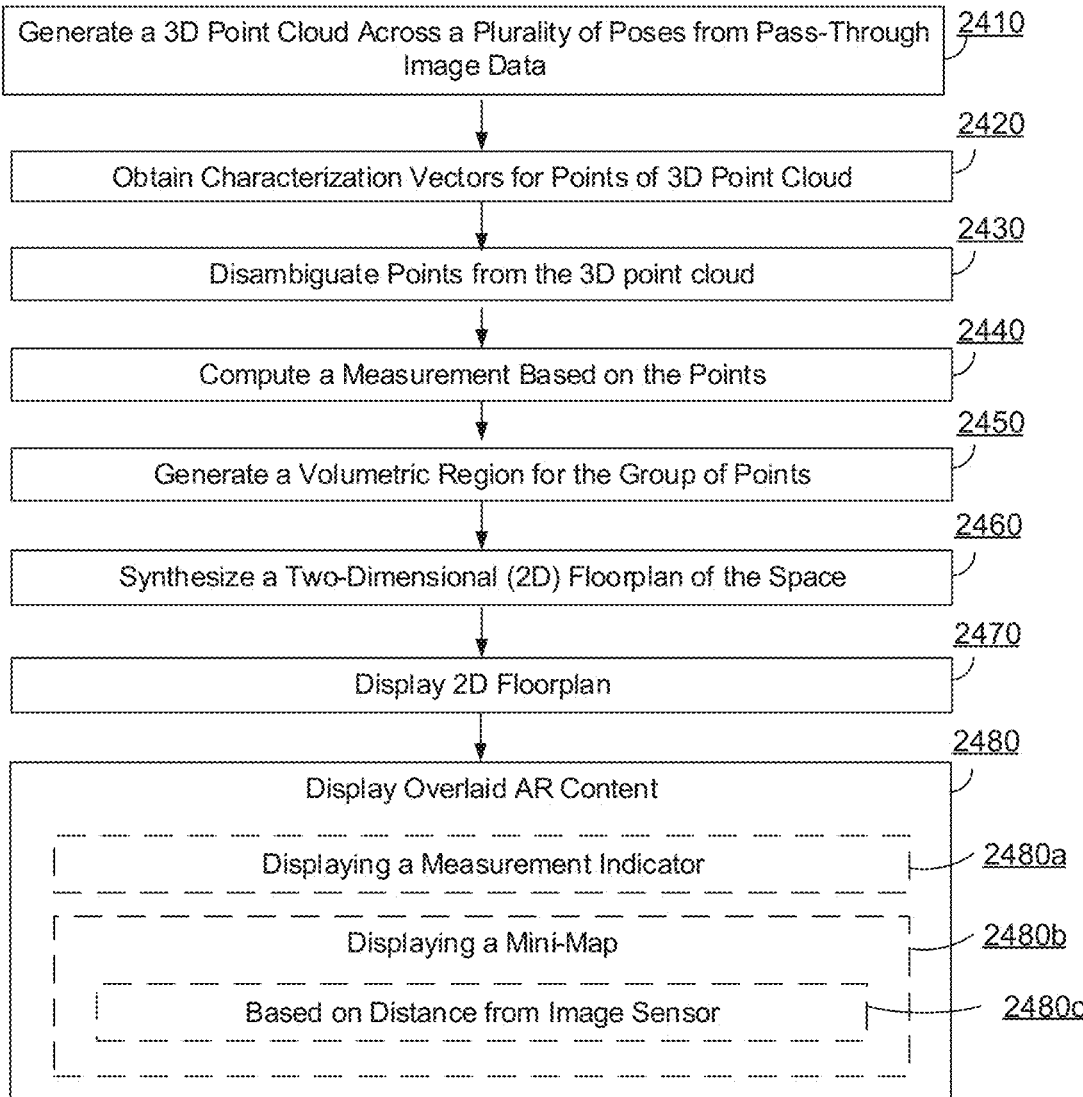

Generate a 3D Point Cloud Across a Plurality of Poses from Pass-Through Image Data   2410

Obtain Characterization Vectors for Points of 3D Point Cloud   2420

Disambiguate Points from the 3D point cloud   2430

Compute a Measurement Based on the Points   2440

Generate a Volumetric Region for the Group of Points   2450

Synthesize a Two-Dimensional (2D) Floorplan of the Space   2460

Display 2D Floorplan   2470

Display Overlaid AR Content   2480

Displaying a Measurement Indicator   2480a

Displaying a Mini-Map   2480b

Based on Distance from Image Sensor   2480c

Figure 24

METHODS AND DEVICES FOR DETECTING AND IDENTIFYING FEATURES IN AN AR/VR SCENE

CROSS-REFERENCE TO RELATED APPLICATIONS

This application is a continuation of U.S. patent application Ser. No. 16/424,937, filed on May 29, 2019, which claims priority to U.S. Provisional Patent App. No. 62/679, 166 filed on Jun. 1, 2018, which are hereby incorporated by reference in their entirety.

TECHNICAL FIELD

The present disclosure relates to augmented reality scene understanding, and, in particular, to detecting and tracking real-world features for an augmented reality scene.

BACKGROUND

Detecting and identifying features in an augmented reality/virtual reality (AR/VR) scene is technologically challenging, and challenging from a user experience perspective. For example, using depth information about the AR/VR scene in order to detect, identify, and track real-world features within pass-through image data for an AR/VR scene is problematic. Not only is relying on depth information resource intensive, it does not yield accurate and reliable AR/VR scene information because previously available processes do not work well with changes in pose information. This reduces the amount of qualitative and quantitative characteristics of the AR/VR scene that are displayed by a device to a user, such as object and feature identification information and corresponding measurement information. Accordingly, user experience and integration with other applications are degraded because AR/VR content cannot be accurately mapped to real-world features during the compositing process used to generate the AR/VR image data that are ultimately displayed to a user.

SUMMARY

In accordance with some implementations, a method is performed at an electronic device with one or more processors, non-transitory memory, and a display. The method includes obtaining, from an image sensor, first pass-through image data characterized by a first pose associated with a field of view of the image sensor. The method further includes obtaining respective pixel characterization vectors for at least a subset of pixels in the first pass-through image data. The method further includes identifying a feature of an object within the first pass-through image data, characterized by the first pose, in accordance with a determination that pixel characterization vectors for the feature of the object satisfy a feature confidence threshold. The method further includes displaying, on the display, the first pass-through image data and an augmented reality (AR) display marker that corresponds to the feature of the object. The method further includes obtaining, from the image sensor, second pass-through image data characterized by a second pose associated with the field of view of the image sensor. The method further includes transforming the AR display marker to a position associated with the second pose in order to track the feature of the object. The method further includes displaying, on the display, the second pass-through image data and maintaining display of the AR display marker that corresponds to the feature of the object based on the transformation.

In accordance with some implementations, a method is performed at an electronic device with one or more processors, a non-transitory memory, and a display. The method includes identifying, in pass-through image data characterized by a pose associated with a field of view of an image sensor, a first set of pixels associated with a distinguishable set of features. The method further includes fitting a first plane to the first set of pixels according to a determination that the first set of pixels satisfy a planar criterion. The method further includes obtaining pixel characterization vectors for pixels in the pass-through image data, wherein each of the pixel characterization vectors includes one or more labels. The method further includes identifying a second set of pixels proximate to the first set of pixels, wherein pixel characterization vectors for the second set of pixels and pixel characterization vectors for the first set of pixels satisfy an object confidence threshold. The method further includes fitting a second plane to the first set of pixels and the second set of pixels, wherein the first plane is coplanar with the second plane.

In accordance with some implementations, a method is performed at an electronic device with one or more processors, a non-transitory memory, and a display. The method includes generating, from pass-through image data characterized by a plurality of poses of a space, a three-dimensional (3D) point cloud for the space, wherein each of the plurality of poses of the space is associated with a respective field of view of an image sensor. The method further includes obtaining characterization vectors for points of the 3D point cloud, wherein each of the characterization vectors includes one or more labels. The method further includes disambiguating a group of points from the 3D point cloud, wherein characterization vectors for the group of points satisfy an object confidence threshold. The method further includes generating a volumetric region for the group of points, wherein the volumetric region corresponds to a 3D representation of an object in the space. The method further includes synthesizing a two-dimensional (2D) floorplan of the space corresponding to a virtualized top-down pose of the image sensor associated with the volumetric region.

In accordance with some implementations, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device with a display and one or more input devices, cause the device to perform or cause performance of the operations of any of the methods described herein. In accordance with some implementations, an electronic device includes: a display, one or more input devices; and means for performing or causing performance of the operations of any of the methods described herein. In accordance with some implementations, an information processing apparatus, for use in an electronic device with a display and one or more input devices, includes means for performing or causing performance of the operations of any of the methods described herein.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 5 is an example block diagram of a device according to some implementations.

FIG. 9 is a flow diagram of a method of mitigating AR drift according to some implementations.

FIG. 10 is a flow diagram of a method of selecting an AR feature according to some implementations.

FIG. 11 is a flow diagram of a method of displaying AR measurement information according to some implementations.

FIG. 17 is flow diagram of a method of inferring a plane according to some implementations.

FIGS. 20A-201 are examples of pertinent steps in a method of generating a two-dimensional (2D) floorplan from multiple perspectives associated with a scene according to some implementations.

FIG. 24 is flow diagram of a method of displaying AR content associated with a 2D floorplan according to some implementations.

SUMMARY

Figure 1A:
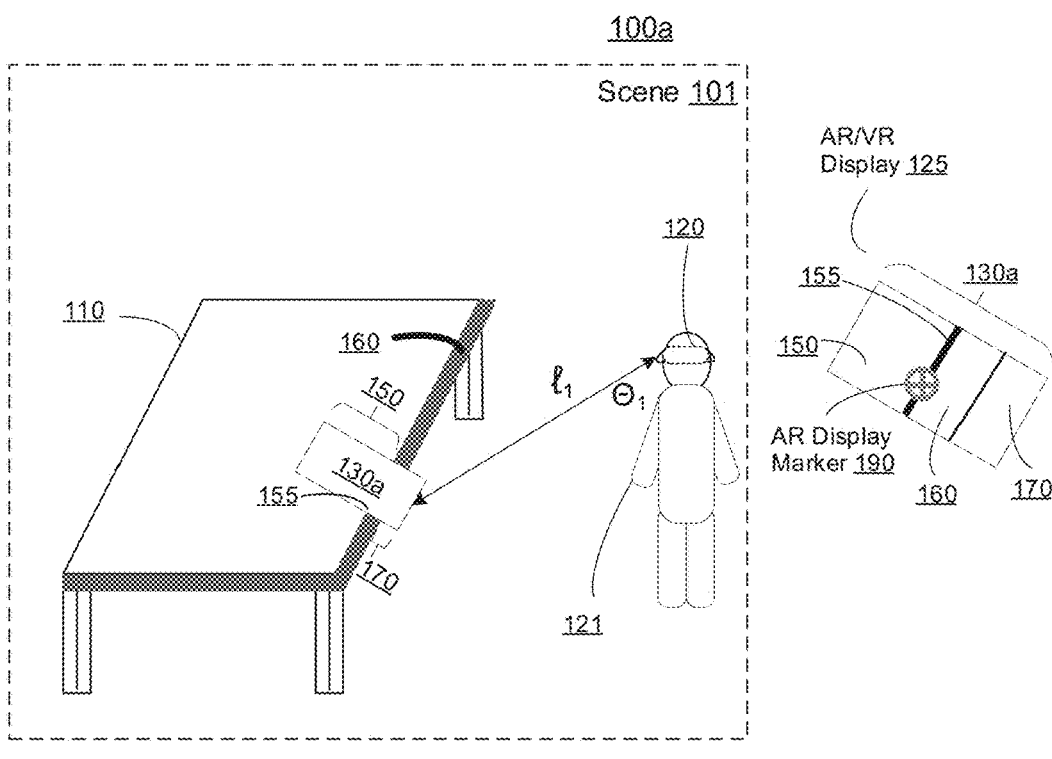
FIG. 1A is an example of feature identification from a first pose according to some implementations.

In implementations described below, a device tracks an AR display marker corresponding to a feature (e.g., a point on an edge of a table) of an object within an AR/VR scene from changing pass-through image data associated with the AR/VR scene. In implementations described below, the feature is identified and tracked by utilizing pixel characterization vectors. Accordingly, the implementations described below mitigate drift of the AR display marker resulting from pose changes. Having an AR display marker secured to the feature enables more accurate and reliable measurements of aspects of the AR/VR scene. Moreover, the user experience is enhanced, whereas resource utilization, battery usage, and wear-of-tear is reduced, because the device pose does not need to be repeatedly adjusted in order to reestablish a drifting AR display marker.

In implementations describe below, a device infers a plane (e.g., a feature-limited plane, such as a smooth monochromatic wall) by identifying a set of pixels proximate to another set of pixels associated with a distinguishable set of features. In implementations described below, the set of pixels is identified by utilizing pixel characterization vectors. Accordingly, the implementations described below infer a feature-limited plane that current systems struggle to or cannot do. In implementations described below, the device determines and provides measurement information (e.g., area of the plane) to the user in response to inferring the plane. Based on the measurement information, the user can make decisions with respect to the plane, such as whether a painting fits on a wall or whether a table would comfortably fit in a living room. Thus, the user experience is enhanced. Moreover, resource utilization, battery usage, and wear-of-tear of the device is reduced because the device need not repeatedly scan the surface or manually enter the characteristics of pixels so the device can identify a plane.

In implementations described below, a device generates a two-dimensional (2D) floorplan from multiple perspectives of physical space. In implementations described below, the device generates a three-dimensional (3D) point cloud for the space, and from the 3D point cloud synthesizes a two-dimensional (2D) (e.g., top-down) floorplan. Providing the 2D floorplan enhances the user experience and integration with other applications because the 2D floorplan provides more accurate measurement information characterizing the space (e.g., blueprint). For example, the measurement information includes information about objects (e.g., length and width of a table) within the space and about the space itself (e.g., area of a room). An application running on the device may use this information to, for example, determine whether a couch would fit within a living room, and even whether the couch would fit within two other pieces of furniture in the living room. Moreover, resource utilization, battery usage, and wear-of-tear of the device is reduced because resource-intensive depth sensors are not needed to gather 3D information in order to generate the 2D floorplan.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1A is an example of feature identification from a first pose 100$a$ according to some implementations. The scene 101 includes a user 121 associated with a device 120 (e.g., electronic device). While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 120 corresponds to a head-mountable device (HMD), a tablet, a smartphone, a laptop, a wearable computing device, a drone, etc. In some implementations, the device 120 is configured to display AR/VR content to the user 121. In various implementations, AR/VR content includes a combination of one or more of image-data (visual data), audio-data (audio content, spatial audio, etc.), haptic-feedback (touch-content) in addition to various other types of content that may be presented to a user using the device 120. In some implementations, the device 120 includes a suitable combination of software, firmware, and/or hardware. The device 120 is described in greater detail below with reference to FIG. 5.

According to some implementations, the device 120 presents AR/VR content to the user 121 while the user 121 is virtually and/or physically present within the scene 101. In some implementations, the device 120 is configured to present AR content and to enable video and/or image pass-through of the scene 101 (e.g., the device 120 corresponds to an AR-enabled mobile phone or tablet). In some implementations, the device 120 is configured to present AR content and to enable optical see-through of the scene 101 (e.g., the device 120 corresponds to an AR-enabled glasses). In some implementations, while presenting a virtual reality (VR) content, the device 120 is configured to present VR content and to optionally enable video pass-through of the scene 101 (e.g., the device 120 corresponds to a VR-enabled HMD).

In some implementations, the user 121 wears the device 120 on his/her head. The device 120 includes one or more AR/VR displays 125 on which to display AR/VR content. In some implementations, the device 120 encloses the field-of-view of the user 121. In some implementations, the device 120 is replaced with an AR/VR chamber, enclosure, or room configured to display AR/VR content in which the user 121 does not wear the device 120. In some implementations, the user 121 holds the device 120 in his/her hand(s).

According to various implementations, a device presents AR/VR content to the user while a user avatar is not virtually and/or physically present within a scene. In various implementations, one or more image sensors are included within a first device that is separate from a second device that includes an AR/VR display 125. In other words, the one or more image sensors are not collocated with the AR/VR display 125. For example, in some implementations, the one or more image sensors and the AR/VR display 125 are located within different scenes.

Figure 8:
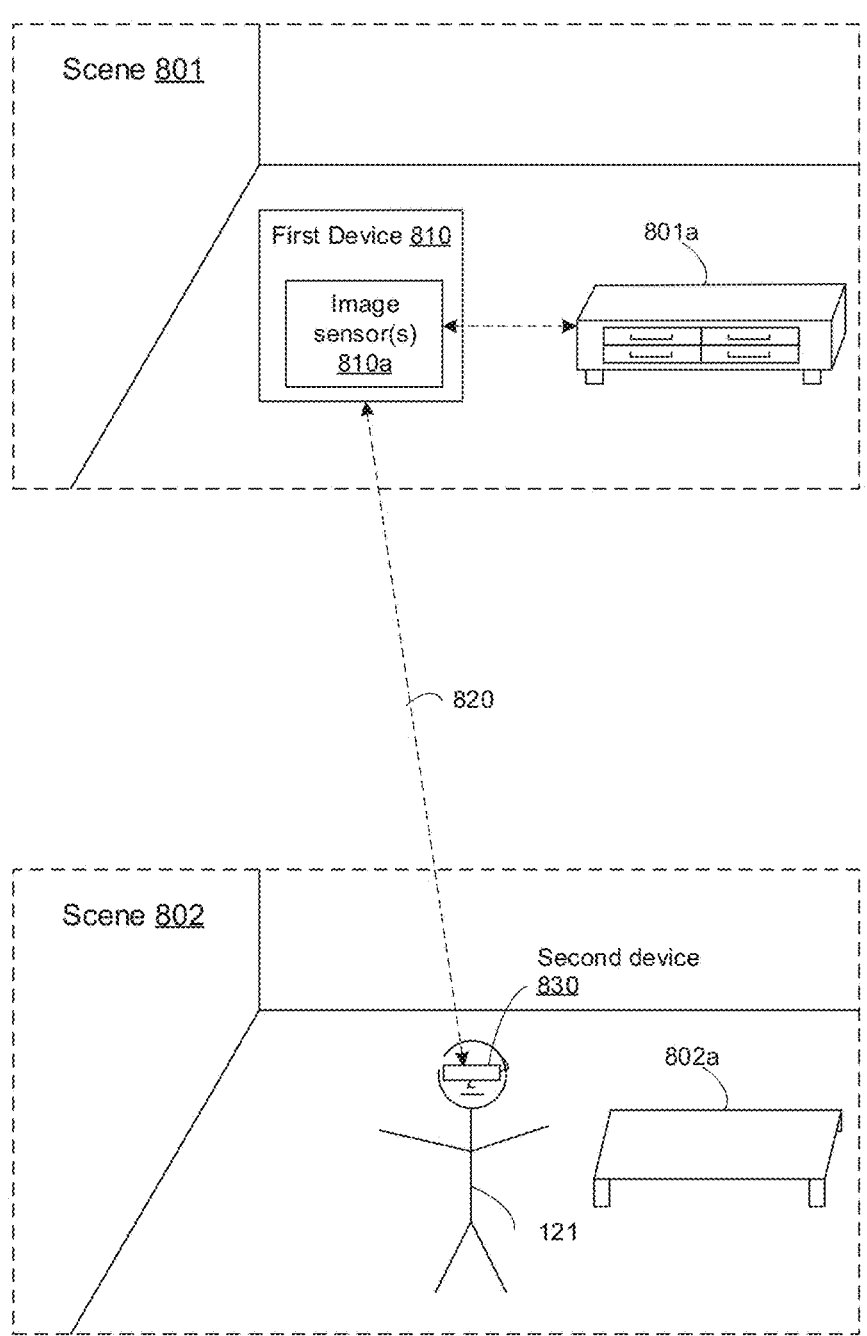
FIG. 8 is an example of a distributed system including an image sensor and AR/VR display device according to some implementations.

FIG. 8 is an example of a distributed system 800 including an image sensor and AR/VR display device according to some implementations. As is illustrated in FIG. 8, a first device 810 that includes one or more image sensors 810$a$ is included within a first scene 801. A second device 830 that includes an AR/VR display (not shown) is included within a second scene 802 that is different from the first scene 801. The one or more image sensors 810$a$ detect information about the scene 801, such as the credenza 801$a$ at which the one or more image sensors 810$a$ are pointed. The first device 810 wirelessly 820 provides corresponding pass through image data to a second device 830. The second device 803 displays the pass through image data on the AR/VR display to be viewed by the user 121. In some implementations, the user 121 wears goggles in order to view the displayed AR/VR visual content. Accordingly, the device 120 displays to the user 121 image data obtained by the remote one or more image sensors 801$a$. One of ordinary skill in the art will appreciate that the first scene 801 and the second scene 801 may correspond to any type of scene, including an outdoor scene. In some implementations, the one or more image sensors 810$a$ are included within an unmanned aerial vehicle (UAV), sometimes referred to as a drone. In some implementations, the one or more image sensors 801$a$ reside on a robot.

Referring back to FIG. 1A, the first pose 100$a$ is defined by a first length $l_1$ and a first angle $\Theta_1$ that characterize the spatial relationship between the device 120 and a first a 130$a$ of the scene 101. The first length $l_1$ corresponds to a distance between the device 120 and a table 110 at which the image sensor is pointed. The first angle $\Theta_1$ corresponds to an approximate line of sight angle between the device 120 and the table 110 relative to a reference plane.

In various implementations, the device 120 includes an image sensor from which to obtain pass-through image data associated with the scene 101. With reference to FIG. 1A, the device 120 obtains, from the image sensor, first pass-through image data characterized by the first pose 100a associated with a field of view of the image sensor. According to the first pose 100a of the device 120, the device 120 obtains first-pass image data corresponding to the first field of view 130a of the scene 101. The first field of view 130a includes four portions: surface 150 of the table 110; edge 155 of the table 110; side 160 of the table 110; and the ground 170 adjacent to/beneath the table 110.

In order to identify a feature (e.g., the edge 155) of an object (e.g., table 110), the device 120 obtains pixel characterization vectors for at least a subset of pixels in the first pass-through image data. Pixel characterization vectors provide an object and/or feature classification for pixels in pass-through image data. In some implementations, the pixel characterization vectors are obtained from a pixel labeler (e.g., a machine learning system), such as a neural-network (e.g., deep-learning neural network). In some implementations, the pixel characterization vectors include one or more labels, such as one or more primary labels corresponding to objects and one or more sub-labels corresponding to features. In some implementations, identifying the feature of the object within the first pass-through image data includes identifying one or more pixels associated with the feature.

Figure 4:
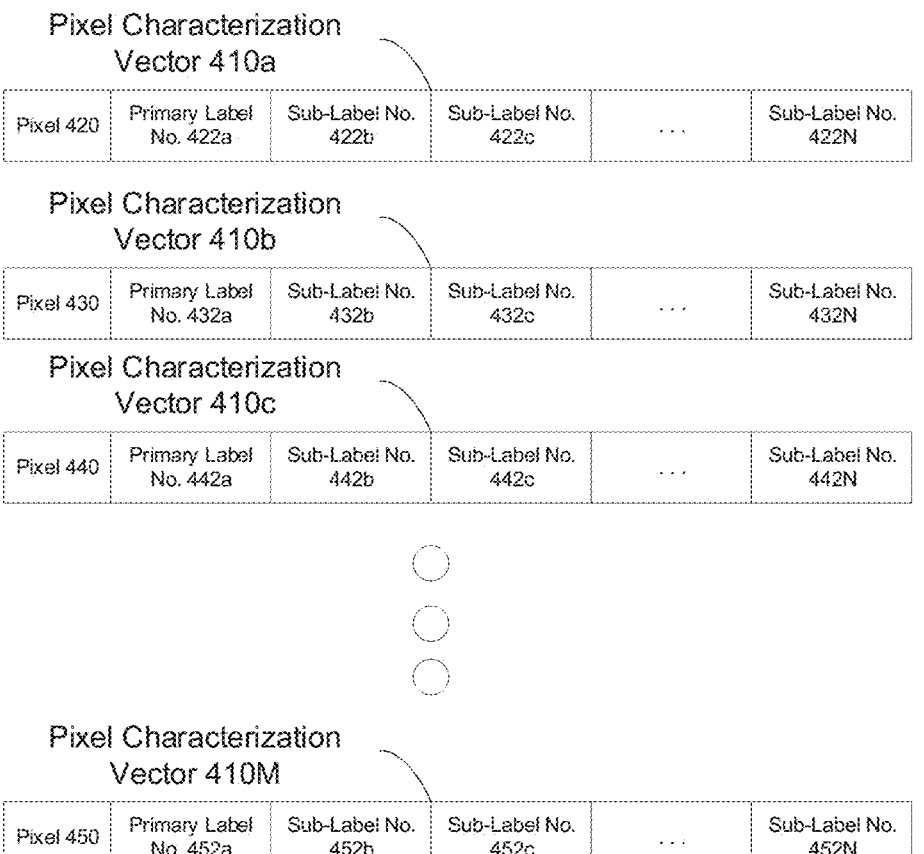
FIG. 4 is a representation of pixel characterization vectors according to some implementations.

With continued reference to FIG. 1A, the device 120 obtains pixel characterization vectors for pixels in the first pass-through image data characterized by the first pose 100a. In some implementations, the pixel characterization vectors include a primary label corresponding to a table (e.g., the table 110) and a first sub-label corresponding to an edge (e.g., the edge 155). In various implementations, each characterization vector includes a plurality of sub-labels in order to provide a multi-dimensional characterization of a particular pixel. With reference to FIG. 4, below, the pixel characterization vector 410a, for instance, includes primary label number 422a and sub-labels numbers 422a-422N. In accordance with a determination that the pixel characterization vectors for the edge 155 of the table 110 satisfy a feature confidence threshold, the device 120 identifies the edge 155 of the object. In some implementations, the feature confidence threshold is satisfied when the device 120 obtains a sufficient number of pixel characterization vectors in a sufficiently dense area each including a primary label corresponding to the table 110 and a sub-label corresponding to the edge 155.

The device 120 includes an AR/VR display 125. The AR/VR display 125 is shown next to the scene 101 in FIGS. 1A and 1B. In some implementations, the device 120 displays, on the AR/VR display 125, pass-through image data and AR content. As is illustrated in FIG. 1A, the device 120 displays, on the AR/VR display 125, first pass-through image data corresponding to the first field of view 130a and an AR display marker 190 (e.g., a reticle) corresponding to the identified edge 155 feature.

Figure 1B:
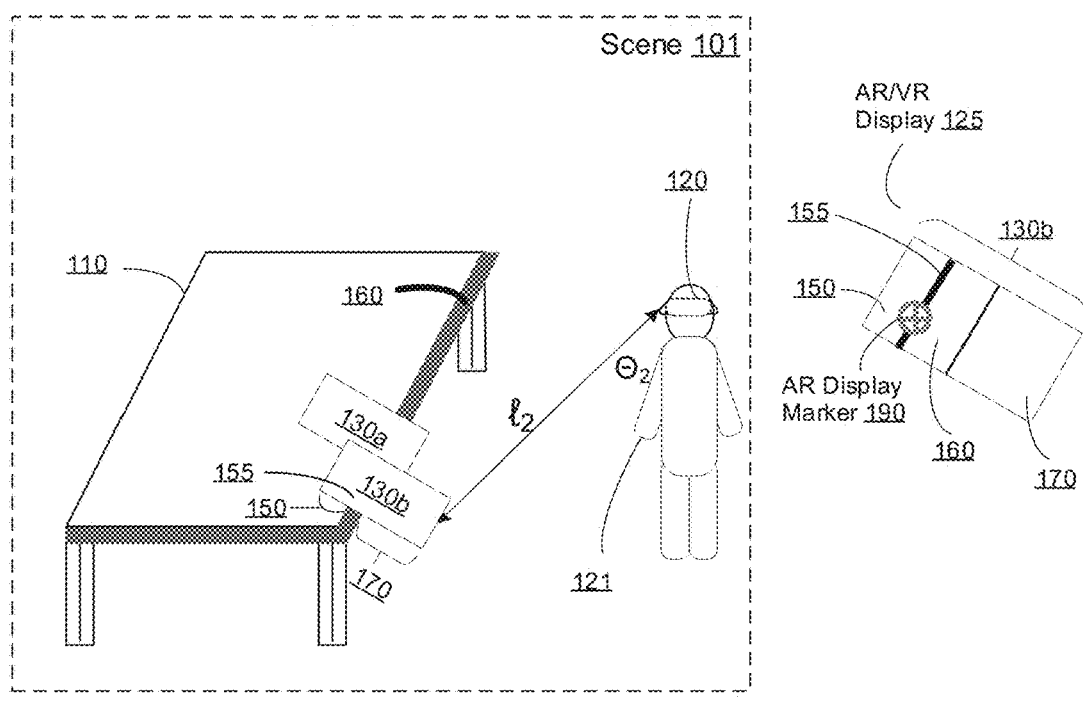
FIG. 1B is an example of feature tracking from a second pose according to some implementations.

FIG. 1B is an example of feature tracking from a second pose 100b according to some implementations. The second pose 100b is defined by a second length $l_2$ and a second angle $\Theta_2$ that characterize the spatial relationship between the device 120 and a second field of view 130b of the scene 101. The second length $l_2$ corresponds to a distance between the device 120 and a table 110 at which the image sensor is pointed. The second angle $\Theta_2$ corresponds to an approximate line of sight angle between the device 120 and the table 110 relative to the reference plane. In some implementations, the second length $l_2$ is the same as the first length $l_1$. In some implementations, the second length $l_2$ is different from the first length $l_1$. In some implementations, the second angle $\Theta_2$ is the same as the first angle $\Theta_1$. In some implementations, the second angle $\Theta_2$ is different from the first angle $\Theta_1$.

The device 120 obtains, from the image sensor, second pass-through image data characterized by the second pose 100b associated with the field of view of the image sensor. According to the second pose 100b of the device 120, the device 120 obtains second-pass image data corresponding to the second field of view 130b of the scene 101. Although the second field of view 130b overlaps with the first field of view 130a, one of ordinary skill will appreciate that the relative positions of the first field of view 130a and the second field of view 130b may vary.

With continued reference to FIG. 1B, the second field of view 130b includes the same four portions included within the first field of view 130a, albeit in different proportions. Namely, as compared with the first field of view 130a, the second field of view 130b includes a larger proportion of the ground 170 and a smaller proportion of the surface 150 of the table 110. One of ordinary skill in the art will appreciate that other implementations contemplate parts of the scene including different objects, such as one part including a table and ground and another part including the table and a chair.

Accordingly, the change from the first pose 100a to the second pose 100b results in a change between the corresponding first field of view 130a and corresponding second field of view 130b. Because the first field of view 130a differs from the second field of view 130b, the relative position of the feature (e.g., edge 155) changes on the AR/VR display 125. The present disclosure provides a mechanism for transforming the AR display marker 190 in order to track the feature. This, in effect, accounts and compensates for the difference between the first field of view 130a and the second field of view 130b. By tracking the feature, the device 120 maintains display of the AR display marker 190 corresponding to the feature.

In some implementations, transforming the AR display marker 190 includes obtaining additional pixel characterization vectors for at least a subset of pixels in the second pass-through image data. In some implementations, transforming the AR display marker 190 includes identifying the feature of the object within the second pass-through image data, characterized by the second pose 100b, in accordance with a determination that the additional pixel characterization vectors for the feature of the object satisfy a second feature confidence threshold. For example, with reference to FIG. 1B, the device 120 obtains pixel characterization vectors for pixels corresponding to the second field of view 130b. Continuing with this example, the device 100 identifies the edge 155 of the table 110 within the second field of view 130b based on a determination that a sufficient number of the pixel characterization vectors in a sufficiently dense area include labels corresponding to an edge of a table. In some implementations, the AR display marker 190 is transformed in response to determining that the first pose 100a is different from the second pose 100b.

With reference to FIG. 1B, the AR display marker 190 is maintained on the edge 155 within the AR/VR display 125. This despite the movement of the edge 155 within the AR/VR display 125 (e.g., towards an end of the AR/VR display 125). In this way, the device 120 mitigates drift resulting from pose changes. This is valuable because a stationary marker (e.g., origin point or anchor point) enables the device 120 to accurately and reliably measure features within the scene 101, and display those more reliable measurements to the user 121. Examples of types of measurements are described in detail below with reference to FIG. 3.

Figure 2A:
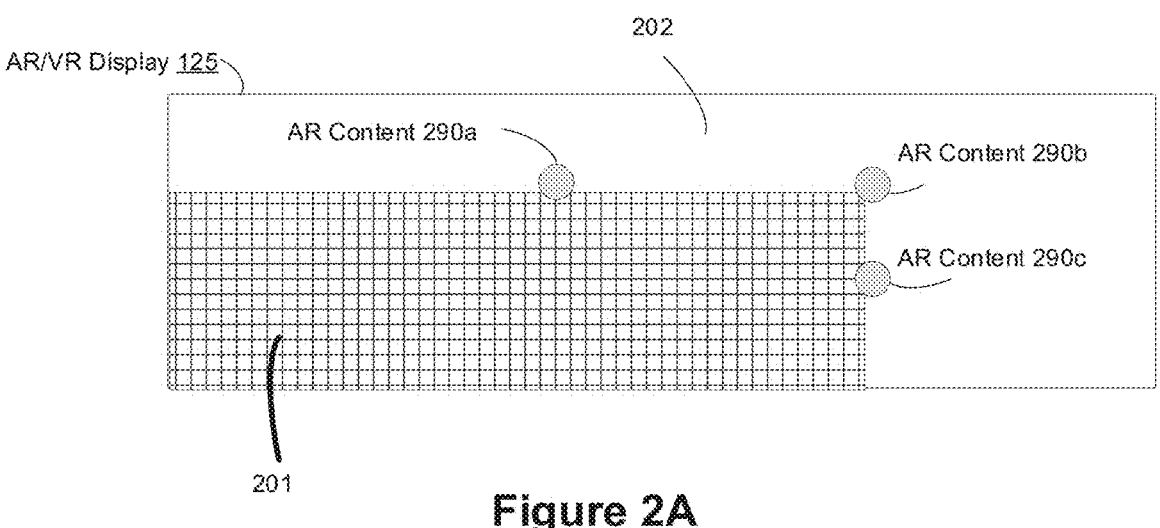
FIG. 2A is an example of an AR/VR display including selectable AR content according to some implementations.

FIG. 2A is an example 200a of an AR/VR display 125 including AR content according to some implementations. In various implementations, the device 120 identifies a plurality of features of an object and selects the feature among the plurality of features. In some implementations, the device 120 selects the feature in response to receiving a selection input from the user 121.

As is illustrated in FIG. 2A, the AR/VR display 125 displays pass-through image data corresponding to a planar object 201 (e.g., wall, table, floor, ceiling, etc.) and an area 202 adjacent to the planar object 201. The AR/VR display 125 further displays AR content overlaid on three identified features of the planar object 201. AR content 290a corresponds to a first edge of the planar object 201. AR content 290b corresponds to a corner of the planar object 201. AR content 290c corresponds to a second edge of the planar object 201. One of ordinary skill in the art will appreciate that the device 120 may identity and display features of one or more of any kind of objects in a scene, such as the top two corners of a chair, corners of a window on the side of a building, the end of a clothesline, etc. In some implementations, as the pass-through image data changes (e.g., the pose changes), the device 120 changes which features are identified and displayed.

In various implementations, the device 120 provides the user 121 with one or more mechanisms for selecting one or more of the AR content 290a, AR content 290b, or AR content 290c. These mechanisms are not shown in FIG. 2A for the sake of brevity and clarity. In some implementations, the device 120 displays, on the AR/VR display 125, a prompt or menu including one or more affordances. For example, the device 120 displays a menu including the following prompt with corresponding affordances: "User: which feature(s), 290a, 290b, and/or 290c, would you like to select?" In some implementations, the device receives an input from the user 121 (e.g., mouse click, touch input, stylus input, etc.) to the AR/VR display corresponding to one or more of AR content 290a, AR content 290b, and/or AR content 290c in order to select the same.

Figure 2B:
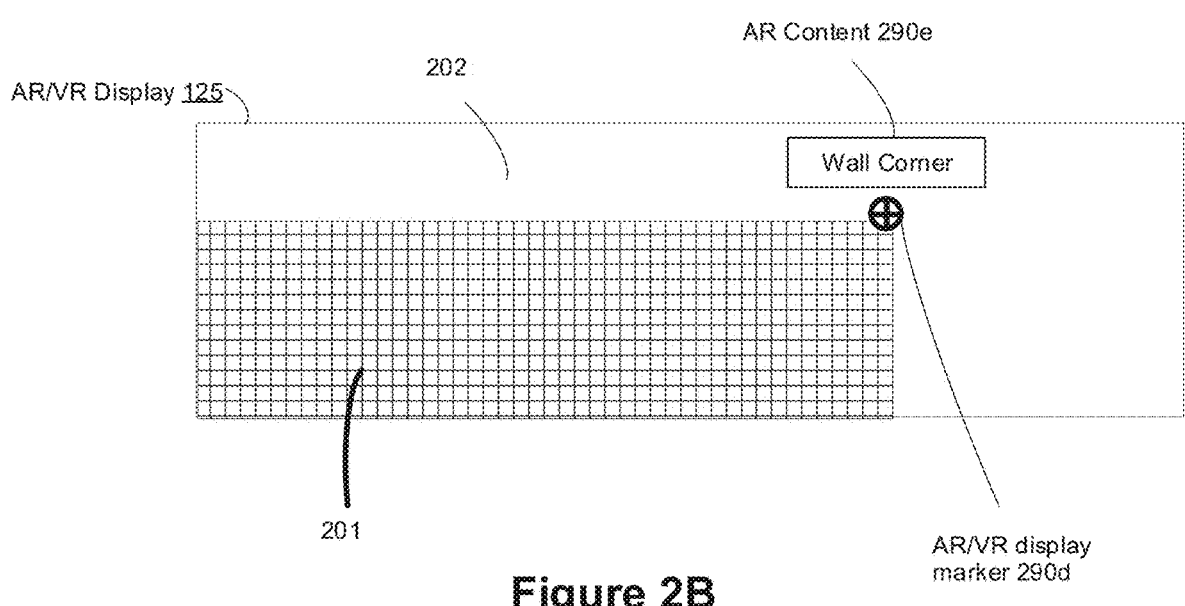
FIG. 2B is an example of an AR/VR display including selected AR content according to some implementations.

FIG. 2B is an example 200b of an AR/VR display 125 including selected AR content according to some implementations. As is illustrated based on the transition between FIG. 2A and FIG. 2B, the AR content 290b corresponding to the corner of the planar object 201 is selected. In some implementations, in response to the AR content 290b being selected, the device 120 removes the AR content 290a and 290c, as is illustrated in FIG. 2B. Moreover, in some implementations, the device 120 replaces the selected AR content 290b with an AR/VR display marker 290d (e.g., a reticle), as is illustrated in FIG. 2B. In some implementations, the selection of AR content is accompanied with an animation sequence. For example, in response to receiving user selection of AR content 290b, the AR/VR display 125 fades out unselected AR content 290a and 290c.

In various implementations, AR content proximate to an AR display marker is displayed. For example, in some implementations, the AR content indicates information about the feature corresponding to the AR display marker. For example, as is illustrated in FIG. 2B, AR content 290e provides information about the feature. Namely AR content 290e indicates that the feature corresponding to the AR display marker 290d is the corner of a wall.

Figures 3A, 3B:
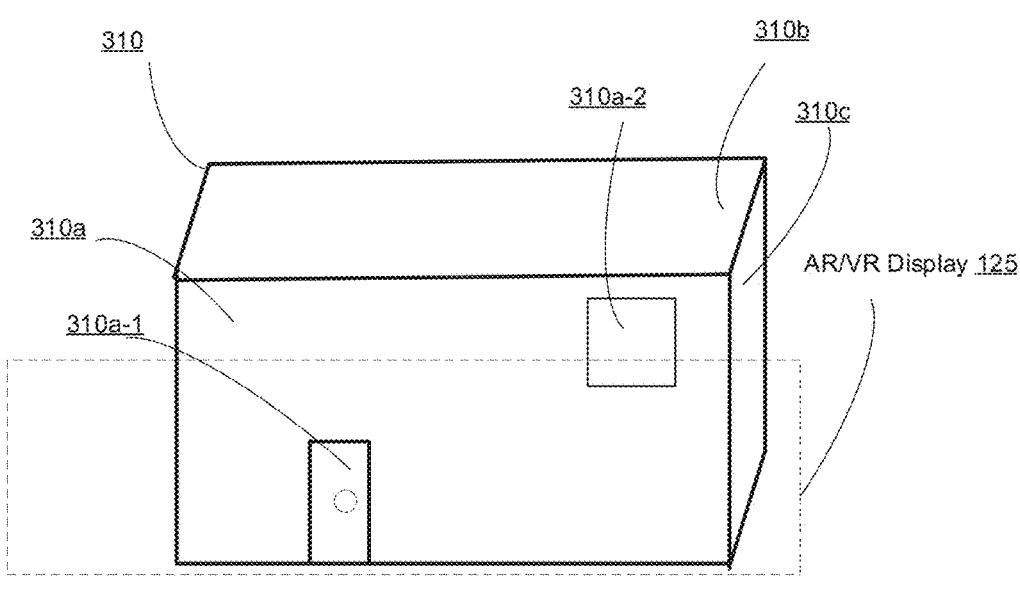
FIGS. 3A-3D are examples of AR/VR content presentation scenarios according to some implementations.

FIG. 3A is an example of an AR/VR content presentation scenario 300a according to some implementations. The presentation scenario 300a includes a building 310 with a front 310a, a roof 310b, and a side 310c. The presentation scenario 300a further includes an AR/VR display 125 of a device 120 capturing a portion of the building 310. Specifically, the AR/VR display 125 displays a portion of the front 310a of the building 310 that is associated with a field of view of an image sensor of the device 120. The displayed portion of the front 310a includes a door 310a-1 and a portion of a window 310a-2. One of ordinary skill in the art will appreciate that the displayed content may correspond to one or more any kinds of objects.

FIG. 3B is an example of an AR/VR content presentation scenario 300b according to some implementations. In addition to displaying the pass-through image data as described with reference to FIG. 3A, above, the AR/VR display 125 displays overlaid AR content (e.g., AR display markers). The displayed AR content 390a-390d corresponds to features within the pass-through image data identified by the device 120. AR content 390a corresponds to an edge of the building 310. AR content 390b corresponds to a hinged-side of a door of the building 310. AR content 390c corresponds to a side of a window of the building 310. AR content 390d corresponds to a bottom of the building 310 (e.g., the ground).

As will be discussed below in example illustrated in FIG. 3C, AR content 390a-390d serves as the end points (e.g., anchor points) for various measurements. In some implementations, the device 120 identifies features corresponding to AR content 390a and AR content 390b such that a straight line between them is parallel (e.g., substantially parallel) to the ground plane in order to facilitate a measurement of distance between the edge of the building 310 and the hinged-side of the door of the building 310. In some implementations, the device 120 identifies features corresponding to AR content 390c and AR content 390d such that a straight line between them is perpendicular (e.g., substantially perpendicular) to the ground plane in order to facilitate a measurement of distance between the side of the window of the building 310 and the bottom of the building 310.

Figure 3C:
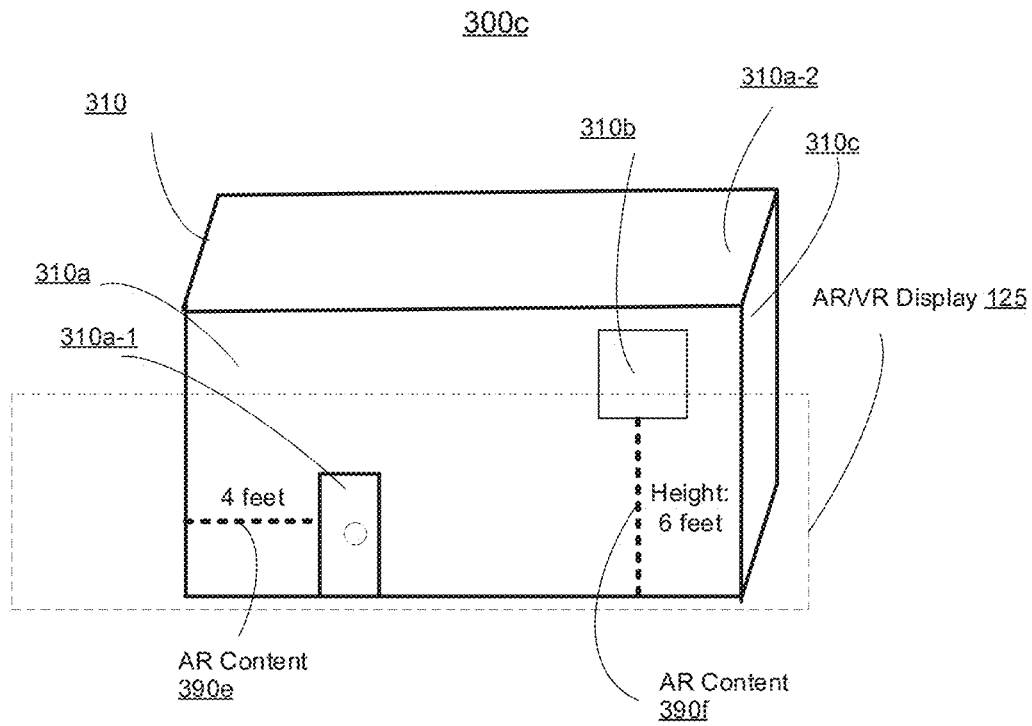

FIG. 3C is an example of an AR/VR content presentation scenario 300c according to some implementations. As is illustrated in FIG. 3C, the device 120 displays distance measurements between the AR content 390a-390d illustrated in FIG. 3B. Namely, the AR/VR display 125 displays AR content 390e corresponding to a distance (e.g., "4 feet") between an edge of the building 310 and the hinged-side of the door of the building 310. Moreover, the AR/VR display 125 displays AR content 390f corresponding to a distance (e.g., "Height: 6 feet") between a side of the window of the building 310 and the bottom of the building 310. In some implementations, the distance measurements are displayed in response to detecting, at one or more input devices of the device 120, an input corresponding to one or more of the AR display markers (e.g., AR content 390a-390d in FIG. 3B). As an example, the device 120 prompts the user 121 with a menu, and receives the user selection to display a distance between AR content 390a and AR content 390b. One of ordinary skill in the art will appreciate that the displayed measurement may correspond to any type of distance between features, including features of the same object.

Moreover, one of ordinary skill in the art will appreciate that a displayed measurement may correspond to more than two features. For example, with reference to FIG. 3C, the displayed measurement (not shown) corresponds to a line between an edge of the building 310 and the farther side (from the perspective of the edge of the building) of the door, with the line accounting for three features: edge of the building 310, near side of the door of the building 310, and far side of the door of the building 310. Continuing with this example, in some implementations, the displayed AR content includes at least two of the three following pieces of measurement information: (1) distance between edge of the building 310 and near side of the door of the building 310; (2) distance between edge of the building 310 and far side of the door of the building 310; and/or (3) distance between sides of the door of the building 310.

In various implementations, the device 120 displays the distance measurements without user intervention. For example, in some implementations, in response to the device 120 identifying two or more features, the device 120 displays, on the AR/VR display 125, measurement information relating to the two or more features. As another example, in some implementations, in response to the device 120 identifying two features that are substantially parallel or perpendicular to a plane of interest, the device 120 displays, on the AR/VR display 125, measurement information relating to the two features.

In various implementations, the device 120 displays the distance measurements in response to a user input, such a touch input, mouse input, etc. For example, in some implementations, in response to a user input corresponding to two features (e.g., touching, on a touch-sensitive surface, two corners of a table), the device 120 displays measurement information relating to the two features. As another example, in some implementations, the device 120 highlights (e.g., illuminates, flashes, enlarges, etc.) particular AR display markers that might be of interest to the user, and waits for a user input corresponding to the features.

Figure 3D:
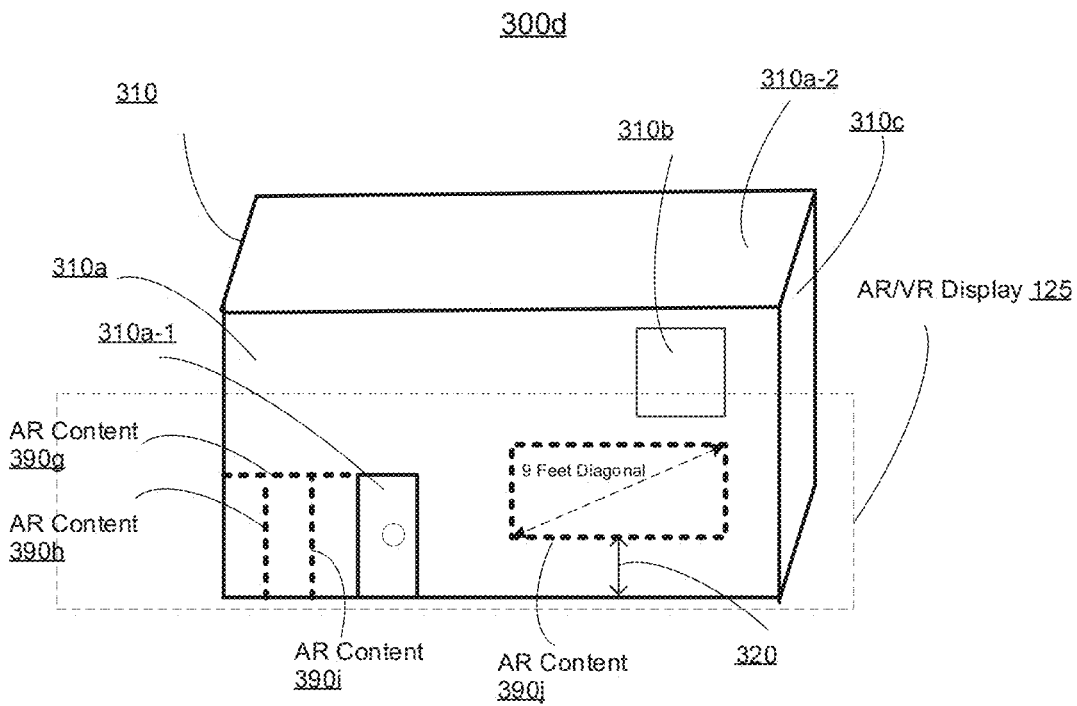

FIG. 3D is an example of an AR/VR content presentation scenario 300d according to some implementations. The presentation scenario 300d includes display of AR content 390g-390j. In some implementations, the device 120 displays, on the AR/VR display 125, AR content corresponding to segments between features of objects. For example, AR content 390g-390i provides an indication of the area between the door and the left side of the building, as well as that area broken into thirds. In some implementations, the AR content 390g-390i is displayed in response to user input. For example, a user wants to paint the area between the door and the left side of the building with three different colors of three equal areas. In some implementations, in response to displaying two features, the device 120 prompts the user to select different measurement options, such as distance between the two features.

The presentation scenario 300d further includes AR content 390j. AR content 390j corresponds to a rectangle having certain dimensions (e.g., "9 Feet Diagonal"). The rectangle is positioned a certain distance 320 from the ground and right-aligned with the window 310b. In some implementations, the AR content 390j is displayed in response to user input. As an example, the device 120 receives a user request to display a rectangle having certain dimensions because she wants to attach a flag to the building 310 having the same or similar dimensions. Moreover, the device 120 receives a user input to display the AR content 390j a certain distance above the ground because she wants the flag hung that high above the ground. One of ordinary skill in the art will appreciate that the device 120 may display any kind of outline.

Because, as described with reference to FIGS. 1A and 1B, the AR content tracks corresponding features, the device displays stationary measurement information on the AR/VR display 125. This is useful for providing reliable and accurate distance measurements, especially when using a traditional tape measure is difficult, such as if the measured distance is high from the ground. Moreover, the tracking feature of the device 120 is useful in that it provides stationary outlines. For example, with respect to AR content 390g-390i in FIG. 3D, a device displays stationary outlines while receiving user inputs painting within the outlines. Because current systems mitigate drift poorly, accurately painting (e.g., staying between the lines) different colors between the three different segments AR content 390g-390i would be exceedingly difficult if not impossible.

FIG. 4 is a representation of pixel characterization vectors 400 according to some implementations. The representation of pixel characterization vectors 400 includes an M number of pixel characterization vector 410a-410M. The device 120 obtains at least a subset of the pixel characterization vectors 410-410M corresponding to pixels in pass-through image data. Based on the pixel characterization vectors 410a-410M, the device 120 determines whether a particular group of corresponding pixels satisfies a feature confidence threshold. If one or more pixels do, the device 120 identifies them as being part of a feature of an object.

As is illustrated in FIG. 4, each pixel characterization vector 410a-410M includes a pixel number and corresponding label numbers. Each pixel characterization vector is associated with a pixel of the pass-through image data.

Each label number provides classification information about the corresponding pixel. As an example, it is to be assumed that pixel number 20 of the pass-through image data corresponds to a brown couch. Accordingly, the pixel characterization vector with a pixel number of 20 includes a label number corresponding to the color brown and another label number corresponding to a couch. One of ordinary skill in the art will appreciate that the number of labels and their values may vary.

In various implementations, certain pixel characterization vectors 410a-410M associated with the same object include the same number of labels and value for each label. For example, in some implementations, pixel charactering vectors associated with pixels of a top surface of a solid black table share the number of labels and value of each label, because of the color, object, and feature uniformity of the surface of the solid black table.

In various implementations, certain pixel characterization vectors 410a-410M associated with the same object include different number of labels and/or different values for each label. For example, pixel charactering vectors associated with pixels of a self-portrait of Van Gough have a different number of labels and/or different value for each label, because of the variety of textures (e.g., fine and coarse brush strokes) and color in the portrait. Continuing with this example, one pixel characterization vector includes a brown label value and a coarse texture value, while another pixel characterization vector includes a black label and a fine texture value.

FIG. 5 is an example block diagram of a device 120 (e.g., an HMD, mobile device, etc.) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 120 includes one or more processing units (PU(s)) 502 (e.g., microprocessors, ASICs, FPGAs, GPUs, CPUs, processing cores, and/or the like), one or more input/output (I/O) devices and sensors 506, one or more communication interfaces 508 (e.g., USB, FIRE- WIRE, THUNDERBOLT, IEEE 802.3x, IEEE 802.11x, IEEE 802.16x, GSM, CDMA, TDMA, GPS, IR, BLU-ETOOTH, ZIGBEE, and/or the like type interface), one or more programming (e.g., I/O) interfaces 510, one or more AR/VR displays 125, one or more optional interior and/or exterior facing image sensors 512, a memory 520, and one or more communication buses 505 for interconnecting these and various other components.

In some implementations, the one or more communication buses 505 include circuitry that interconnects and controls communications between system components. In some implementations, the one or more I/O devices and sensors 506 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more AR/VR displays 125 are configured to display AR/VR content to the user. In some implementations, the one or more AR/VR displays 125 are also configured to present flat video content to the user (e.g., a 2-dimensional or "flat" AVI, FLV, WMV, MOV, MP4, or the like file associated with a TV episode or a movie, or live video pass-through of the scene 101). In some implementations, the one or more AR/VR displays 125 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more AR/VR displays 125 correspond to diffractive, reflective, polarized, holographic, etc. waveguide displays. For example, the device 120 includes a single AR/VR display. In another example, the device 120 includes an AR/VR display for each eye of the user. In some implementations, the one or more AR/VR displays 125 are capable of presenting AR and VR content. In some implementations, the one or more AR/VR displays 125 are capable of presenting AR or VR content.

In some implementations, the one or more image sensors 512 are configured to provide pass-through image data characterized by a pose associated with a field of view of the image sensor. In some implementations, the one or more image sensors 512 are included within a device different from the device 120, and thus the image sensors 512 are separate from the one or more AR/VR displays 125. For example, in some implementations, the one or more image sensors 512 reside at an unmanned aerial vehicle (UAV), sometimes referred to as a drone. Continuing with this example, the one or more image sensors 512 wirelessly provide pass-through image data to the device 120, and the device 120 displays, on an AR/VR display 125 (e.g., goggles worn by the user 121), the pass-through image data. In this example, the user 121 of the device 120 effectively perceives what the remote one or more image sensors are sensing.

In some implementations, the one or more image sensors 512 are configured to provide image data that corresponds to at least a portion of the face of the user that includes the eyes of the user. For example, the one or more image sensors 512 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and an AR drift mitigator 540. The operating system 530 includes procedures for handling various basic system services and for performing hardware dependent tasks.

In some implementations, the AR drift mitigator 540 is configured to mitigate drift of an AR display marker as a result of changing pass-through image data. To that end, in various implementations, the AR drift mitigator 540 includes a (optional) pixel labeler 550, a feature identifier 560, a rendering subsystem 570, a compositing subsystem 580, and AR content 590.

In some implementations, the pixel labeler 550 is configured to provide pixel characterization vectors (e.g., pixel characterization vectors 410a-410M in FIG. 4) in order to facilitate feature identification. To that end, in various implementations, the pixel labeler 550 includes a neural network 550a, instructions and/or logic 550b therefor, and heuristics and metadata 550c therefor.

In some implementations, the feature identifier 560 is configured to identify a feature of an object within pass-through image data based on pixel characterization vectors. To that end, in various implementations, the feature identifier 560 includes instructions and/or logic 560a therefor, and heuristics and metadata 560b therefor.

In some implementations, the rendering subsystem 570 is configured to render AR content 590. To that end, in various implementations, the rendering subsystem 570 includes instructions and/or logic 570a therefor, and heuristics and metadata 570b therefor.

In some implementations, the compositing subsystem 580 is configured to composite rendered AR content with pass-through image data for display on the AR/VR display 125. To that end, in various implementations, the compositing subsystem 580 includes instructions and/or logic 580a therefor, and heuristics and metadata 580b therefor.

Moreover, FIG. 5 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 6:
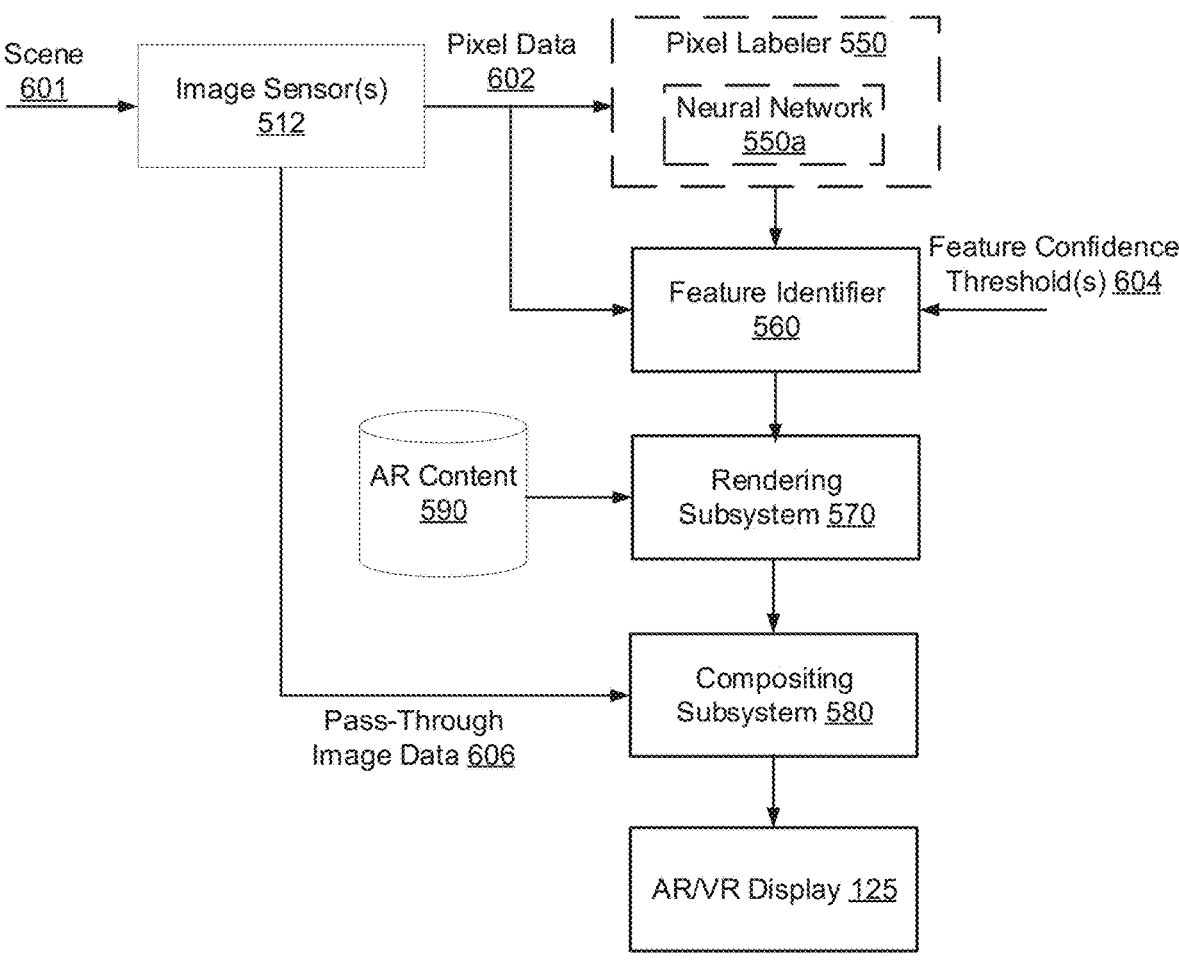
FIG. 6 is an example data flow diagram of a device according to some implementations.

FIG. 6 is an example data flow diagram 600 of a device (e.g., the device 120, such as a HMD, mobile device, etc.) according to some implementations. In some implementations, the image sensor 512 obtains image information associated with a scene 601. In some implementations, the image sensor 512 provides pixel data 602 to the (optional) pixel labeler 550 and pass-through image data 606 to the compositing subsystem 580. In some implementations, the pixel data 602 includes a portion of the pass-through image data 606. In some implementations, the pixel data 602 is equivalent to the pass-through image data 606.

In some implementations, the pixel labeler 550 provides pixel characterization vectors (e.g., pixel characterization vectors 410a-410M in FIG. 4) to the feature identifier 560. The feature identifier 560 identifies a feature of an object within the pixel data 602 in accordance with a determination that pixel characterization vectors for the feature of the object satisfy a feature confidence threshold. In some implementation, the feature identifier 560 identifies features on a pixel-by-pixel basis. In other words, the feature identifier 560 assigns to each pixel the label values included within the corresponding pixel characterization vector.

In some implementations, the feature confidence threshold is satisfied when a sufficient number of pixels share a feature. In some implementations, the feature confidence threshold is satisfied when pixels that are sufficiently close to each other share the feature. For example, a third pixel of pixel data corresponds to an edge of a table. In order for the feature identifier 560 to identify the third pixel as the edge, in some implementations, the feature identifier 560 obtains pixel characterization vectors indicating that a sufficient number of pixels proximate to the third pixel are associated with the edge of the table.

In some implementations, the feature identifier 560 provides the identified features to the rendering subsystem 570. In some implementations, the rendering subsystem 570 renders AR content 590 corresponding to the identified features. The rendered data is provided to a compositing subsystem 580. In some implementations, the compositing subsystem 580 composites the rendered data and the pass-through image data 606, and provides the composited output to the AR/VR display 125 for display.

Figure 7:
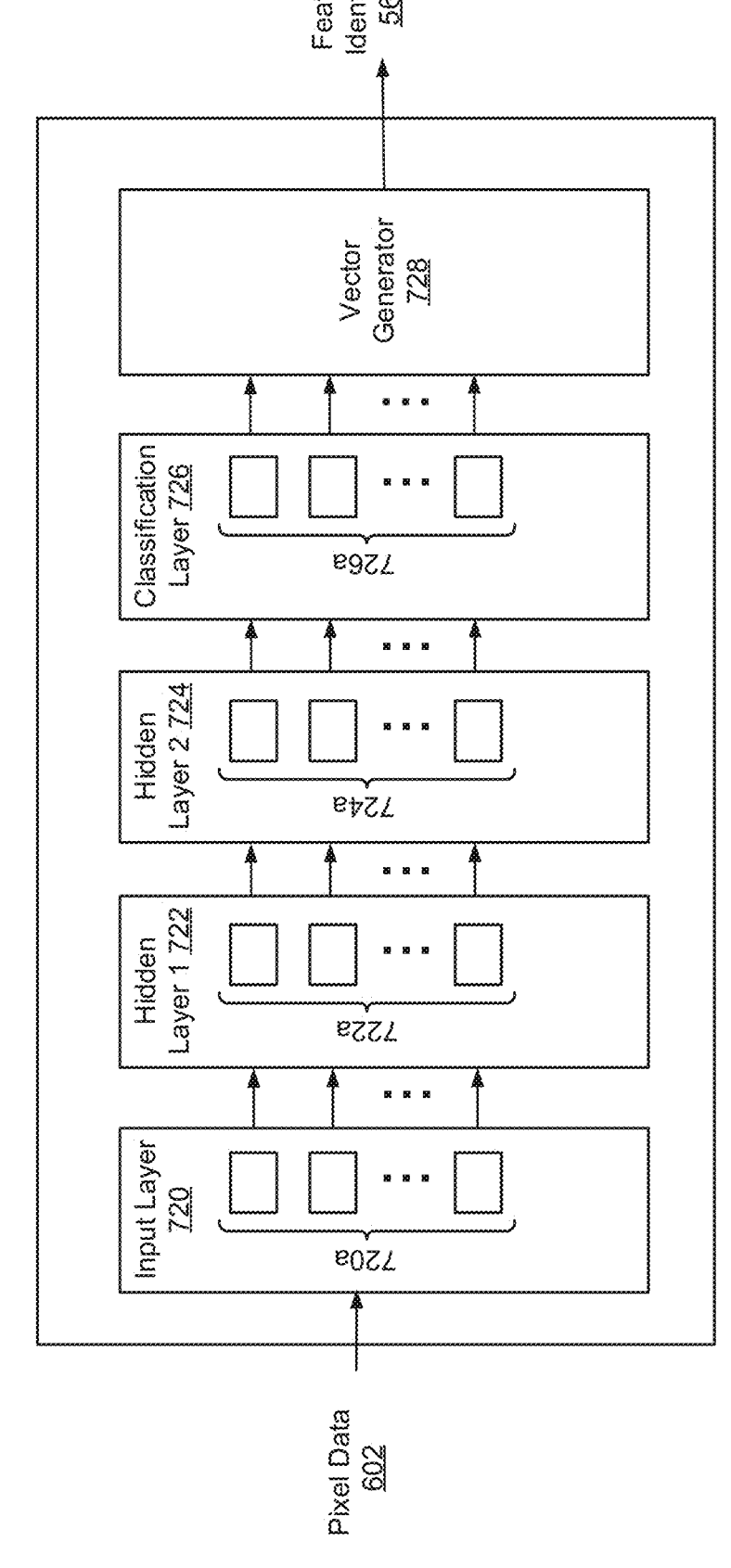
FIG. 7 is an example neural network according to some implementations.

FIG. 7 is an example neural network 550a according to some implementations. In the example of FIG. 7, the neural network 550a includes an input layer 720, a first hidden layer 722, a second hidden layer 724, a classification layer 726, and an action/response selection module 728 ("action selection module 728", hereinafter for the sake of brevity). While the neural network 550a includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 720 is coupled (e.g., configured) to receive various inputs. For example, in some implementations, the input layer 720 receives pixel data 602 from one or more image sensors 512. In various implementations, the input layer 720 includes a number of LSTM logic units 720a, which are also referred to as model(s) of neurons by those of ordinary skill in the art. In some such implementations, an input matrix from the features to the LSTM logic units 720a include rectangular matrices. The size of this matrix is a function of the number of features included in the feature stream.

In some implementations, the first hidden layer 722 includes a number of LSTM logic units 722a. In some implementations, the number of LSTM logic units 722a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 7, the first hidden layer 722 receives its inputs from the input layer 720.

In some implementations, the second hidden layer 724 includes a number of LSTM logic units 724a. In some implementations, the number of LSTM logic units 724a is the same as or similar to the number of LSTM logic units 720a in the input layer 720 or the number of LSTM logic units 722a in the first hidden layer 722. As illustrated in the example of FIG. 7, the second hidden layer 724 receives its inputs from the first hidden layer 722. Additionally or alternatively, in some implementations, the second hidden layer 724 receives its inputs from the input layer 720.

In some implementations, the classification layer 726 includes a number of LSTM logic units 726a. In some implementations, the number of LSTM logic units 726a is the same as or similar to the number of LSTM logic units 720a in the input layer 720, the number of LSTM logic units 722a in the first hidden layer 722, or the number of LSTM logic units 724a in the second hidden layer 724. In some implementations, the classification layer 726 includes an implementation of a multinomial logistic function (e.g., a soft-max function) that produces a number of outputs.

In some implementations, the vector generator 728 generates a per-pixel vector by selecting the top N action candidates provided by the classification layer 326. In some implementations, the top N action candidates are most likely to accurately characterize a corresponding pixel in the pixel data 602. In some implementations, the vector generator 728 generates a set of probability or confidence values for corresponding label values within a particular vector.

FIG. 9 is a flow diagram of a method 900 of mitigating AR drift according to some implementations. In various implementations, the method 900 is performed by a device (e.g., the device 120). For example, in some implementations, the method 900 is performed at a mobile device (e.g., tablet, mobile phone, laptop), HMD (e.g., AR/VR headset), etc. Briefly, the method 900 includes tracking an identified feature of an object in a scene in order to mitigate drift.

As represented by block 910, the method 900 includes obtaining, from an image sensor (e.g., image sensor 512), first pass-through image (e.g., a first image frame) data characterized by a first pose associated with a field of view of the image sensor. In some implementations, the device obtains first pass-through image from one or more image sensors. In various implementations, the pass-through image data corresponds to optical information.

In various implementations, the image sensor is separate from the device, and thus the image sensor is separate from an AR/VR display of the device (e.g., AR/VR display 125). For example, in some implementations, the image sensor resides at an unmanned aerial vehicle (UAV), sometimes referred to as a drone. Continuing with this example, the image sensor wirelessly provides pass-through image data to the device, and the device displays, on the AR/VR display (e.g., goggles or a headset worn by the user), the pass-through image data. In this example, the user of the device effectively perceives what the remote image sensor is sensing.

As represented by block 920, the method 900 includes obtaining respective pixel characterization vectors (e.g., pixel characterization vectors 410a-410M in FIG. 4) for at least a subset of pixels in the first pass-through image data. In various implementations, the pixel characterization vectors are generated by a machine learning process, such as one or more neural networks (e.g., deep-learning neural networks) illustrated in FIG. 7.

As represented by block 920a, in various implementations, the method 900 includes a pixel characterization vector that includes one or more labels for each pixel. For example, in some implementations, a pixel characterization vector includes a primary label (e.g., label no. 1 corresponds to a chair) and one or more sub-labels (e.g., label no. 2 corresponds to the color brown; label no. 3 corresponds to leather; label no. 4 corresponds to armrest of the chair; etc.).

As represented by block 920b, in various implementations, the method 900 includes obtaining the respective pixel characterization vectors from a pixel labeler. In various implementations, the pixel labeler corresponds to a machine learning system, such as a deep learning neural network system. In some implementations, the pixel labeler corresponds to a machine learning segmentation system. In some implementations, the pixel labeler selects an object model among a plurality of object models and compares to the pixel in order to generate the pixel characterization vectors for the pixel. In some embodiments, object models corresponding to sufficiently relevant objects are used for selection. For example, in response to determining that the scene corresponds to a kitchen, object models corresponding to objects commonly found in a kitchen, such as a refrigerator, cabinets, stoves, etc. are utilized. On the other hand, irrelevant objects, such as rocks and trees are unutilized. In some implementations, the object models utilized by the pixel labeler are preset by the user. For example, the device receives user inputs specifying chairs, which in turn cause the system to focus on chair models.

As represented by block 930, the method 900 includes identifying a feature of an object (e.g., a corner or edge of a table) within the first pass-through image data, characterized by the first pose, in accordance with a determination that pixel characterization vectors for the feature of the object satisfy a feature confidence threshold. In various implementations, the feature includes an outer portion of the object, such as a corner/edge of a table. In various implementations, the feature includes portions of the object that substantially (e.g., within a threshold) contrast with adjacent objects. For example, in some implementations, the feature includes a pixel labeled as black that is adjacent to a pixel labels as white. In various implementations, the feature corresponds to a distinctive and/or important pixel in scene.

In various implementations, image processing is utilized to identify the feature, obviating the use of a depth sensor. In various implementations, the feature is identified by comparing a particular pixel with one or more objects models included within a machine learning system.

In various implementations, the device receives user inputs specifying a type of scene or environment in which the user resides. Accordingly, the environment/scene information is used to filter out irrelevant model objects. For example, if the received user inputs specifies that the user is in the deep-jungle, the device filters out models associated with furniture, which are not likely to be there.

As represented by block 930a, the method 900 includes identifying the feature of the object within the first pass-through image data by identifying one or more pixels associated with the feature of the object in the first pass-through image data. In some implementations, the feature confidence threshold is satisfied when enough pixels within a predefined geometric radius are similarly labeled.

In accordance with a determination that the feature confidence threshold is satisfied, the method 900 continues to block 940. On the other hand, in accordance with a determination that the feature confidence threshold is not satisfied, the method 900 continues back to block 930.

As represented by block 940, the method 900 includes displaying, on the display, the first pass-through image data and an augmented reality (AR) display marker that corresponds to the feature of the object. In various implementations, the AR display marker corresponds to an AR user interface element, such as a reticle (e.g., crosshair, circle, concentric circles, etc.). In various implementations, the AR display marker corresponds to a candidate anchor point of a feature. In various implementations, the AR display marker is displayed at the location proximate to the location of the feature. For example, in some implementations, the AR display market corresponds to a reticle on the corner of a table.

In various implementations, the device receives user inputs specifying display preferences and utilizes these preferences in order to affect the nature of the AR display marker. For example, the device, based on the display preferences, places a certain marker type on one feature (e.g., a reticle on a corner) and another marker type on another feature (e.g., a flashing circle on an edge).

In various implementations, the AR display marker is displayed along with various AR content. This can enhance integration with other applications by providing the other applications with scene measurement information and scene modification information (e.g., seeing whether a wall is large enough to hang a painting on). For example, in some implementations, the AR display marker corresponds to two anchor points; each at a different end of a wall. In various implementations, the device receives user inputs specifying a particular outline on which to display overlaid AR content. For example, in some implementations, the device displays AR content corresponds to a circle with a particular area based on received user inputs. One of ordinary skill will appreciate that the device may display AR content corresponding to any type of object, including one or more points, one or more lines, one or more regular shapes, one or more irregular shapes, one or more polygons, or a combination thereof.

In various implementations, the AR display marker is presented along with AR content so as to induce and/or trigger other, cooperating application(s) to take some action. For example, in some implementations, the AR display marker is presented with graphics and/or animation, such as a flashing or color-changing reticle. In this way, other applications can be induced to measure more of the scene. For example, if only one edge of a couch is being displayed, an AR display marker on the edge is colored red until the display is moved to include the other edge, at which point the AR display marker turns green.

As another example, the displays paints (e.g., provides AR content overlaid on) a wall as one or more image sensors of the device scan the wall in order to determine the area of the wall. In various embodiments, scanning corresponds to the image sensors sensing light reflecting off of objects in the scene. Based on the sensed light, the image sensors provide pass-through image data to the reminder of the device. As yet another example, a real-time measuring tape is displayed as the one or more image sensors scan across an object, which can include an indicator indicating width, length, or height. In various implementations, the AR display marker is displayed along with AR content that corresponds to an indicator of the type of the object and/or feature. For example, the display includes "this is a marble table" AR content as the one or more image sensors are scanning a table.

In various implementations, the AR display marker is displayed along with AR content that corresponds to one or more measurement indicators (e.g., length, width, center, etc.). For example, if an edge of a table and zero corners is being displayed, the displayed AR content includes a length between the one end of the display and the AR display marker (on the edge) and a length between the other end of the display and the AR display marker (on the edge). If, on the other hand, one corner of the table is being displayed, the AR content includes a length of one edge touching the corner and a length of the other corner touching the edge. If, on the other hand, two corners are being displayed, the AR content includes a length between the two corners. If, on the other hand, three corners are being displayed, the AR content includes a length between corner one and corner two, a length between corner one and corner three, a length between corner two and corner three, and an estimated area of the table. If, on the other hand, four corners are being displayed, the AR content includes lengths between each combination of the four corners and an estimated area of the table.

As represented by block 950, the method 900 includes obtaining, from the image sensor, second pass-through image data characterized by a second pose associated with the field of view of the image sensor. In some implementations, the second pass-through image data corresponds to a second image frame.

As represented by block 960, the method 900 includes transforming the AR display marker to a position associated with the second pose in order to track the feature of the object. By transforming the AR display marker in this way, drift resulting from the pose change is mitigated. In current systems, on the other hand, because pixels are not characterized as in the manner disclosed here, the system struggles to keep the marker attached to the feature. In addition to impeding the functionally of other, cooperating application (s), drifting off the feature also increases resource utilization of the device because a relatively large amount of processing power (and thus battery usage) is used to recalibrate the location of marker.

In some implementations, as represented by block 960*a*, transforming the AR display marker includes: obtaining additional pixel characterization vectors for at least a subset of pixels in the second pass-through image data; and identifying the feature of the object within the second pass-through image data, characterized by the second pose, in accordance with a determination that the additional pixel characterization vectors for the feature of the object satisfy a second feature confidence threshold. In some implementations, as represented by block 960*b*, the AR display marker is transformed in response to determining that the first pose is different from the second pose.

As represented by block 970, the method 900 includes displaying, on the display, the second pass-through image data and maintaining display of the AR display marker that corresponds to the feature of the object based on the transformation.

In some implementations, the method 900 continues back to block 950. Accordingly, the method obtains additional pass-through image data and performs additional AR display marker transformation and display. In this way, the method 900, in some implementations, continually tracks the feature in response to pose changes.

FIG. 10 is a flow diagram of a method 1000 of selecting an AR feature according to some implementations. In various implementations, the method 1000 is performed by a device (e.g., the device 120). For example, in some implementations, the method 1000 is performed at a mobile device (e.g., tablet, mobile phone, laptop), HMD (e.g., AR/VR headset), etc. Briefly, the method 1000 includes identifying and displaying a plurality of AR display marks corresponding to corresponding feature(s) of an object(s). The device selects one or more of the plurality of AR display marks according to a variety of implementations.

As represented by block 1010, the method 1000 includes obtaining first pass-through image data characterized by a first pose. As represented by block 1020, the method 1000 includes obtaining pixel characterization vectors for at least some of the pixels in the first pass-through image data. As represented by block 1030, in various implementations, the method 1000 includes identifying a plurality of features of an object within the first-pass through image data.

As represented by block 1040, in various implementations, the method 1000 includes displaying the first pass-through image data and a plurality of AR markers corresponding to the plurality of features. As represented by block 1040*a*, in various implementations, the method 1000 includes displaying, on the display, AR content proximate to the plurality of AR display markers, wherein the AR content is indicative of information about the plurality of features. For example, the AR content corresponds to: "This is the leg of a chair; "This is a couch with coarse, black leather fabric;" "This is the middle portion of the wall;" "This is the floor;" etc. As another example, with reference to FIG. 2B, the displayed AR content 2100*e* is "Wall Corner."

As represented by block 1050, in various implementations, the method 1000 includes selecting one or more features among the plurality of features. In various implementations, the features are selected without user intervention. In various implementations, the features are selected in response to the device receiving user input. For example, in some implementations, the device displays a menu prompting selection of a feature and receives user input selecting a particular feature. In some implementations, the device selects an AR display mark in order to establish an origin (e.g., anchor point) from which to base measurements. In some implementations, the device receives user input specifying two or more AR display markers, and the device computes and displays measurement information with respect to the two or more AR display markers.

As represented by block 1060, the method 1000 includes obtaining second pass-through image data characterized by a second pose. As represented by block 1070, in various implementations, the method 1000 includes transforming the one or more AR display markers corresponding to the selected one or more features. The one or more AR display markers are transformed in order to track respective features. Recall that the positions of the features change in response to the transition between poses.

As represented by block 1080, in various implementations, the method 1000 includes displaying, on the display, the second pass-through image data and maintaining display of the one or more AR display markers that correspond to the respective feature of the object based on the respective transformations.

FIG. 11 is a flow diagram of a method 1100 of displaying AR measurement information according to some implementations. In various implementations, the method 1100 is performed by a device (e.g., the device 120). For example, in some implementations, the method 1100 is performed at a mobile device (e.g., tablet, mobile phone, laptop), HMD (e.g., AR/VR headset), etc. Briefly, the method 1100 includes determining and displaying measurement information about feature(s) of an object(s) within pass-through image data.

As represented by block 1110, the method 1100 includes obtaining first pass-through image data characterized by a first pose. As represented by block 1120, the method 1100 includes obtaining pixel characterization vectors for at least some of the pixels in the first pass-through image data.

As represented by block 1130, in various implementations, the method 1100 includes identifying first and second features of the object. In various implementations, the first feature is identified in accordance with a determination that pixel characterization vectors for the first feature of the object satisfy a first feature confidence threshold. In various implementations, the second feature is identified in accordance with a determination that pixel characterization vectors for the second feature of the object satisfy a second feature confidence threshold. In some implementations, the second feature confidence threshold is the same as the first feature confidence threshold. In some implementations, the second feature confidence threshold is different from the first feature confidence threshold. As represented by block 1140, in various implementations, the method 1100 includes displaying, on the display, the first and second AR display markers associated with the respective features along with the first pass-through image data.

As represented by block 1150, in various implementations, the method 1100 includes determining measurement information associated with the first and second AR display markers; and displaying, on the display, AR content indicative of the measurement information. In some implementations, the AR content includes: a line (e.g., tape-measure) drawn between the first and second AR display markers. In some implementations, the AR content includes a distance between the first and second AR display markers (e.g., "The distance between the two edges is 5 inches"). In some implementations, the AR content includes the midpoint between the first and second AR display markers. In some implementations, the device receives user inputs specifying a certain number of equal-spaced points between the first and second AR display markers, and the device displays these points.

As represented by block 1160, the method 1100 includes obtaining second pass-through image data characterized by a second pose. As represented by block 1170, in various implementations, the method 1100 includes transforming the first and second AR display markers. The first and second AR display markers are transformed in order to track respective features of the object.

As represented by block 1180, in various implementations, the method 1100 displaying, on the display, the second pass-through image data and maintaining display of the first and second AR display markers based on the respective transformations.

Figure 12A:
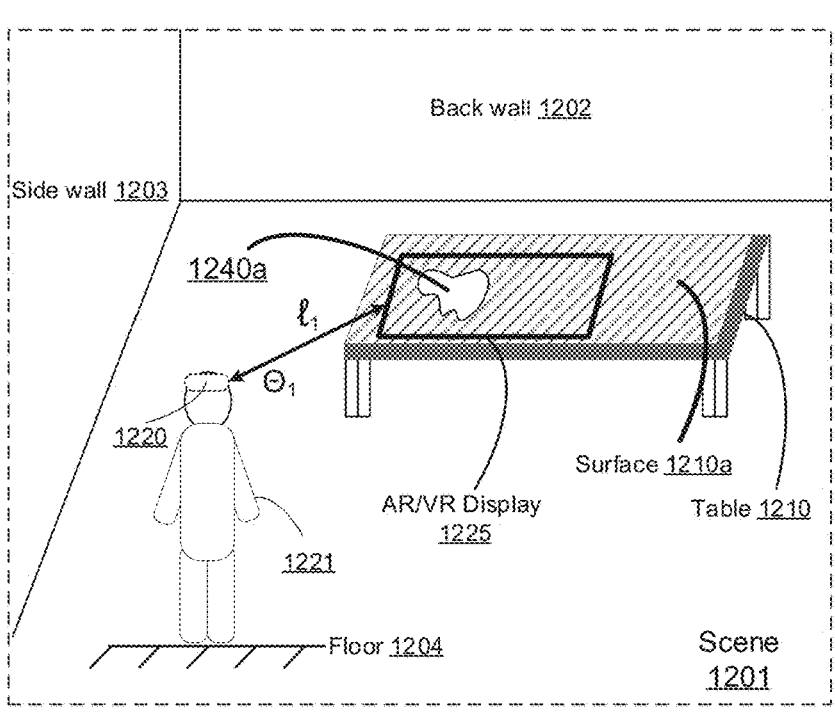
FIGS. 12A-12C are examples of pertinent steps in a method of inferring a plane in a scene according to some implementations.
Figure 12B:
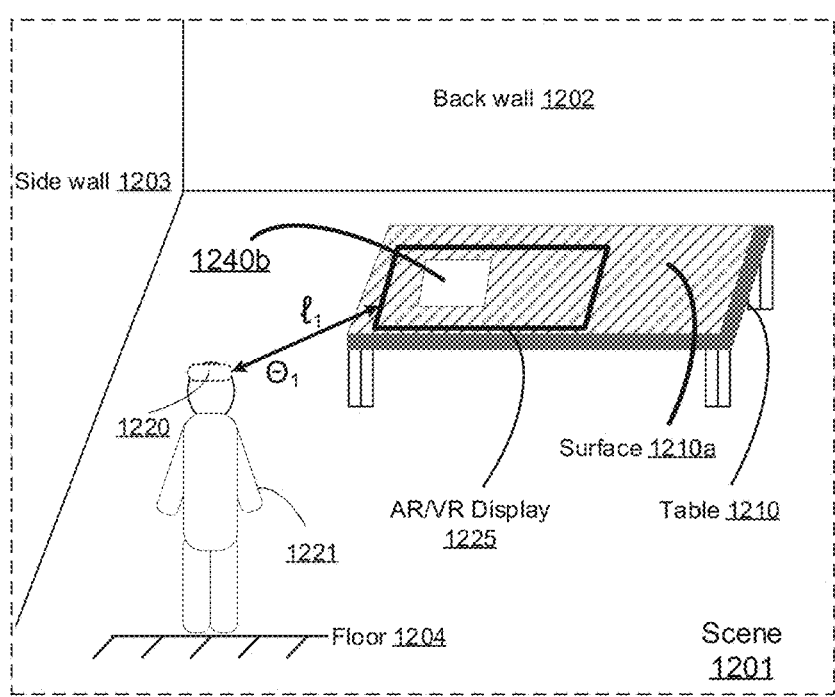
Figure 12C:
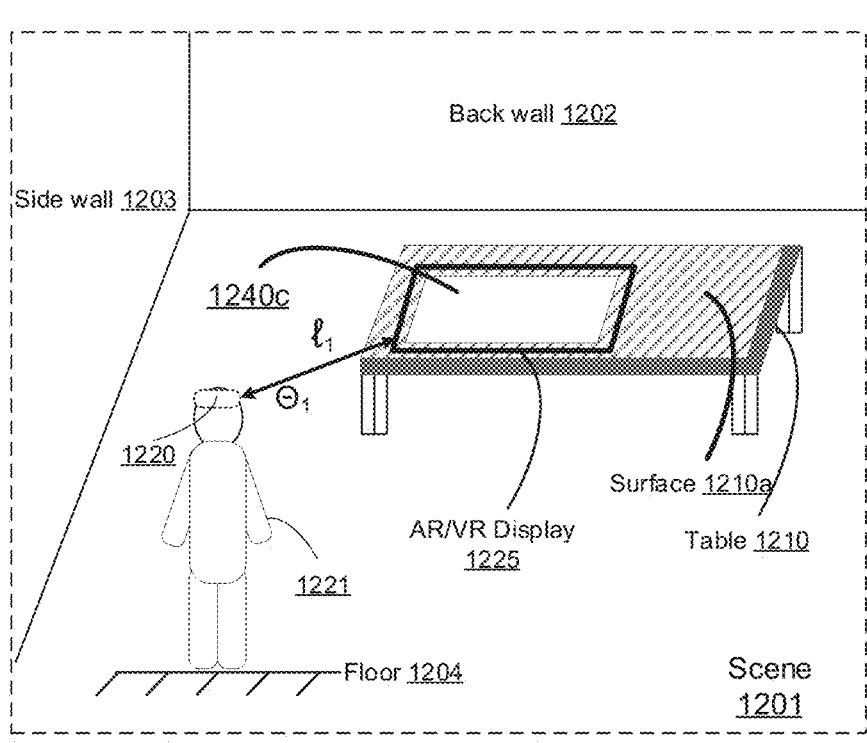

FIGS. 12A-12C are examples of pertinent steps in a method of inferring a plane in a scene according to some implementations. FIG. 12A is an example of pixel identification 1200a in a scene 1201 according to some implementations. The scene includes a user 1221 wearing a device 1220 and standing on floor 1204. In some implementations, the device 1220 corresponds to a mobile device (e.g., tablet, laptop, mobile phone, etc.). In some implementations, the device 1220 corresponds to a HMD. The scene also includes a back wall 1202, a side wall 1203, and a table 1210 with a surface 1210a.

The device 1220 includes an AR/VR display 1225 positioned towards the table 1210 in a pose characterized by a first length $l_1$ and a first angle $\Theta_1$. The first length $l_1$ corresponds to a distance between the device 1220 and the table 1210 at which one or more image sensors of the device 1220 are pointed. The first angle $\Theta_1$ corresponds to an approximate line of sight angle between the device 1220 and the table 1210 relative to a reference plane.

The AR/VR display 1225 corresponds to a field of view of the one or more image sensors of the device 1220. As is illustrated in FIG. 12A, the field of view corresponds to the surface 1210a of the table 1210. In various implementations, the one or more image sensors obtain image information of the scene 1201 (e.g., the surface of the table) and provide pass-through image data to the device 1220.

According to various implementations, the device 1220 presents AR/VR content to the user while the user is not virtually and/or physically present within the scene 1201. In various implementations, one or more image sensors are included within a first device that is separate from a second device that includes an AR/VR display 1225. In other words, the one or more image sensors are not collocated with the AR/VR display 1225. For example, in some implementations, the one or more image sensors and the AR/VR display 1225 are located within different scenes. As an example, in some implementation and with reference to FIG. 8, the AR/VR display 1225 and the image sensors are located in different scenes.

The device 1220 identifies, in the pass-through image data characterized by the pose associated with the field of view of the one or more image sensors, a first set of pixels associated with a distinguishable set of features. As is illustrated in FIG. 12A, the device 1220 identifies a first set of pixels 1240a in the pass-through image data corresponding to the surface 1210a of the table 1210. The first set of pixels 1240a is associated with a distinguishable set of features because the surface 1210a of the table 1210 is characterized by a distinguishable pattern (e.g., a horizontal line pattern).

FIG. 12B is an example of fitting 1200b a first plane 1240b in the scene 1201 according to some implementations. The device 1220 fits a first plane 1240b to the first set of pixels 1240a according to a determination that the first set of pixels 1240a satisfy a planar criterion. In some implementations, the planar criterion is satisfied if the first set of pixels 1240a corresponds to a two-dimensional (2D) grid. For example, in some implementations, the device 1220 fits the first plane 1240b in response to determining that the first set of pixels 1240a is associated with a substantially flat surface (e.g., a wall, table, floor, etc.). As is illustrated in FIG. 12B, the first plane 1240b corresponds to a substantially rectangle plane. However, one of ordinary skill in the art will appreciate that the first plane 1240b may correspond to any type of shape, including regular and irregular shapes.

FIG. 12C is an example of fitting 1200c a second plane 1240c in the scene 1201 according to some implementations. Based on the first plane 1240b and obtained pixel characterization vectors, the device 1220 fits a second plane 1240c that is coplanar to the first plane 1240b. The device 1220 obtains pixel characterization vectors (e.g., pixel characterization vector 410a-410M in FIG. 4) for pixels in the pass-through image data, wherein each of the pixel characterization vectors includes one or more labels. The device 1220 obtains pixel characterization vectors for pixels in the pass-through image data corresponding to the field of view that includes the surface 1210a of the table 1210. For example, the pixel characterization vectors include primary labels corresponding to a table and sub-labels corresponding to a diagonal-line pattern. In some implementations, the device 1220 obtains pixel characterization vectors from a pixel labeler, such one or more neural networks (e.g., deep-learning neural network(s)).

The device 1220 identifies a second set of pixels (not shown) proximate to the first set of pixels 1240a. The pixel characterization vectors for the second set of pixels and pixel characterization vectors for the first set of pixels 1240a satisfy an object confidence threshold. For example, in some implementations, the pixel characterization vectors for the first and second sets of pixels include a table for the primary labels and a certain pattern for the sub-labels. As another example, in some implementations, the pixel characterization vectors for the first and second set of pixels include the same primary labels but different sub-labels that are sufficiently similar to each other. For instance, the sets of sub-labels both correspond to patterns of slightly different thicknesses, but the different is within a threshold.

The devices 1220 fits the second plane 1240c to the first set of pixels 1240a and the second set of pixels, wherein the first plane 1240b is coplanar with the second plane 1240c.

Recall that the first plane 1240b fits over the first set of pixels 1240a. Comparing the first plane 1240b with the second plane 1240c, the second plane 1240c include an additional area (e.g., an extended version of the first plane 1240b). The additional area corresponds to the identified second set of pixels proximate to the first set of pixels 1240a.

Figure 13A:
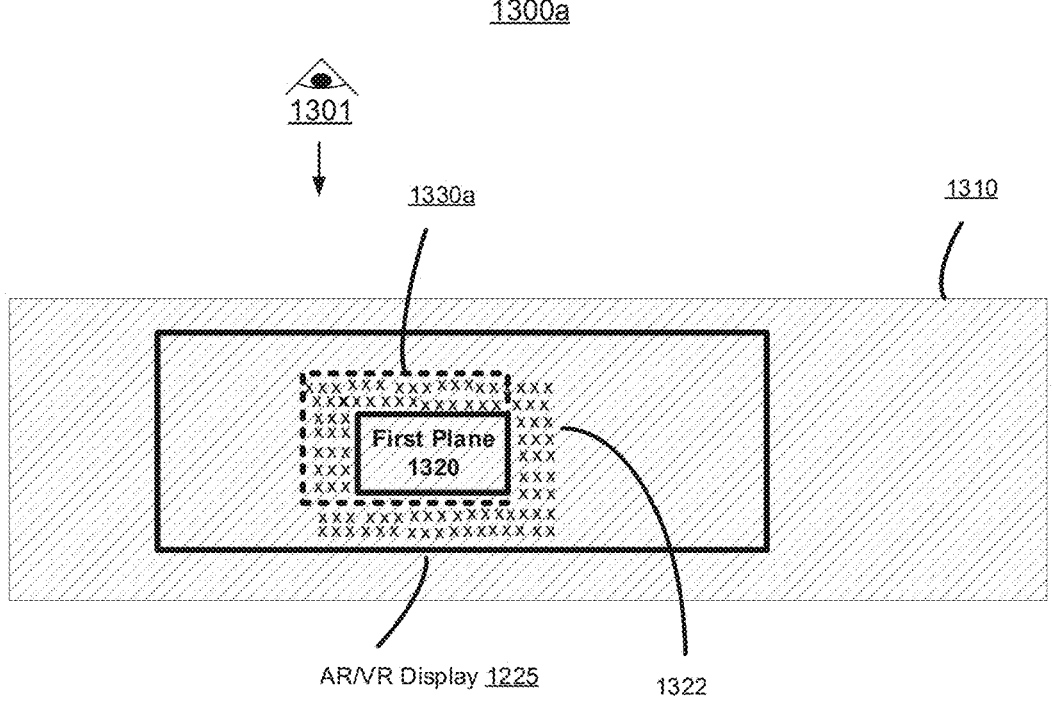
FIGS. 13A-13D are examples of pertinent steps in a method of extending a plane according to some implementations.

FIGS. 13A-13D are examples of pertinent steps in a method of extending a plane according to some implementations. FIG. 13A is an example of pixel identification 1300a according to some implementations. As is illustrated in FIG. 13A, an AR/VR display 1225 of a device (e.g., the device 1220 in FIGS. 12A-12C) includes pass-through image data corresponding to a bird's eye view 1301 of a plane 1310, such as a wall, table, floor, etc. The device has fit a first plane 1320 to a first set of pixels. The device identifies a candidate set of pixels 1322 proximate to (e.g., contiguous to) the first set of pixels. The candidate set of pixels 1322 is indicated by 'x' marks. Although the candidate set of pixels 1322 is substantially rectangular, one of ordinary skill in the art will appreciate that the set of candidate pixels 1322 may comprise any type of positioning and/or layout, including non-shapes layouts.

Based on obtained pixel characterization vectors, the device identifies a second set of pixels 1330a (within the dotted rectangle) within the candidate set of pixels 1322 that is proximate to the first set of pixels. The pixel characterization vectors for the second set of pixels 1330a and pixel characterization vectors for the first set of pixels satisfy an object confidence threshold. For example, in some implementations, the pixel characterization vectors for the second set of pixels 1330a and the first of pixels share the same labels, or have substantially similar labels. In some implementations, the second set of pixels 1330a is contiguously associated with the first set of pixels. For example, as is illustrated in FIG. 13A, the 'x' marks associated with the second set of pixels 1330a are contiguous to (e.g., touching or nearly touching) the first set of pixels (e.g., the pixels beneath the first plane 1320).

In various implementations, in response to a determination that pixel characterization vectors for a particular set of pixels among the candidate set of pixels 1322 does not satisfy a second object confidence threshold in view of the pixel characterization vectors for the first set of pixels and for the second set of pixels 1330a, the device foregoes extending the first plane 1320 to include the particular set of pixels. For example, as is illustrated in FIG. 13A, the first plane 1320 is not extended to include pixels that are to the right of and below the second set of pixels 1330a. In some implementations, in response to the device determining that the pixel characterization vectors for a particular set of pixels are sufficiently different from the pixel characterization vectors for the first and second sets of pixels, the device does not extend the first plane 1320 to fit to the particular set of pixels.

Figure 13B:
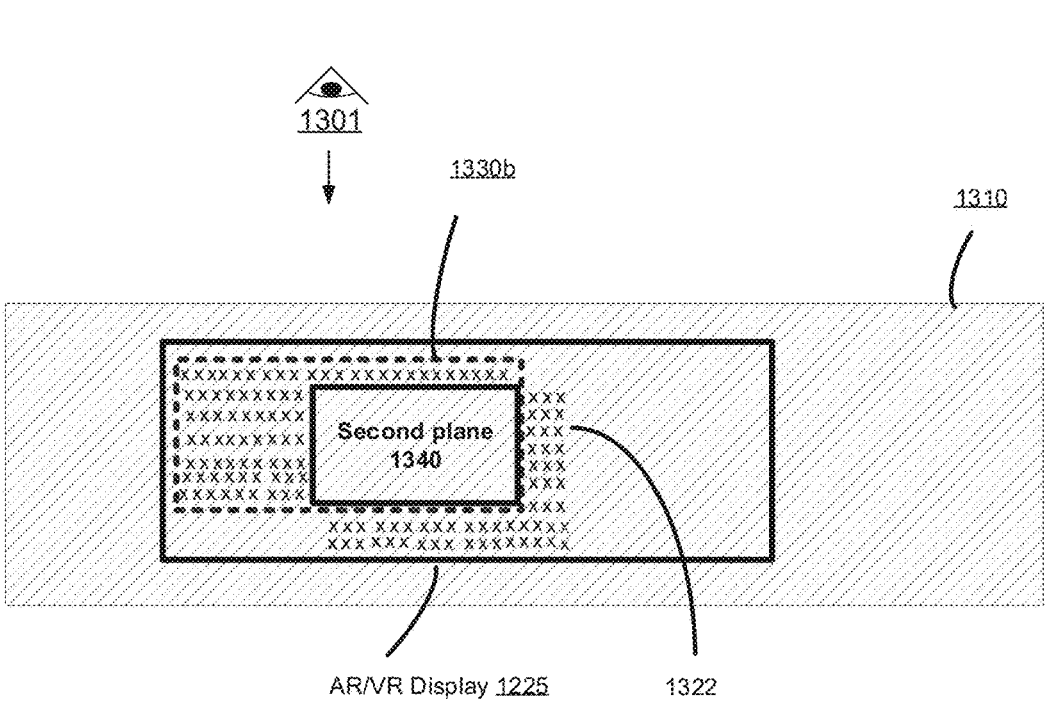

FIG. 13B is an example of extending 1300b the first plane 1320 to a second plane 1340 according to some implementations. The device extends the first plane 1320 to include the first set of pixels and the identified second set of pixels 1330a. The first plane 1320 is coplanar with the second plane 1340. In various implementations, the second plane 1340 corresponds to a juxtaposition of the first plane 1320 and the second set of pixels 1330a.

As is further illustrated in FIG. 13B, in some implementations, the device identifies a third set of pixels 1330b (within the dotted rectangle) proximate to the second set of pixels 1330a. In some implementations, pixel characterization vectors for the third set of pixels 1330b satisfy an object confidence threshold in view of the pixel characterization vectors for the first set of pixels. In some implementations, pixel characterization vectors for the third set of pixels 1330b satisfy an object confidence threshold in view of the pixel characterization vectors for the second set of pixels 1330a. In some implementations, pixel characterization vectors for the third set of pixels 1330b satisfy an object confidence threshold in view of the pixel characterization vectors for the first set of pixels and for the second set of pixels 1330a.

Figure 13C:
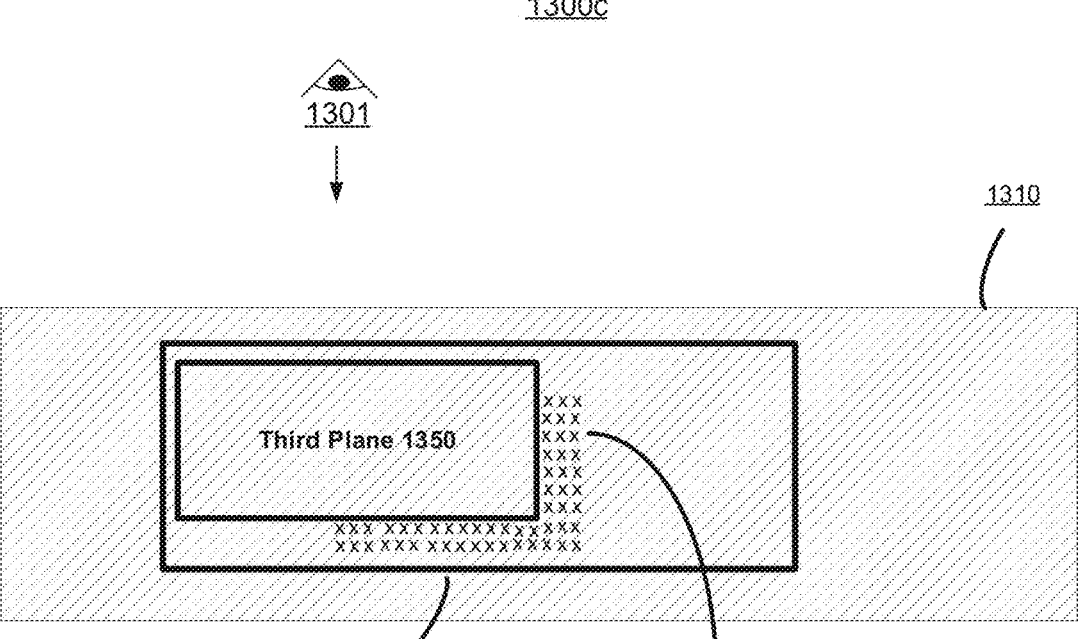

FIG. 13C is an example of extending 1300c the second plane 1340 to a third plane 1350 with overlaid AR content 1390 according to some implementations. The device extends the second plane 1340 to include the identified third set of pixels 1330b. The second plane 1340 is coplanar to the third plane 1350. In various implementations, the third plane 1350 corresponds to a juxtaposition of the second plane 1340 and the third set of pixels 1330b.

Figure 13D:
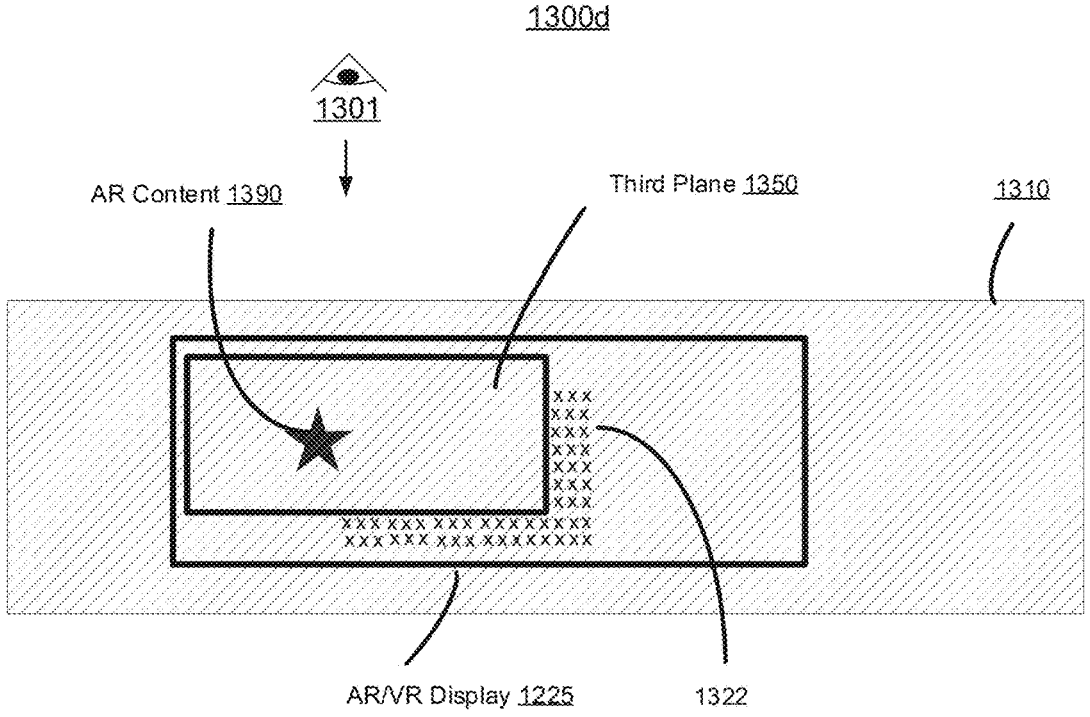

As is illustrated in FIG. 13D, the device displays AR content 1390 (e.g., a star) overlaid on the third plane 1350. One of ordinary skill in the art will appreciate that the AR content 1390 may correspond to any type of content.

FIGS. 14A-14E are examples of pertinent steps in a method of pixel scanning for combining planes according to some implementations. In various implementations, a device (e.g., the device 1220 in FIGS. 12A-12C) fits a plurality of disjointed (e.g., non-contiguous or unconnected) planes. In some implementations, the device scans for pixels adjacent to one or more of the plurality of disjoined plans in order to determine whether any of the plurality of planes are connectable. For example, in some implementations, the planes are connectable if corresponding pixel characterization vectors are sufficiently similar and the planes are sufficiently close to each other.

Figure 14A:
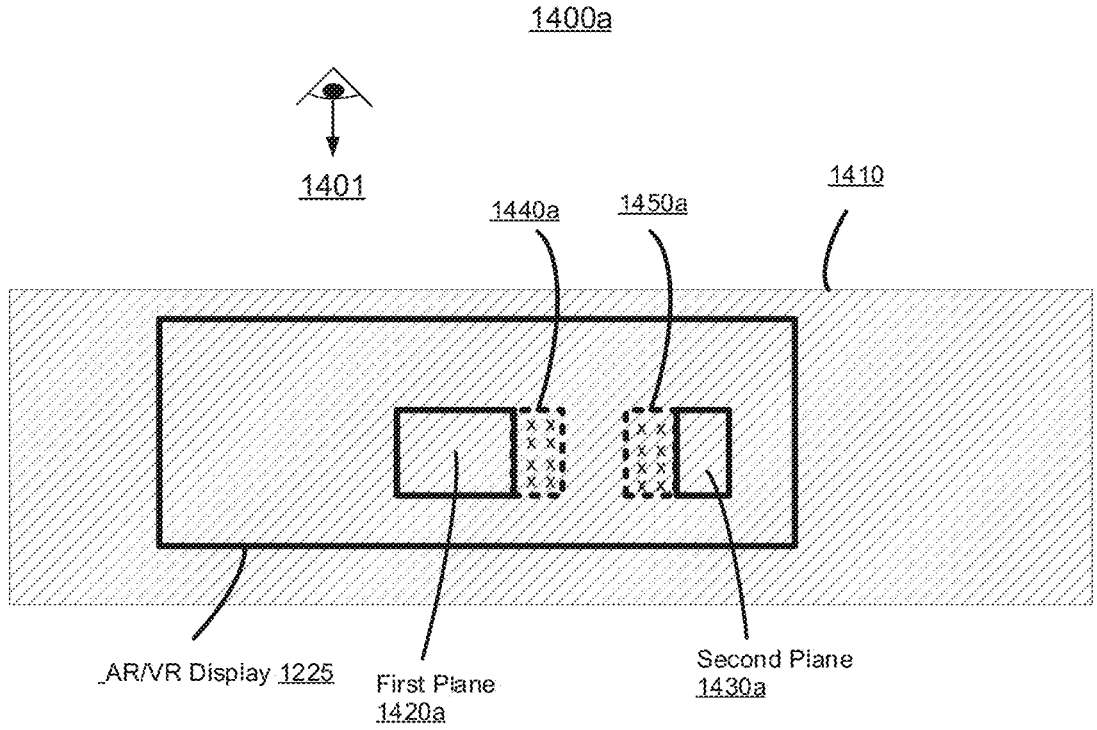
FIG. 14A-14E are examples of pertinent steps in a method of pixel scanning for combining planes according to some implementations.

FIG. 14A is an example of multi-plane pixel scanning 1400a according to some implementations. As is illustrated in FIG. 14A, an AR/VR display 1225 of the device includes pass-through image data corresponding to a bird's eye view 1401 of a plane 1410, such as a wall, table, floor, etc. The device has fit a first plane 1420a to a first set of pixels and a second plane 1430a to a second set of pixels according to implementations described above.

Figure 14B:
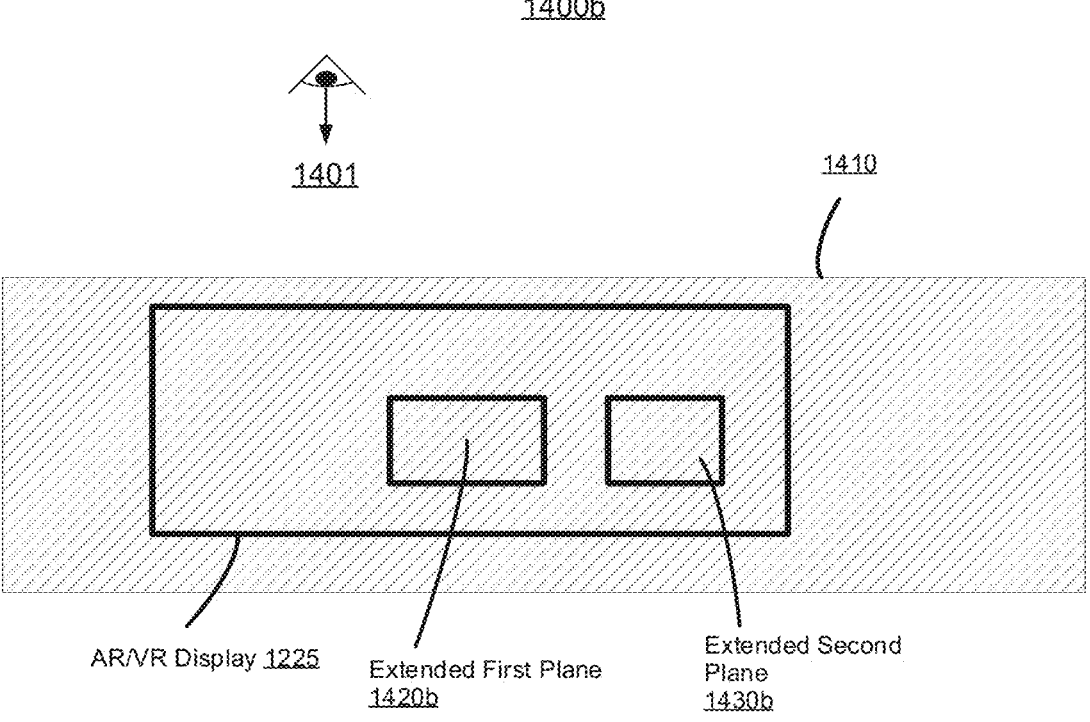

The device identifies (e.g., scans for) a third set of pixels 1440a proximate to the first set of pixels, and a fourth set of pixels 1450a proximate to the second set of pixels. In various embodiments, scanning corresponds to the image sensors sensing light reflecting off of objects in the scene. Based on the sensed light, the image sensors provide pass-through image data to the reminder of the device. As is illustrated in FIG. 14B, the device extends the first plane 1420a to include the third set of pixels 1440a, resulting in an extended first plane 1420b. The device also extends the second plane 1430a to include the fourth set of pixels 1450a, resulting in an extended second plane 1430b. Extending the two planes may be performed according to the implementations described above.

Figure 14C:
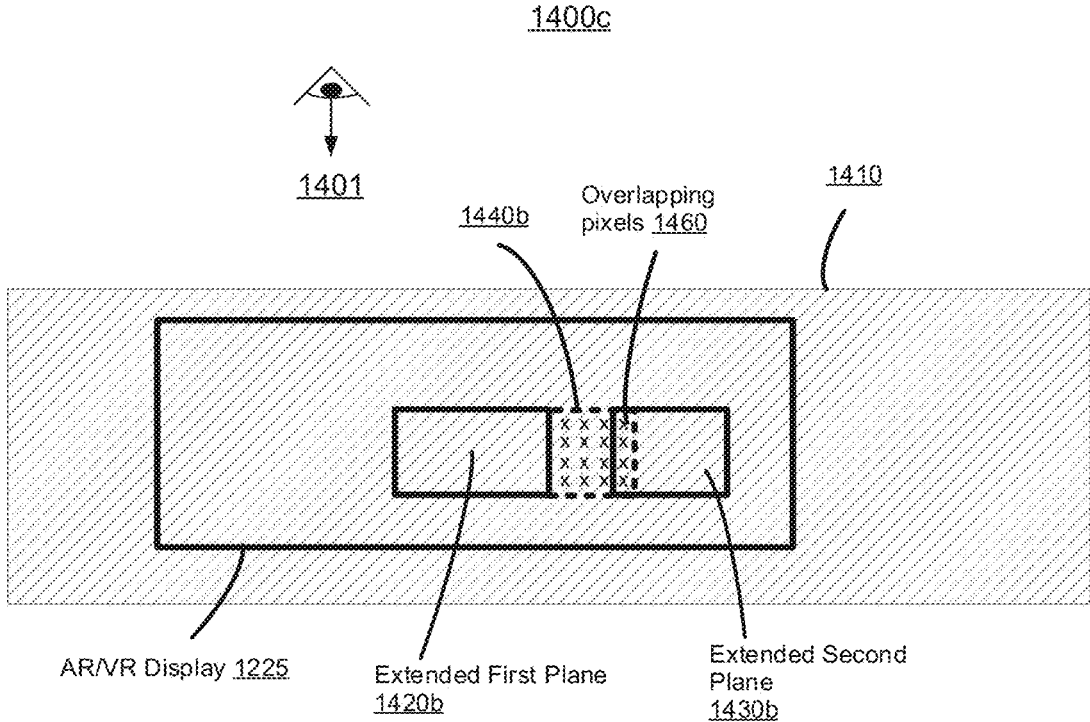

As is illustrated in FIG. 14C, the device scans for and identifies additional pixels 1440b proximate to the extended first plane 1420b that satisfy an object confidence threshold. As the device scans for the additional pixels 1440b, it detects overlap 1460 between the additional pixels 1440b and the extended second plane 1430b. In other words, the device detects a contiguous relationship between the additional pixels 1440 and the extended second plane 1430b.

Figure 14D:
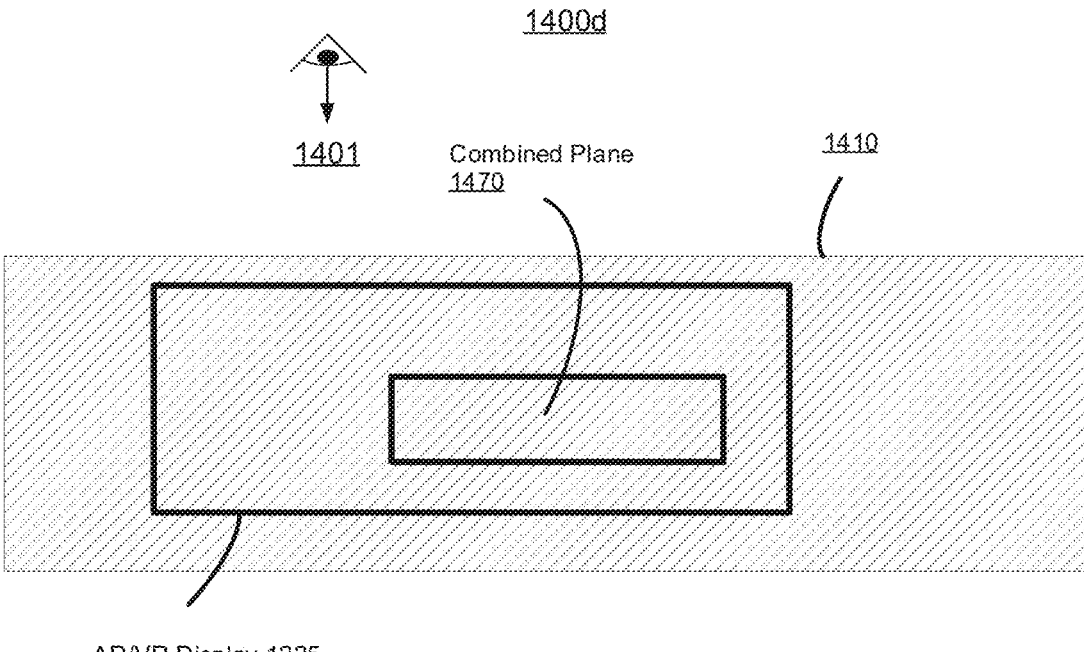
Figure 14E:
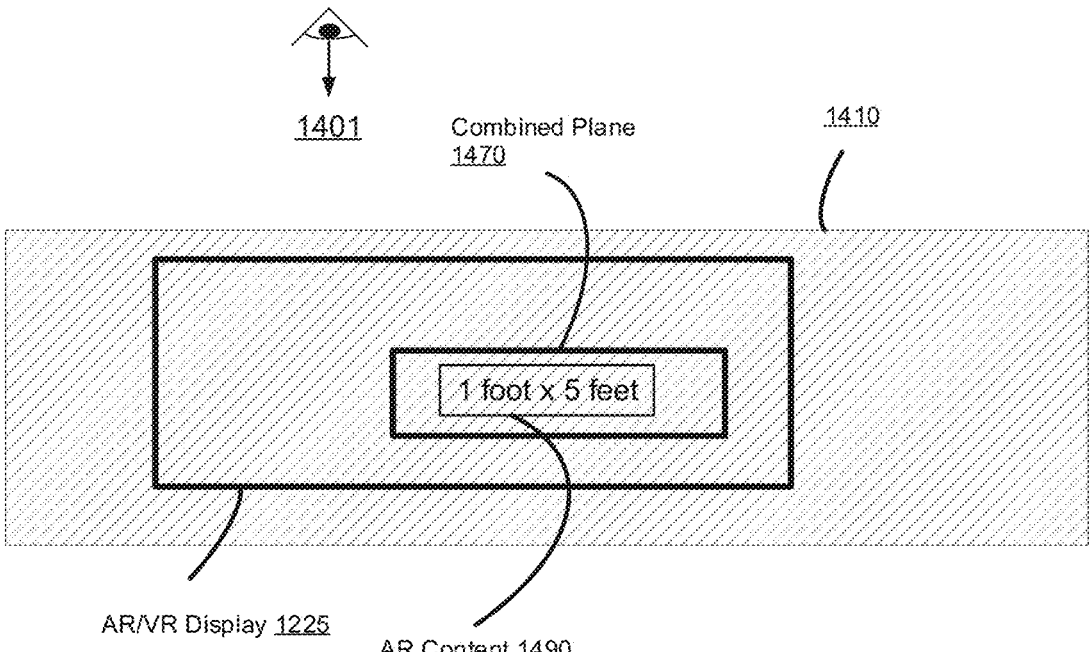

In response to the detecting the overlap 1460, the device foregoes extending the extended first plane 1420b to include the additional pixels 1440 in order to generate an overlapping plane. Instead, as is illustrated in FIG. 14D, the device combines (e.g., consolidates or merges) the extended first plane 1420b, the additional pixels 1440, and the extended second plane 1430b into a single, combined plane 1470. Generating a single combined plane 1470 is useful in that it establishes a uniform surface of a particular plane within the field of view of the AR/VR display 1225. For example, in some implementations, while an image sensor of the device is positioned towards a wall, the device scans and combines portions (e.g., pixels) of the wall that satisfy an object confidence threshold. Ultimately, the device determines and displays an outline of the wall (e.g., a rectangle that is 2 feet by 3.5 feet) included within the AR/VR display. In various implementation, the device determines measurements information about the wall based on the outline, such as its area, and displays this information. For example, as is illustrated in FIG. 14E, the device displays AR content 1490 corresponding to the measurement information (e.g., "1 foot×5 feet"). One of ordinary skill in the art will appreciate that the AR content 1490 may correspond to any type of content, measurement or otherwise.

Figure 15:
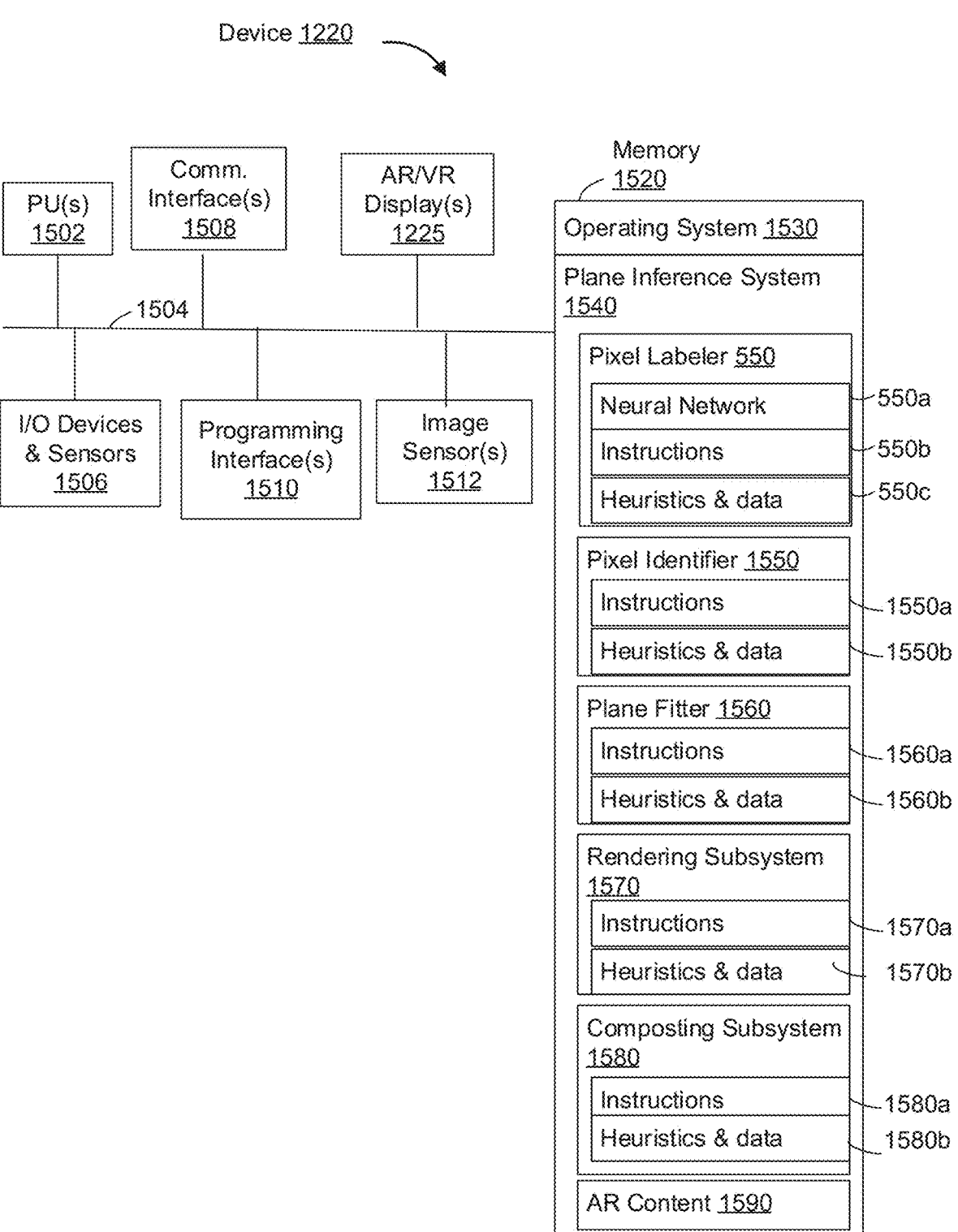
FIG. 15 is an example block diagram of a device according to some implementations.

FIG. 15 is an example block diagram of a device 1220 (e.g., an HMD, mobile device, etc.) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 1220 includes one or more processing units (PU(s)) 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1510, one or more AR/VR displays 1225, one or more optional interior and/or exterior facing image sensors 1512, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more AR/VR displays 1225 are configured to display AR/VR content to the user. In some implementations, the one or more AR/VR displays 1225 are also configured to present flat video content to the user (e.g., a 2-dimensional or "flat" AVI, FLV, WMV, MOV, MP4, or the like file associated with a TV episode or a movie, or live video pass-through of the scene 12201). In some implementations, the one or more AR/VR displays 1225 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more AR/VR displays 1225 correspond to diffractive, reflective, polarized, holographic, etc. waveguide displays. For example, the device 1220 includes a single AR/VR display. In another example, the device 1220 includes an AR/VR display for each eye of the user. In some implementations, the one or more AR/VR displays 1225 are capable of presenting AR and VR content. In some implementations, the one or more AR/VR displays 1225 are capable of presenting AR or VR content.

In some implementations, the one or more image sensors 1512 are configured to provide pass-through image data characterized by a pose associated with a field of view of the one or more image sensors 1512. In some implementations, the one or more image sensors 1512 are included within a device different from the device 1220, and thus the image sensors 1512 are separate from the one or more AR/VR displays 1225. For example, in some implementations, the one or more image sensors 1512 reside at an unmanned aerial vehicle (UAV), sometimes referred to as a drone. Continuing with this example, the one or more image sensors 1512 wirelessly provide pass-through image data to the device 1220, and the device 1220 displays, on an AR/VR display 1225 (e.g., goggles or a headset worn by the user), the pass-through image data. In this example, the user of the device 1220 effectively perceives what the remote one or more image sensors are sensing.

In some implementations, the one or more image sensors 1512 are configured to provide image data that corresponds to at least a portion of the face of the user that includes the eyes of the user. For example, the one or more image sensors 1512 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium. In some implementations, the memory 1520 or the non-transitory computer readable storage medium of the memory 1520 stores the following programs, modules and data structures, or a subset thereof including an optional operating system 1530 and a plane inference system 1540. The operating system 1530 includes procedures for handling various basic system services and for performing hardware dependent tasks.

In some implementations, the plane inference system 1540 is configured to infer a feature-limited plane by exploiting pixel characterization vectors (e.g., pixel characterization vectors 410a-410M in FIG. 4). To that end, in various implementations, the plane inference system 1540 includes a (optional) pixel labeler 550, a pixel identifier 1550, a plane fitter 1560, a rendering subsystem 1570, a compositing subsystem 1580, and AR content 1590.

In some implementations, the pixel labeler 550 is configured to provide pixel characterization vectors in order to facilitate pixel identification. To that end, in various implementations, the pixel labeler 550 includes a neural network 550a, instructions and/or logic 550b therefor, and heuristics and metadata 550c therefor.

In some implementations, the pixel identifier 1550 is configured to identify one or more sets of pixels within pass-through image data based on the pixel characterization vectors. To that end, in various implementations, the pixel identifier 1550 includes instructions and/or logic 1550a therefor, and heuristics and metadata 1550b therefor.

In some implementations, the plane fitter 1560 is configured to fit a plane to identified pixels. To that end, in various implementations, the plane fitter 1560 includes instructions and/or logic 1560a therefor, and heuristics and metadata 1560b therefor.

In some implementations, the rendering subsystem 1570 is configured to render AR content 1590 and other content. To that end, in various implementations, the rendering subsystem 1570 includes instructions and/or logic 1570a therefor, and heuristics and metadata 1570b therefor.

In some implementations, the compositing subsystem 1580 is configured to composite rendered AR content with pass-through image data for display on the AR/VR display 1225. To that end, in various implementations, the compositing subsystem 1580 includes instructions and/or logic 1580a therefor, and heuristics and metadata 1580b therefor.

Moreover, FIG. 15 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 15 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 16:
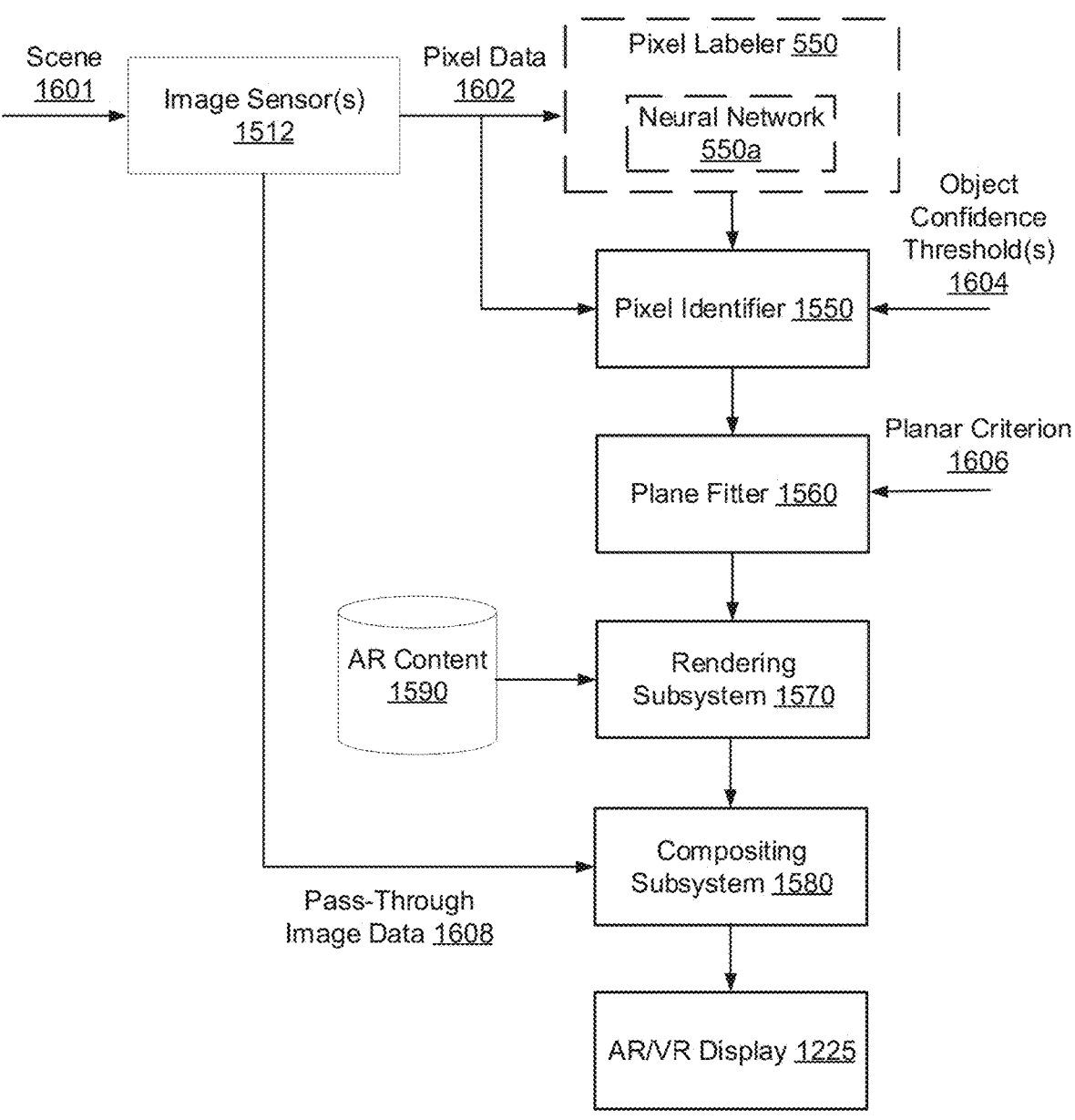
FIG. 16 is an example data flow diagram of a device according to some implementations.

FIG. 16 is an example data flow diagram 1600 of a device (e.g., the device 1220, such as a HMD, mobile device, etc.) according to some implementations. In some implementations, the image sensor 1512 obtains image information associated with a scene 1601. In some implementations, the image sensor(s) 1512 provide pixel data 1602 to the pixel identifier 1550 and the pixel labeler 550. In some implementations, the image sensor 1512 provides pass-through image data 1608 characterized by a pose associated with a field of view of the image sensor 1512 to the compositing subsystem 1580. In some implementations, the pixel data 1602 includes a portion of the pass-through image data 1608. In some implementations, the pixel data 1602 is equivalent to the pass-through image data 1608.

The pixel identifier 1550 identifies, in the pixel data 1602, a first set of pixels associated with a distinguishable set of features. In some implementations, the pixel identifier 1550 provides the first set of pixels to the plane fitter 1560. The plane fitter 1560 fits a first plane to the first set of pixels according to a determination that the first set of pixels satisfy a planar criterion 1606.

The pixel identifier 1550 further identifies a second set of pixels proximate to the first set of pixels. In some implementations, the pixel identifier 1550 obtains pixel characterization vectors (e.g., pixel characterization vectors 410a-410M in FIG. 4) from the pixel labeler 550. Based on the pixel characterization vectors, the pixel identifier 1550 identifies the second set of pixels, wherein pixel characterization vectors for the second set of pixels and pixel characterization vectors for the first set of pixels satisfy an object confidence threshold 1604. In some implementation, the pixel identifier 1550 identifies the second set of pixels on a pixel-by-pixel basis.

In some implementations, the object confidence threshold 1604 is satisfied when a sufficient number of pixel characterization vectors include substantially similar label information. In some implementations, the object confidence threshold 1604 is satisfied when a sufficient number of pixel characterization vectors include substantially similar label information and correspond to pixels that are sufficiently close to each other. For example, the pixel identifier 1550 identifies two pixels that satisfy the object confidence threshold based on the two pixels being within one millimeter of each other and sharing a primary label and first and second sub-labels.

The plane fitter 1560 fits a second plane to the first set of pixels and the second set of pixels, wherein the first plane is coplanar with the second plane. In some implementations, the first plane is coextensive with the second plane. In some implementations, the first plane is disjointed from the second plane. In some implementations, the first plane at least partially overlaps with the second plane.

In some implementations, a rendering subsystem 1570 renders the first and/or second plane based on AR content 1590. For example, in some implementations, the rendering subsystem 1570 renders the second plane as rectangle AR content 1590. In some implementations, the rendering subsystem 1570 renders the first plane and/or the second plane as animated content. For example, the rendering subsystem 1570 renders flashing dotted lines that indicate the perimeter of the first plane.

In some implementations, the compositing subsystem 1580 composites the rendered first plane and/or second plane data with the pass-through image data 1608. In some implementations, the compositing subsystem 1580 provides the composited data to the AR/VR display 1225 to display.

FIG. 17 is flow diagram of a method 1700 of inferring a plane according to some implementations. In various implementations, the method 1700 is performed by a device (e.g., the device 1220). For example, in some implementations, the method 1700 is performed at a mobile device (e.g., tablet, mobile phone, laptop), HMD (e.g., AR/VR headset), etc. Briefly, the method 1700 includes inferring first and second planes based on a comparison between labels of characterization vectors of corresponding pixels.

As represented by block 1710, the method 1700 includes identifying, in pass-through image data characterized by a pose associated with a field of view of an image sensor, a first set of pixels associated with a distinguishable set of features. In some implementations, the distinguishable features include features of pixels of a plane that are different from features of the majority of pixels of the plane. In some implementations, the distinguishable features are sufficiently different from other pixels, such as being a color that is at least 10% darker than pixels within a 1 inch radius.

In various implementations, the image sensor is separate from the device, and thus the image sensor is separate from an AR/VR display of the device (e.g., AR/VR display 1225). For example, in some implementations, the image sensor resides at an unmanned aerial vehicle (UAV), sometimes referred to as a drone. Continuing with this example, the image sensor wirelessly provides pass-through image data to the device, and the device displays, on the AR/VR display (e.g., goggles or a headset worn by the user), the pass-through image data. In this example, the user of the device effectively perceives what the remote image sensor is sensing.

As represented by block 1710a, in some implementations, the method 1700 includes obtaining, from the image sensor, the pass-through image data. In some implementations, the pass-through image data corresponds to a first image frame. In some implementation, the pass-through image data corresponds to optical information.

As represented by block 1720, the method 1700 includes fitting a first plane to the first set of pixels according to a determination that the first set of pixels satisfy a planar criterion. In some implementations, the planar criterion is satisfied if the first set of pixels corresponds to a planar object, such as a wall, table. For example, the first set of pixels corresponds to a line pattern that matches a table.

In some implementations, in accordance with a determination that the first set of pixels satisfy the planar criterion, the method 1700 continues to block 1730. In some implementations, in accordance with a determination that the first set of pixels does not satisfy the planar criterion, the method 1700 goes back to block 1710.

As represented by block 1730, the method 1700 includes fitting a first plane to the first set of pixels according to a determination that the first set of pixels satisfy the planar criterion. In some implementations, the first plane is indicative of a 2D grid of pixels.

As represented by block 1740, the method 1700 includes obtaining pixel characterization vectors (e.g., pixel characterization vectors 410a-410M in FIG. 4) for pixels in the pass-through image data. In some implementations, the pixel characterization vectors are generated by a machine learning process. In some implementations, the device obtains pixel characterization vectors for all pixels in the pass-through image data. In some implementations, the device obtains pixel characterization vectors for a subset of pixels in the pass-through image data. For example, in some implementations, the device obtains pixel characterization vectors for pixels within a certain distance (e.g., radius) from a predetermined pixel (e.g., the pixel corresponding to the center of the field of view of the image sensor). As another example, in some implementations, the device obtains pixel characterization vectors for pixels within a certain distance (e.g., radius) of a pixel corresponding to an identified object or a feature thereof.

As represented by block 1740a, each pixel characterization vector includes one or more labels. In some implementations, the pixel characterization vectors provide labels for each pixel. For example, in some implementations, a label is associated with an object and/or a feature thereof (e.g., table, chair, corner, edge, wall, TV etc.). In some implementations, each pixel characterization vector includes multiple labels, such as a primary label (e.g., couch) and one or more sub-labels (e.g., leather, brown).

As represented by block 1740b, in some implementations, the pixel characterization vectors are obtained from a pixel labeler (e.g., pixel labeler 550 in FIG. 15). In various implementations, the pixel labeler corresponds to a machine learning system, such as a deep learning neural network system. In some implementations, the pixel labeler corresponds to a machine learning segmentation system. In some implementations, the pixel labeler selects an object model among a plurality of object models and compares the object model to the pixel in order to generate the pixel characterization vectors for the pixel. In some implementations, object models corresponding to sufficiently relevant objects are used for selection. For example, in response to determining that the scene corresponds to a kitchen, object models corresponding to objects commonly found in a kitchen, such as a refrigerator, cabinets, stoves, etc. are utilized. On the other hand, irrelevant object models, such as those corresponding to rocks and trees, are not utilized. In some implementations, the device receives user inputs specifying particular object models, and the device in turn focuses on these models. For example, the device receives a user input requesting chairs, so the system focuses on chair models.

As represented in block 1750, the method 1700 includes identifying a second set of pixels proximate to the first set of pixels. The pixel characterization vectors for the second set of pixels and pixel characterization vectors for the first set of pixels satisfy an object confidence threshold. In some implementations, the object confidence threshold is satisfied if the corresponding labels for the first and second sets of pixels are sufficiently similar to each other. In some implementations, the device scans outwards from an origin point that is proximate to the first set of pixels until the device locates the second set of pixels. In various embodiments, scanning corresponds to the image sensors sensing light reflecting off of objects in the scene. Based on the sensed light, the image sensors provide pass-through image data to the reminder of the device.

In some implementations, in accordance with a determination that the pixel characterization vectors for the second set of pixels and pixel characterization vectors for the first set of pixels satisfy the object confidence threshold, the method 1700 continues to block 1760. On the other hand, in some implementations, in accordance with a determination that the pixel characterization vectors for the second set of pixels and pixel characterization vectors for the first set of pixels does not satisfy the object confidence threshold, the method 1700 foregoes fitting the second plane and goes back to block 1750.

As represented by block 1760, the method 1700 includes fitting a second plane to the first set of pixels and the second set of pixels. As represented by block 1760a, the first plane is coplanar with the second plane.

As represented by block 1770, in some implementations, the method 1700 includes displaying, on the display, augmented reality (AR) content overlaid on the first and second planes. In some implementations, the AR content is displayed without user intervention. In some implementations, the AR content is displayed based on user input. For example, the device receives user inputs specifying a 5 feet×5 feet outline and consequently displays an outline of the same (e.g., substantially the same) dimensions. In some implementations, the AR content includes outlines (e.g., perimeter) of the first and/or second planes. In some implementations, the AR content corresponds to measurement information about the first and/or second planes (e.g., AR content 1490 in FIG. 14E). In some implementations, the AR content identifies important points on the plane, such as the midpoint of a wall. In some implementations, the AR content includes content within the first and/or second planes (e.g., AR content 1390 in FIG. 13D).

Figure 18:
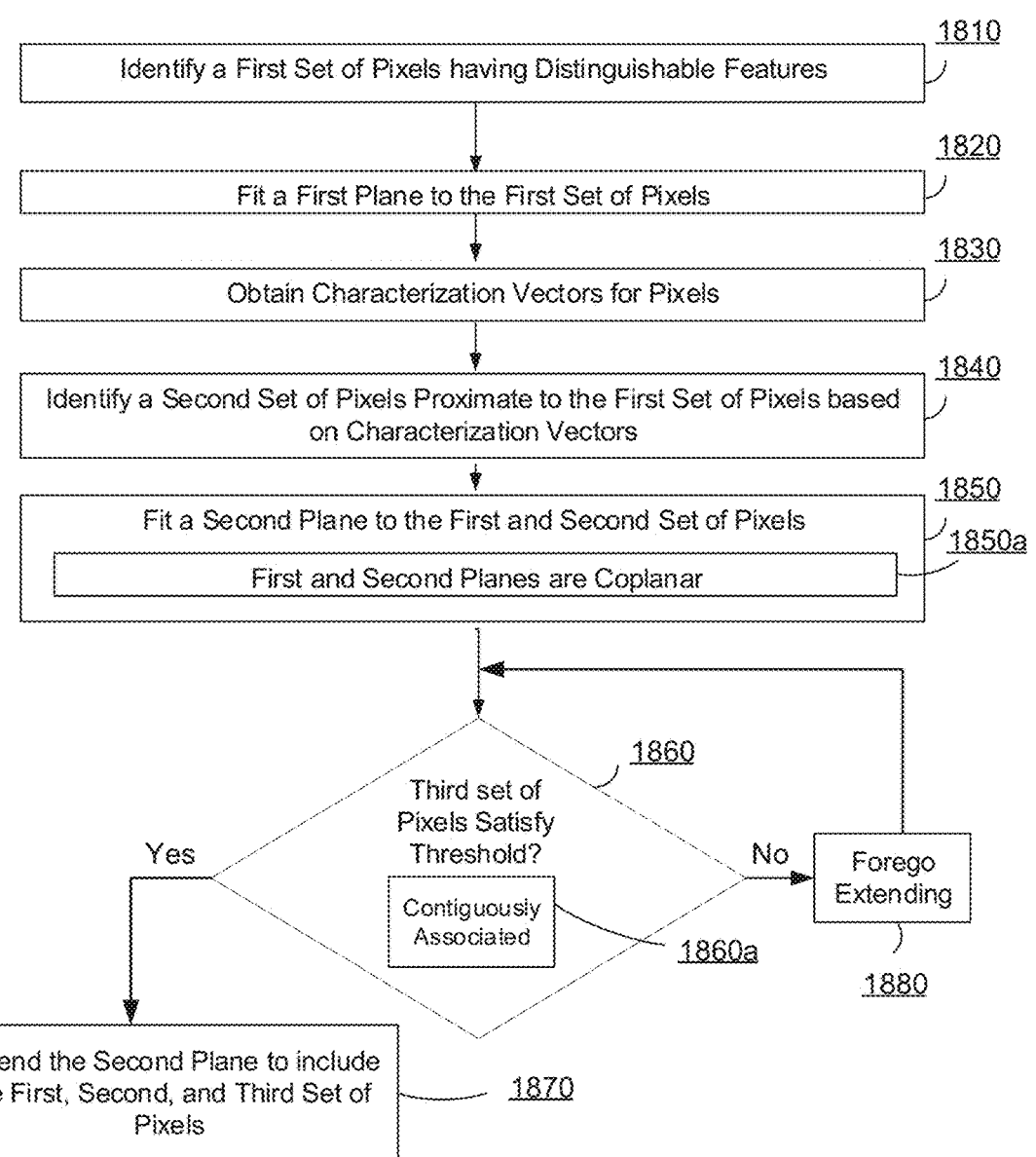
FIG. 18 is a flow diagram of a method of extending a plane according to some implementations.

FIG. 18 is a flow diagram of a method 1800 of extending a plane according to some implementations. In various implementations, the method 1800 is performed by a device (e.g., the device 1220). For example, in some implementations, the method 1800 is performed at a mobile device (e.g., tablet, mobile phone, laptop), HMD (e.g., AR/VR headset), etc. Briefly, the method 1800 includes extending a plane so as to encompass pixels proximate to the plane.

As represented by block 1810, the method 1800 includes identifying, in pass-through image data characterized by a pose associated with a field of view of an image sensor, a first set of pixels associated with a distinguishable set of features. As represented by block 1820, the method 1800 includes fitting a first plane to the first set of pixels according to a determination that the first set of pixels satisfy a planar criterion.

As represented by block 1830, the method 1800 includes obtaining pixel characterization vectors for pixels in the pass-through image data, wherein each of the pixel characterization vectors includes one or more labels. As represented in block 1840, the method 1800 includes identifying a second set of pixels proximate to the first set of pixels. The pixel characterization vectors for the second set of pixels and pixel characterization vectors for the first set of pixels satisfy a first object confidence threshold.

As represented by block 1850, the method 1800 includes fitting a second plane to the first set of pixels and the second set of pixels. As represented by block 1850a, the first plane is coplanar with the second plane.

As represented by block 1860, in some implementations, the method 1800 includes identifying a third set of pixels. In some implementations, the pixel characterization vectors for the third set of pixels and the pixel characterization vectors for at least one of the first set of pixels or the second set of pixels satisfy a second object confidence threshold. In some implementations, the second object confidence threshold is different from the first object confidence threshold. In some implementations, the second object confidence threshold is the same as the first object confidence threshold.

In some implementations, the third set of pixels is proximate to at least one of the first set of pixels or the second set of pixels. As represented in block 1860a, in some implementations, the third set of pixels is contiguously associated with at least one of the first set of pixels or the second set of pixels.

In some implementations, in accordance with a determination that the pixel characterization vectors for the third set of pixels and the pixel characterization vectors for at least one of the first set of pixels or the second set of pixels satisfy a second object confidence threshold, the method 1800 continues to block 1870. On the other hand, in some implementations, in accordance with a determination that the pixel characterization vectors for the third set of pixels and the pixel characterization vectors for at least one of the first set of pixels or the second set of pixels do not satisfy a second object confidence threshold, the method 1800 goes back to block 1860.

As represented by block 1870, in some implementations, the device extends the second plane to include the first, set, and third sets of pixels. For example, with reference to FIGS. 13B-13C, a third set of pixels is identified as satisfying an object confidence threshold, and accordingly the second plane 1340 is extended to a third plane 1350. The third plane 1350 includes the first set of pixels (not shown), the second set of pixels 1330a, and the third set of pixels 1330b. Containing with this example, the pixel characterization vectors for the first set of pixels, the second set of pixels 1330a, and the third set of pixels 1330b satisfy the second object confident threshold, because all three sets of pixel characterization vectors include primary labels corresponding to a table (e.g., the table 1310), with sub-labels corresponding to substantially similar diagonal-patterns.

As represented by block 1880, in some implementations, the method 1800 includes foregoing extending the first and second planes to include the third set of pixels, and going back to block 1860. For example, with reference to FIGS. 13A-13B, certain candidate pixels 1322 located below and to the right of the first plane 1320 are not included within the second plane 1340. Continuing with this example, the pixel characterization vectors for the first set of pixels and the second set of pixels 1330b correspond to a table with a coarse-line texture, whereas the pixel characterization vectors for the certain candidate pixels 1322 correspond to the table with a fine-line texture.

Figure 19:
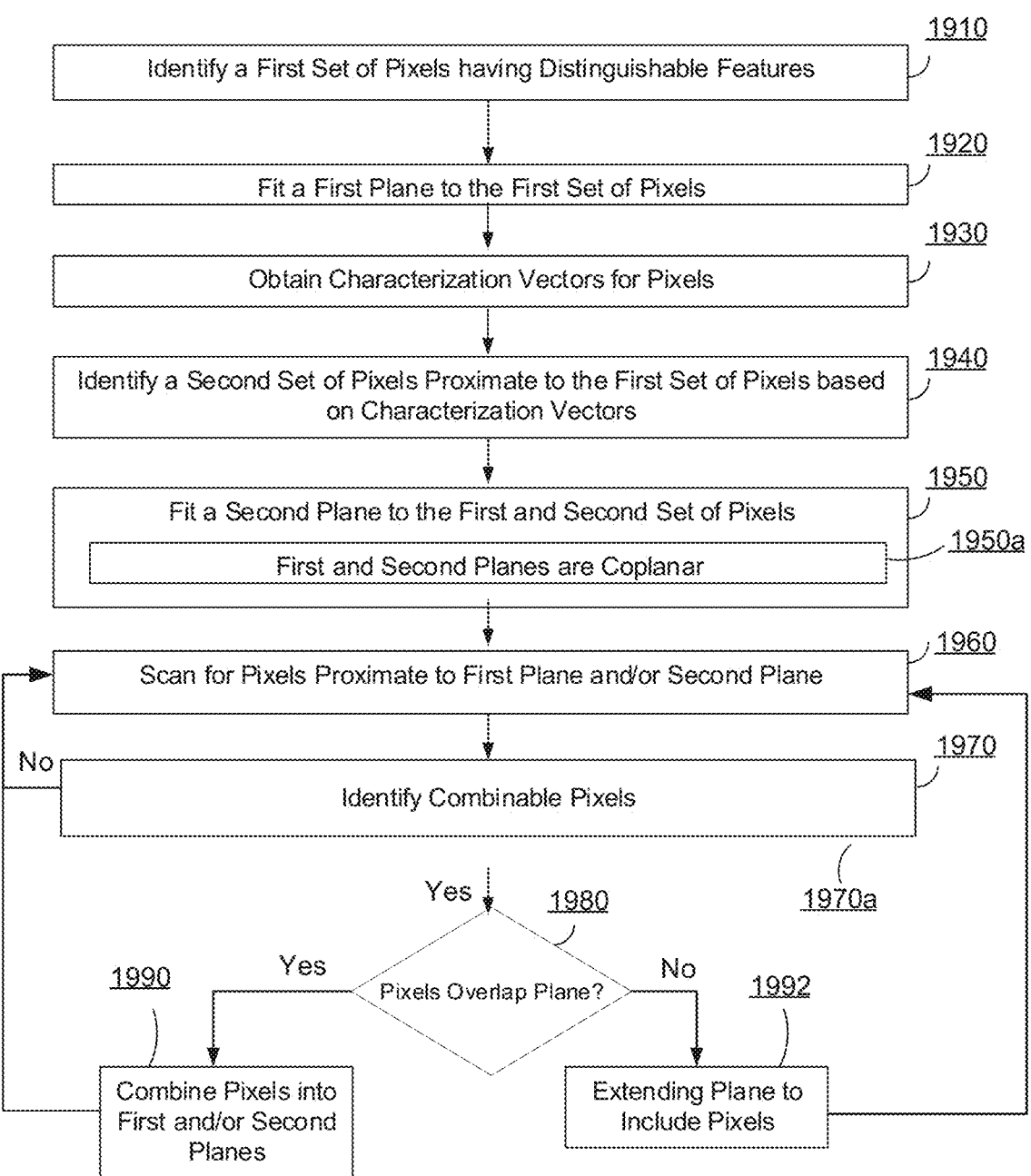
FIG. 19 is a flow diagram of a method of pixel scanning for combining planes according to some implementations.

FIG. 19 is a flow diagram of a method 1900 of pixel scanning for combining planes according to some implementations. In various implementations, the method 1900 is performed by a device (e.g., the device 1220). For example, in some implementations, the method 1900 is performed at a mobile device (e.g., tablet, mobile phone, laptop), HMD (e.g., AR/VR headset), etc. Briefly, the method 1900 includes scanning for pixels proximate to fitted planes in order to locate similar (e.g., combinable) planes with which to combine. Combining planes provides other, cooperating applications with a fuller picture of a scene, and in some instances provides the entirety of a plane (e.g., the entire surface of a table). In various embodiments, scanning corresponds to the image sensors sensing light reflecting off of objects in the scene. Based on the sensed light, the image sensors provide pass-through image data to the reminder of the device.

As represented by block 1910, the method 1900 includes identifying, in pass-through image data characterized by a pose associated with a field of view of an image sensor, a first set of pixels associated with a distinguishable set of features. As represented by block 1920, the method 1900 includes fitting a first plane to the first set of pixels according to a determination that the first set of pixels satisfy a planar criterion.

As represented by block 1930, the method 1900 includes obtaining pixel characterization vectors for pixels in the pass-through image data, wherein each of the pixel characterization vectors includes one or more labels. As represented in block 1940, the method 1900 includes identifying a second set of pixels proximate to the first set of pixels. The pixel characterization vectors for the second set of pixels and pixel characterization vectors for the first set of pixels satisfy a first object confidence threshold.

As represented by block 1950, the method 1900 includes fitting a second plane to the first set of pixels and the second set of pixels. As represented by block 1950a, the first plane is coplanar with the second plane.

As represented by block 1960, in some implementations, the method 1900 includes scanning for candidate pixels proximate to the first plane and/or the second plane. In some implementations, the candidate pixels are contiguously associated with the first plane and/or the second plane.

As represented by block 1970, in some implementations, the method 1900 includes identifying combinable pixels among the candidate pixels. In accordance with a determination that the pixel characterization vectors for the combinable pixels and the pixel characterization vectors for at least one of the first set of pixels or the second set of pixels satisfy a second object confidence threshold, the method 1900 continues to block 1980. In accordance with a determination that the pixel characterization vectors for the combinable pixels do not satisfy the second object confidence threshold, the method 1900 goes back to block 1960. In some implementations, the second object confidence threshold is different from the first object confidence threshold. In some implementations, the second object confidence threshold is the same as the first object confidence threshold.

For example, with reference to FIGS. 14C, the additional pixels 1440b are proximate to the first set of pixels (beneath the extended first plane 1420b) and to the second set of pixels (beneath the extended second plane 1430b). Continuing with this example, in some implementations, the pixel characterization vectors for the additional pixels 1440b and for the first set of pixels satisfy the second object threshold because they both include a primary label indicating a wall and a sub-label indicating the color red. In some implementations, the pixel characterization vectors for the additional pixels 1440b and for the second set of pixels satisfy the second object threshold because they both include a primary label indicating a floor and a sub-label indicating a carpet. In some implementations, the pixel characterization vectors for the additional pixels 1440b, for the first set of pixels, and for the second set of pixels satisfy the second object threshold because they all include a primary label indicating a floor and a sub-label indicating a carpet.

As represented by block 1980, in some implementations, the method 1900 includes determining whether to combine the combinable pixels with the first and/or second planes (e.g., combined plane 1470 in FIG. 14D) based on one or more overlap criteria. In accordance with a determination that the one or more overlap criteria are satisfied, the method 1900 continues to block 1990. In accordance with a determination that the one or more overlap criteria are not satisfied, the method 1900 continues to block 1992.

In some implementations, the one more overlap criteria are satisfied if a first threshold number of the combinable pixels are inside the first plane and/or second plane. For example, with reference to FIGS. 14C-14D, the one or more overlap criteria are satisfied because a threshold number (e.g., more than 50%) of the overlapping pixels 1460 are included within the extended second plane 1430b. In some implementations, the one more overlap criteria are satisfied if a second threshold number of the combinable pixels are within a third threshold distance from the first plane and/or second plane. For example, with reference to FIG. 14A, in some implementations, the third pixels 1440a are combined into the second plane 1430a (or vice versa) because enough of the third pixels are sufficiently close to the second plane 1430a.

As represented by block 1990, in some implementations, the method 1900 includes combining the combinable pixels into the first and/or second planes. In other words, extending the first and/or second planes in order to include the combinable pixels. The method 1900 continues to block 1960.

As represented by block 1992, in some implementations, the method 1900 includes extending the plane in which the combinable pixels reside and not combining the plane with another plane. For example, with reference to FIGS. 14A-14B, the first plane 1420a, which is proximate to the third set of pixels 1440a, is extended in order to include the third set of pixels 1440a. The method 1900 continues to block 1960.

Figure 20A:
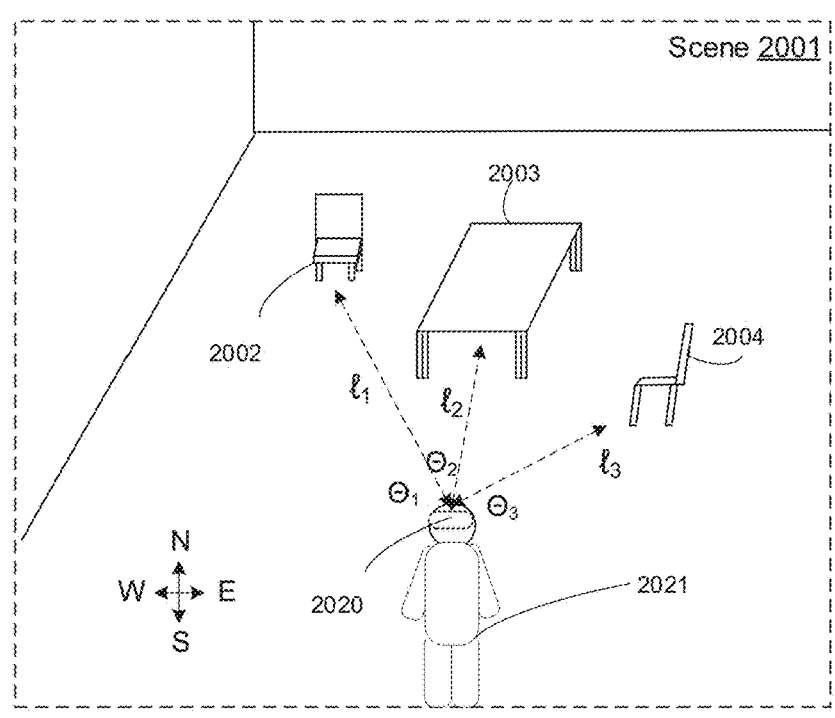
Figure 20B:
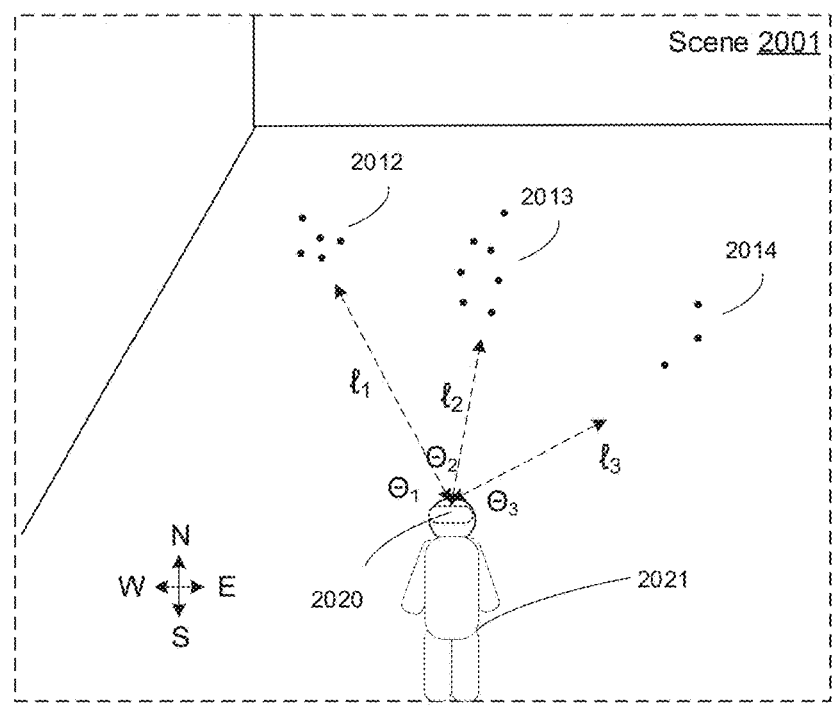

FIGS. 20A-201 are examples of pertinent steps in a method of generating a two-dimensional (2D) floorplan from multiple perspectives (e.g., poses) associated with a scene 2001 according to some implementations. FIGS. 20A-20B are an example of generating a group of points of a three-dimensional (3D) point cloud for the scene 2001 according to a first pose 2000a. The scene 2001 includes a first chair 2002, a table 2003, and a second chair 2004. A user 2021 in the scene 2001 is associated with (e.g., wearing) a device 2020. In some implementations, the device 2020 corresponds to a mobile device (e.g., tablet, laptop, mobile phone, etc.). In some implementations, the device 1220 corresponds to a HMD. The device 2020 includes an AR/VR display 2025 (not shown) positioned in the first pose 2000a, with a field of view including the first chair 2002, table 2003, and second chair 2004. The first pose 2000a corresponds to one or more image sensors of the device 2020 facing substantially northwards, as in indicated by the compass in FIG. 20A.

The one or more image sensors of the device 2020 are associated with a field of view including the first chair 2002 according to a first length $l_1$ and a first angle $\Theta_1$. The first length $l_1$ corresponds to a distance between the device 2020 and the first chair 2002. The first angle $\Theta_1$ corresponds to an approximate line of sight angle between the device 2020 and the first chair 2002 relative to a reference plane.

The one or more image sensors of the device 2020 are associated with a field of view including the table 2003 according to a second length $l_2$ and a second angle $\Theta_2$. The second length $l_2$ corresponds to a distance between the device 2020 and the table 2003. The second angle $\Theta_2$ corresponds to an approximate line of sight angle between the device 2020 and the table 2003 relative to a reference plane.

The one or more image sensors of the device 2020 are associated with a field of view including the second chair 2004 according to a third length $l_3$ and a third angle $\Theta_3$. The third length $l_3$ corresponds to a distance between the device 2020 and the second chair 2004. The third angle $\Theta_3$ corresponds to an approximate line of sight angle between the device 2020 and the second chair 2004 relative to a reference plane.

According to various implementations, the device 2020 presents AR/VR content to the user while the user is not virtually and/or physically present within the scene 2001. In various implementations, one or more image sensors are included within a first device that is separate from a second device that includes the AR/VR display 2025. In other words, the one or more image sensors are not collocated with the AR/VR display 2025. For example, in some implementations, the one or more image sensors and the AR/VR display 2025 are located within different scenes. As an example, in some implementation and with reference to FIG. 8, the AR/VR display 2025 and the image sensors are located in different scenes.

The device 2020 generates, from pass-through image data characterized by a plurality of poses of a space, a three-dimensional (3D) point cloud for the space. Each of the plurality of poses of the space is associated with a respective field of view of the one or more image sensors. With reference to FIG. 20A, the device 2020 generates, from pass-through image data characterized by the first pose 2000a, a group of points of the 3D point cloud for the scene 2001. In some implementations, the pass-through image data characterized by a pose is obtained from the one or more image sensors of the device 2020.

As is illustrated in FIG. 20B, the group of points includes three subgroups of points: a first subgroup 2012, a second subgroup 2013, and a third subgroup 2014 corresponding to the first chair 2002, table 2003, and second chair 2004, respectively. For example, the third subgroup of points 2014 corresponds to points of the second chair 2004, and therefore roughly resembles the same shape as the second chair 2004. As is illustrated in FIG. 20B, the 3D point cloud does not include the ground or the walls. In some implementations, the 3D point cloud includes the ground and/or the walls. In some implementations, the device generates 3D point clouds based on user inputs specifying particular object(s) and/or features thereof. In some implementations, the device 2020 generates 3D point clouds for predetermined portions of the scene 2001. For example, in some implementations, the device generates 3D point clouds for tables, but not walls, because the device receives user input specifying vertical planes, such as walls.

Figure 20C:
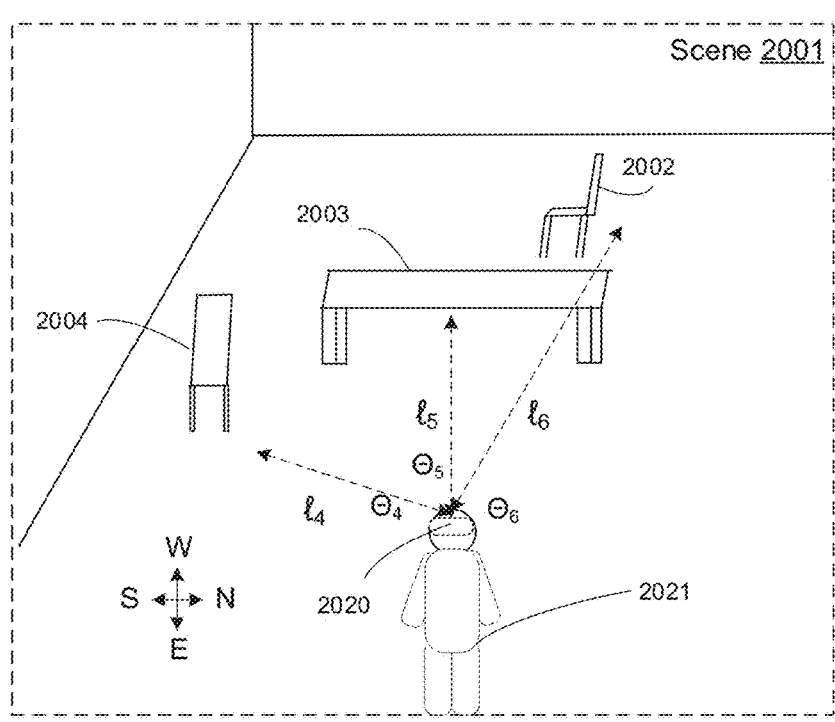
Figure 20D:
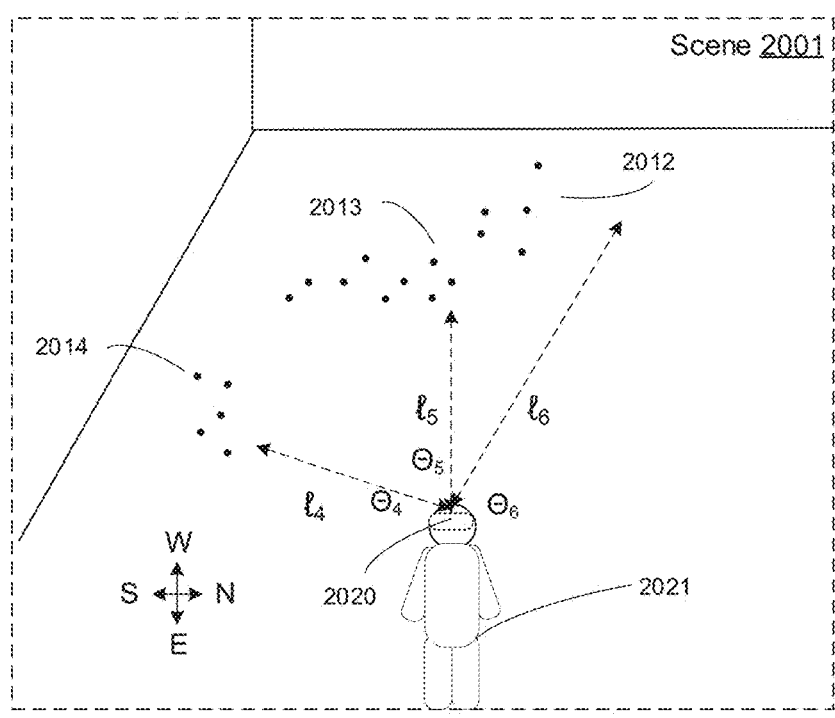

FIGS. 20C-20D are an example of growing the group of points of the 3D point cloud in the scene 2001 according to a second pose 2000c different from the first pose 2000a. The transition between the first pose 2000a and the second pose 2000c corresponds to the device 2020 moving in the northeast direction and having changed positioned (e.g., orientation or perspective) of the one or more image sensors to be facing substantially westwards. Recall that according to the first pose 2000a, the one or more images sensors face substantially northwards.

With reference to FIG. 20C, the one or more image sensors of the device 2020 are associated with a field of view including the second chair 2004 according to a fourth length $l_4$ and a fourth angle $\Theta_4$. The fourth length $l_4$ corresponds to a distance between the device 2020 and the second chair 2004. The fourth angle $\Theta_4$ corresponds to an approximate line of sight angle between the device 2020 and the second chair 2004 relative to a reference plane.

The one or more image sensors of the device 2020 are associated with a field of view including the table 2003 according to a fifth length $l_5$ and a fifth angle $\Theta_5$. The fifth length $l_5$ corresponds to a distance between the device 2020 and the table 2003. The fifth angle $\Theta_5$ corresponds to an approximate line of sight angle between the device 2020 and the table 2003 relative to a reference plane.

The one or more image sensors of the device 2020 are associated with a field of view including the first chair 2002 according to a sixth length $l_6$ and a sixth angle $\Theta_6$. The sixth length $l_6$ corresponds to a distance between the device 2020 and the first chair 2002. The sixth angle $\Theta_6$ corresponds to an approximate line of sight angle between the device 2020 and the first chair 2002 relative to a reference plane.

From pass-through image data characterized by the second pose 2000c, the device 2020 grows (e.g., increases the number of) the group of points of the 3D point cloud for the scene 2001. Comparing FIGS. 20B and 20D, the three subgroups of points 2012-2014 of the 3D point cloud have grown in size, and therefore each includes additional points. In other words, the three subgroups of points 2012-2014 in FIG. 20D each corresponds to a superset of the corresponding subgroup of points in FIG. 20B. This growth results from the device 2020 gathering additional points based on the additional perspective (e.g., the second pose 2000c). In other words, exposing the one or more image sensors to the second pose 2000c, in addition to the first pose 2000a, provides the device 2020 with additional pass-through image data from which to generate additional points of the 3D point cloud. In some implementations, all of the subgroups of points grow in size because of a pose change. In some implementations, fewer than all of the subgroups of points grow in size because of a pose change.

Figure 20E:
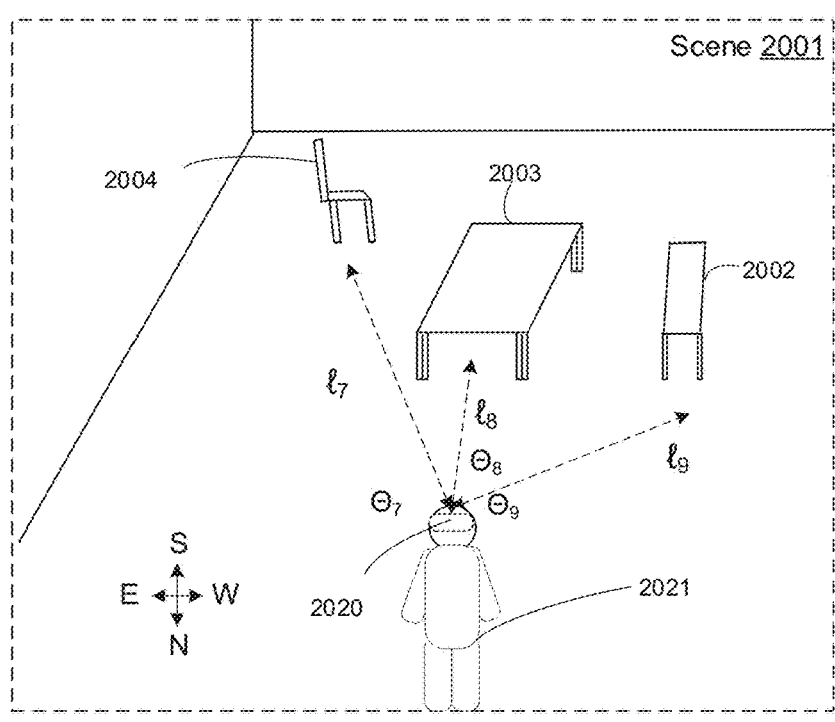
Figure 20F:
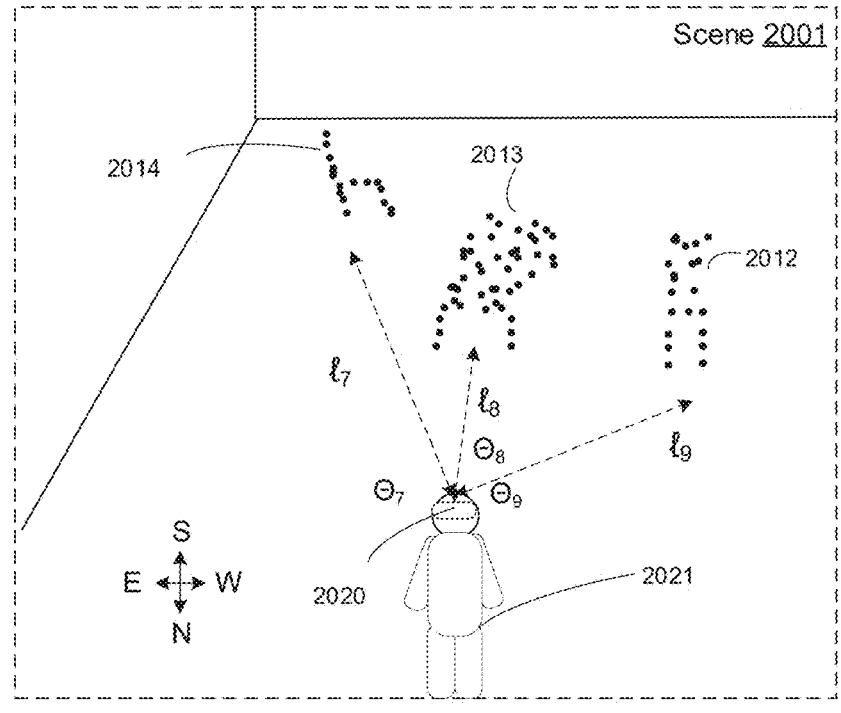

FIGS. 20E-20F are an example of growing the group of points of 3D point cloud in the scene 2001 according to a third pose 2000e different from the first pose 2000a and the second pose 2000c. The transition between the second pose 2000c and the third pose 2000e corresponds to the device 2020 moving in the northeast direction and having changed positioned (e.g., orientation or perspective) of the one or more image sensors to be facing substantially southwards.

With reference to FIG. 20E, the one or more image sensors of the device 2020 are associated with a field of view including the second chair 2004 according to a seventh length $l_7$ and a seventh angle $\Theta_7$. The seventh length $l_7$ corresponds to a distance between the device 2020 and the second chair 2004. The seventh angle $\Theta_7$ corresponds to an approximate line of sight angle between the device 2020 and the second chair 2004 relative to a reference plane.

The one or more image sensors of the device 2020 are associated with a field of view including the table 2003 according to an eighth length $l_8$ and a eighth angle $\Theta_8$. The eighth length $l_8$ corresponds to a distance between the device 2020 and the table. The eighth angle $\Theta_8$ corresponds to an approximate line of sight angle between the device 2020 and the table 2003 relative to a reference plane.

The one or more image sensors of the device 2020 are associated with a field of view including the first chair 2002 according to a ninth length $l_9$ and a ninth angle $\Theta_9$. The ninth length $l_9$ corresponds to a distance between the device 2020 and the first chair 2002. The ninth angle $\Theta_9$ corresponds to an approximate line of sight angle between the device 2020 and the first chair 2002 relative to a reference plane.

In some implementations, at least one of the first length $l_1$, second length $l_2$, third length $l_3$, fourth length $l_4$, fifth length $l_5$, sixth length $l_6$, seventh length $l_7$, eighth length $l_8$, or the ninth length $l_9$ are equivalent. In some implementations, at least one of the first length $l_1$, second length $l_2$, third length $l_3$, fourth length $l_4$, fifth length $l_5$, sixth length $l_6$, seventh length $l_7$, eighth length $l_8$, or the ninth length $l_9$ are different.

In some implementations, at least one of the first angle $\Theta_1$, second angle $\Theta_2$, third angle $\Theta_3$, fourth angle $\Theta_4$, fifth angle $\Theta_5$, sixth angle $\Theta_6$. seventh angle $\Theta_7$, the eighth angle $\Theta_8$, or the ninth angle $\Theta_9$ are equivalent. In some implementations, at least one of the first angle $\Theta_1$, second angle $\Theta_2$, third angle $\Theta_3$, fourth angle $\Theta_4$, fifth angle $\Theta_5$, sixth angle $\Theta_6$. seventh angle $\Theta_7$, the eighth angle $\Theta_8$, or the ninth angle $\Theta_9$ are different.

From pass-through image data characterized by the third pose 2000e, the device 2020 grows (e.g., increase the number of) the group of points of the 3D point cloud for the scene 2001. Comparing FIGS. 20D and 20F, the three subgroups of points 2012-2014 of the 3D point cloud have grown size, and therefore each includes additional points. As is illustrated in FIG. 20F, each of the three subgroups of points 2012-2014 have substantially similar outlines as their respective objects because of the accumulation of the points due the pose changes. For example, the third subgroup 2014 is identifiable as a side-view of a chair (e.g., the second chair 2004).

Figure 20G:
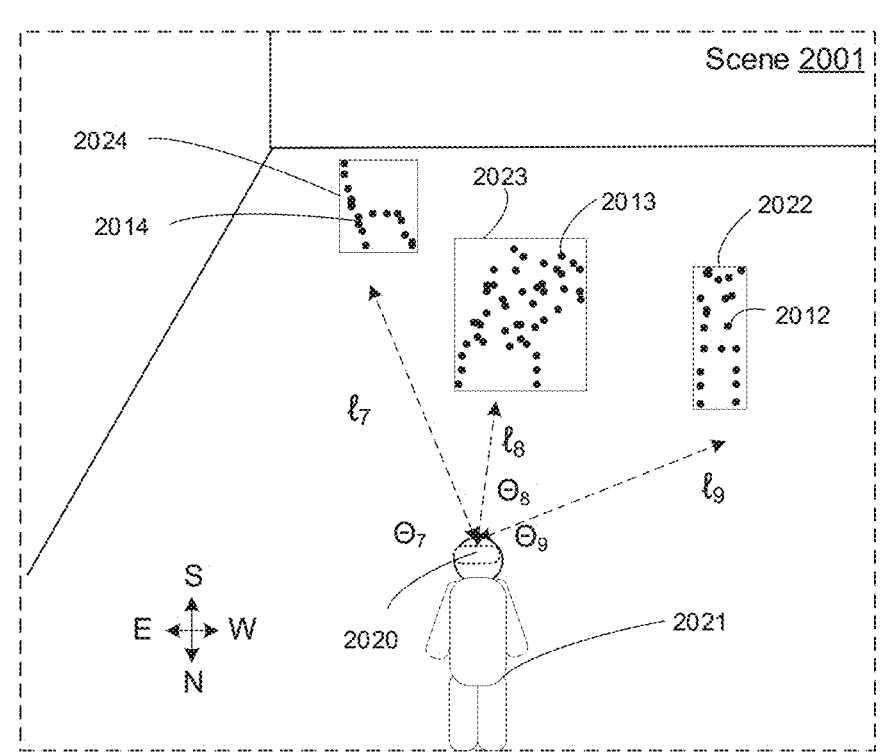

FIG. 20G is an example of generating volumetric regions 2022-2024 for the group of points of the 3D point cloud according to some implementations. In some implementations, the group of points are generated as discussed above with reference to FIGS. 20A-20F.

The device 2020 obtains characterization vectors (e.g., the pixel characterization vectors 410a-410M in FIG. 4) for points of the 3D point cloud. Each of the characterization vectors includes one or more labels. In some implementations, the characterization vectors are obtained from a point labeler, such as the point labeler 2145 in FIG. 21.

The device 2020 disambiguates the group of points from the 3D point cloud. The characterization vectors for the group of points satisfy an object confidence threshold. In some implementations, the object confidence threshold is satisfied if a sufficient number of characterization vectors include sufficiently similar label values. For example, the object confidence threshold is satisfied if a threshold number (e.g., more than 75%) of the characterization vectors for the second subgroup of points 2013 include a primary label indicative of a table, and a secondary label indicative of a glass surface. With reference to FIGS. 20F and 20G, the device 2020 disambiguates, from the 3D point cloud in FIG. 20F, the three subgroups of points 2012-2014 in FIG. 20G. One of ordinary skill in the art will appreciate that disambiguating the group of points from the 3D point cloud may be performed at any point of the 3D point cloud generation process.

The device 2020 generates a volumetric region for the group of points. The volumetric region corresponds to a 3D representation of an object in the space. In some implementations, the device 2020 generates a plurality of volumetric regions corresponding to a plurality of subgroups of points. For example, as is illustrated in FIG. 20G, the device 2020 generates a first volumetric region 2022 for the first subgroup of points 2012, a second volumetric region 2023 for the second subgroup of points 2013, and a third volumetric region 2024 for the third subgroup of points 2014. One of ordinary skill in the art will appreciate that generating volumetric regions may be performed at any point during any of the above describe processes.

Figure 20H:
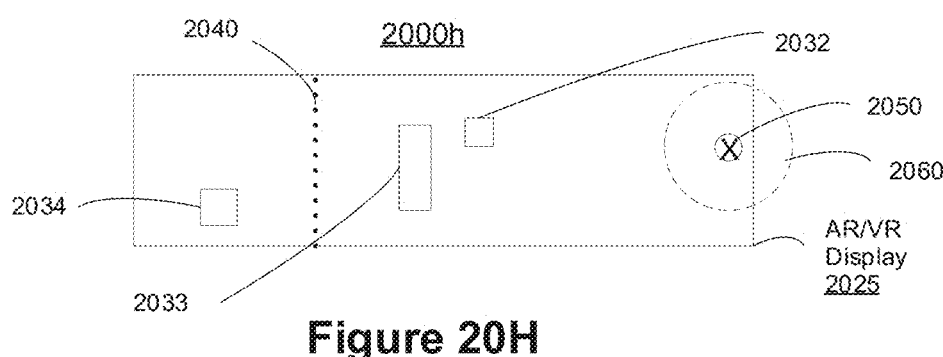

FIG. 20H is an example of synthesizing and (optionally) displaying a two-dimensional (2D) floorplan 2000h of the scene 2001 according to some implementations. The 2D floorplan 2000h corresponds to a virtualized top-down pose of the image sensor associated with the volumetric region. The device 2020 synthesizes a 2D floorplan 2000h. The 2D floorplan includes: a first chair representation 2032 representing the first chair 2002 and associated with the first volumetric region 2022; a table representation 2033 representing the table 2003 and associated with the second volumetric region 2023; and a second chair representation 2034 representing the second chair 2004 and associated with the third volumetric region 2024. One of ordinary skill in the art will appreciate that synthesizing the 2D floorplan may be performed at any point during any of the above describe processes.

In some implementations, the device 2020 disambiguates a second group of points from the 3D point cloud, wherein characterization vectors for the second group of points satisfy the object confidence threshold. In some implementations, the device 2020 generates a second volumetric region for the second group of points, wherein the second volumetric region corresponds to a 3D representation of a second object in the space. In some implementations, the device 2020 resynthesizes the 2D floorplan of the space corresponding to a virtualized top-down pose of the image sensor associated with the volumetric region and the second volumetric region.

In various implementations, the device 2020 displays, on the AR/VR display 2025, the 2D floorplan 2000h, as is illustrated in FIG. 20H. In various implementations, the orientation of the displayed 2D floorplan 2000h matches the current orientation of the image sensors of the device 2020 relative to the scene 2001 (e.g., the current pose). For example, with reference to FIGS. 20G-20H, the orientation of the 2D floorplan 2000h corresponds to the current, third pose 2000e associated with the current field of view of the image sensor(s) of the device 2020. In various implementations, the orientation of the 2D floorplan 2000h is based on a user input. For example, in some implementations, the device 2020 receives a user input requesting that the 2D floorplan 2000h is to be displayed according to a normalized orientation, irrespective of current pose: north pointing upwards, south pointing downwards, west pointing leftwards, and east pointing rightwards. Consequently, the device 2020 displays a normalized 2D floorplan 2000h.

In various implementations, the device 2020 displays a mini-map of the 2D floorplan 2000h. In other words, the device displays a portion of the 2D floorplan 2000h (e.g., a miniature map) corresponding to a virtualized top-down pose of the image sensor associated with a portion of the volumetric region, wherein the portion of the volumetric portion satisfies one or more display criteria. In some implementations, the device receives a user input specifying a particular portion. In various implementations, the displayed portion of the 2D floorplan corresponds to a vertical and/or horizontal area of the 2D floorplan. For example, with reference to FIG. 20H, the device 2020 displays the portion of the 2D floorplan 2000h that is to the left of the distance indicator 2040. Continuing with this example, in some implementations, the device 2020 receives a user input specifying to display the left 30% area of the 2D floorplan 2000h—e.g., approximately the area to the left of the distance indicator 2040.

In various implementations, the portion of 2D floorplan is an area a threshold distance from the image sensor. In some implementations, the threshold distance corresponds to a vertical and/or horizontal area of the 2D floorplan that is a particular distance from the image sensor. In some implementations, the threshold distance corresponds to a radial distance from the location 2050 of the image sensor. For example, with continued reference to FIG. 20H, the AR/VR display 2025 includes the area of the 2D floorplan 2000h that is a particular radial distance 2060 from the location 2050 of the image sensor. In some implementations, the threshold distance is preset.

Figure 20I:
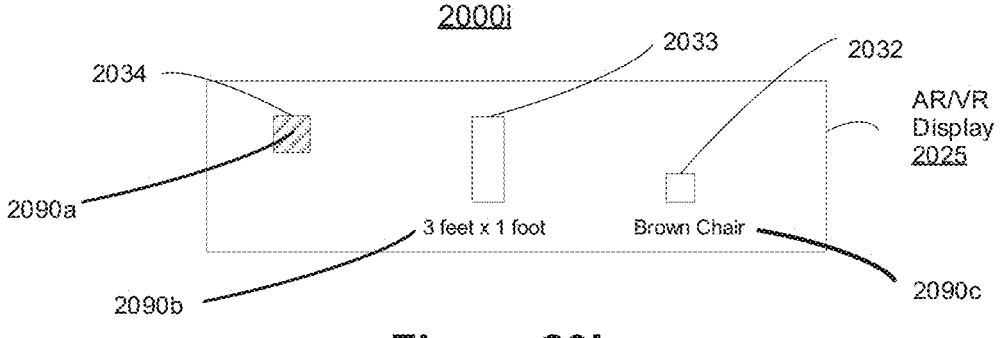

In various implementations, the device 2020 displays, on the AR/VR display 2025, AR content overlaid on the 2D floorplan. In some implementations, the AR content corresponds to content within an object on the 2D floorplan. For example, as is illustrated in FIG. 20I, the device 2020 displays AR content 2090*a* corresponding to a striped pattern within the second chair representation 2034. In various implementations, the AR content corresponds to measurement information about an object(s) and/or a feature thereof, or about the scene itself. In some implementations, the device 2020: computes a measurement associated with the object based on the group of points, and displays a measurement indicator overlaid on the 2D floorplan of the space and proximate to the object. The measurement indicator indicates the measurement associated with the object. For example, as is illustrated in FIG. 20I, the device 2020 displays measurement information 2090*b* corresponding to the dimensions of the table 2003: "3 feet×1 foot."

In some implementations, the AR content corresponds to type or class information associated with an object and/or feature within the scene 2001. For example, as is illustrated in FIG. 20I, the device 2020 displays a "Brown Chair" 2090*c* descriptor.

Figure 21:
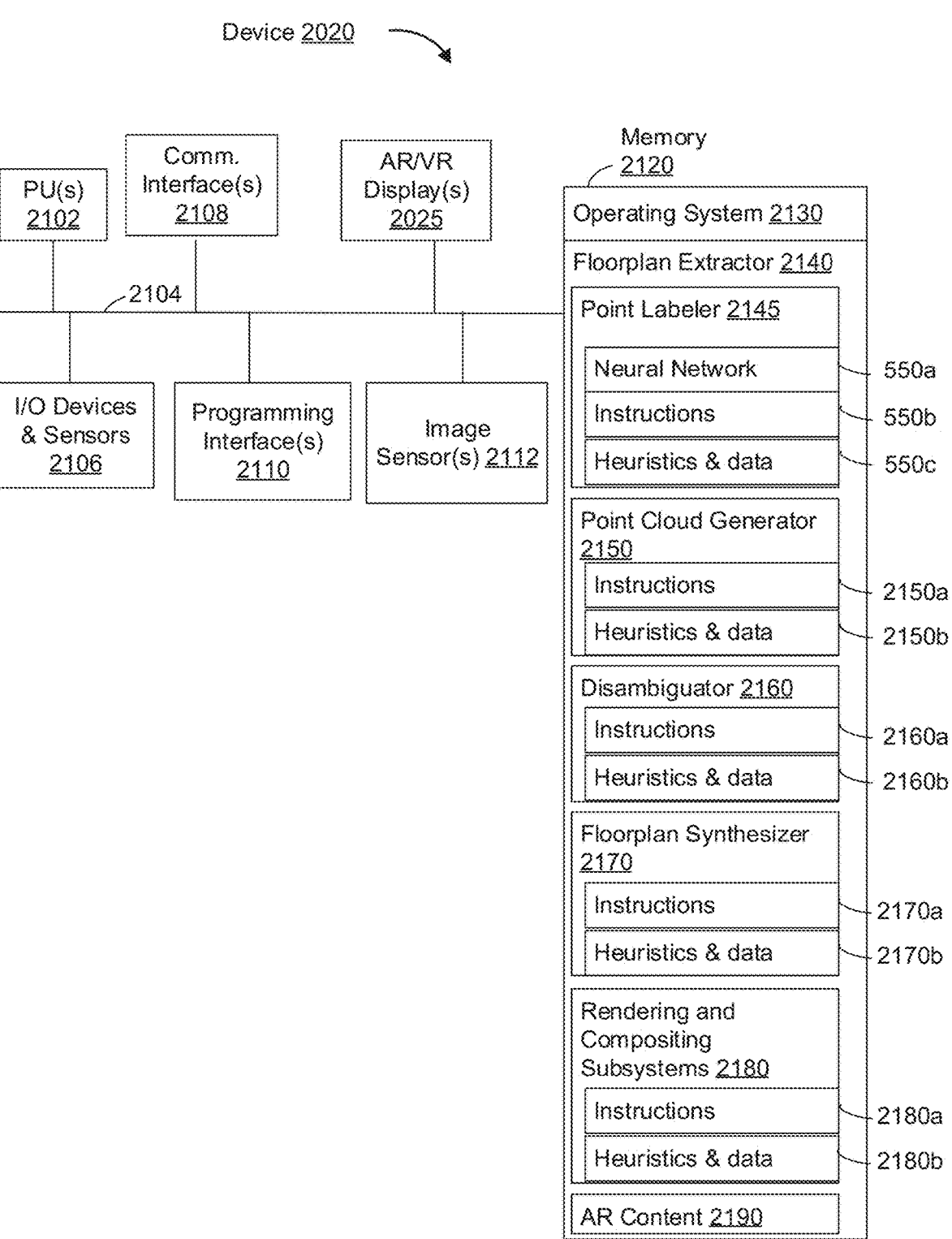
FIG. 21 is an example block diagram of a device according to some implementations.

FIG. 21 is an example block diagram of a device 2020 (e.g., an HMD, mobile device, etc.) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 2020 includes one or more processing units (PU(s)) 2102 (e.g., microprocessors, ASICs, FPGAs, GPUs, CPUs, processing cores, and/or the like), one or more input/output (I/O) devices and sensors 2106, one or more communication interfaces 2108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 2110, one or more AR/VR displays 2025, one or more optional interior and/or exterior facing image sensors 2112, a memory 2120, and one or more communication buses 2104 for interconnecting these and various other components.

In some implementations, the one or more communication buses 2104 include circuitry that interconnects and controls communications between system components. In some implementations, the one or more I/O devices and sensors 2106 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more AR/VR displays 2025 are configured to display AR/VR content to the user. In some implementations, the one or more AR/VR displays 2025 are also configured to present flat video content to the user (e.g., a 2-dimensional or "flat" AVI, FLV, WMV, MOV, MP4, or the like file associated with a TV episode or a movie, or live video pass-through of the scene 2001). In some implementations, the one or more AR/VR displays 2025 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more AR/VR displays 2025 correspond to diffractive, reflective, polarized, holographic, etc. waveguide displays. For example, the device 2020 includes a single AR/VR display. In another example, the device 2020 includes an AR/VR display for each eye of the user. In some implementations, the one or more AR/VR displays 2025 are capable of presenting AR and VR content. In some implementations, the one or more AR/VR displays 2025 are capable of presenting AR or VR content.

In some implementations, the one or more image sensors 2112 are configured to provide pass-through image data characterized by a plurality of poses associated with respective fields of view of the one or more image sensor 2112. In some implementations, the one or more image sensors 2112 are included within a device different from the device 2020, and thus the image sensors 2112 are separate from the one or more AR/VR displays 2025. For example, in some implementations, the one or more image sensors 2112 reside at an unmanned aerial vehicle (UAV), sometimes referred to as a drone. Continuing with this example, the one or more image sensors 2112 wirelessly provide pass-through image data to the device 2020, and the device 2020 displays, on an AR/VR display 2025 (e.g., goggles or a headset worn by the user), the pass-through image data. In this example, the user of the device 2020 effectively perceives what the remote one or more image sensors are sensing.

In some implementations, the one or more image sensors 2112 are configured to provide image data that corresponds to at least a portion of the face of the user that includes the eyes of the user. For example, the one or more image sensors 2112 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

The memory 2120 includes high-speed random-access memory, such as DRAM, SRAM, DDR RAM, or other random-access solid-state memory devices. In some implementations, the memory 2120 includes non-volatile memory, such as one or more magnetic disk storage devices, optical disk storage devices, flash memory devices, or other non-volatile solid-state storage devices. The memory 2120 optionally includes one or more storage devices remotely located from the one or more processing units 2102. The memory 2120 comprises a non-transitory computer readable storage medium. In some implementations, the memory 2120 or the non-transitory computer readable storage medium of the memory 2120 stores the following programs, modules and data structures, or a subset thereof including an optional operating system 2130 and a floorplan extractor 2140. The operating system 2130 includes procedures for handling various basic system services and for performing hardware dependent tasks.

In some implementations, the floorplan extractor 2140 is configured to extract (e.g., generate) a 2D floorplan based on a 3D point cloud and corresponding pixel characterization vectors (e.g., pixel characterization vectors 410*a*-410M in FIG. 4). To that end, in various implementations, the floorplan extractor 2140 includes a (optional) point labeler 2145, a point cloud generator 2150, a disambiguator 2160, a floorplan synthesizer 2170, rendering and compositing subsystems 2180, and AR content 2190.

In some implementations, the point labeler 2145 is configured to provide pixel characterization vectors in order to facilitate pixel identification. To that end, in various implementations, the point labeler 2145 includes a neural network 550a, instructions and/or logic 550b therefor, and heuristics and metadata 550c therefor.

In some implementations, the point cloud generator 2150 is configured to generate a 3D point cloud from pass-through image data. To that end, in various implementations, the point cloud generator 2150 includes instructions and/or logic 2150a therefor, and heuristics and metadata 2150b therefor.

In some implementations, the disambiguator 2160 is configured disambiguate a group of points from the 3D point cloud based on characterization vectors. To that end, in various implementations, the disambiguator 2160 includes instructions and/or logic 2160a therefor, and heuristics and metadata 2160b therefor.

In some implementations, the floorplan synthesizer 2170 is configured to synthesize a 2D floorplan based on volumetric region(s). To that end, in various implementations, the floorplan synthesizer 2170 includes instructions and/or logic 2170a therefor, and heuristics and metadata 2170b therefor.

In some implementations, the rendering and compositing subsystems 2180 are configured to composite rendered AR content with pass-through image data for display on the AR/VR display 2025. To that end, in various implementations, the rendering and compositing subsystems 2180 includes instructions and/or logic 2180a therefor, and heuristics and metadata 2180b therefor.

Moreover, FIG. 21 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 21 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 22:
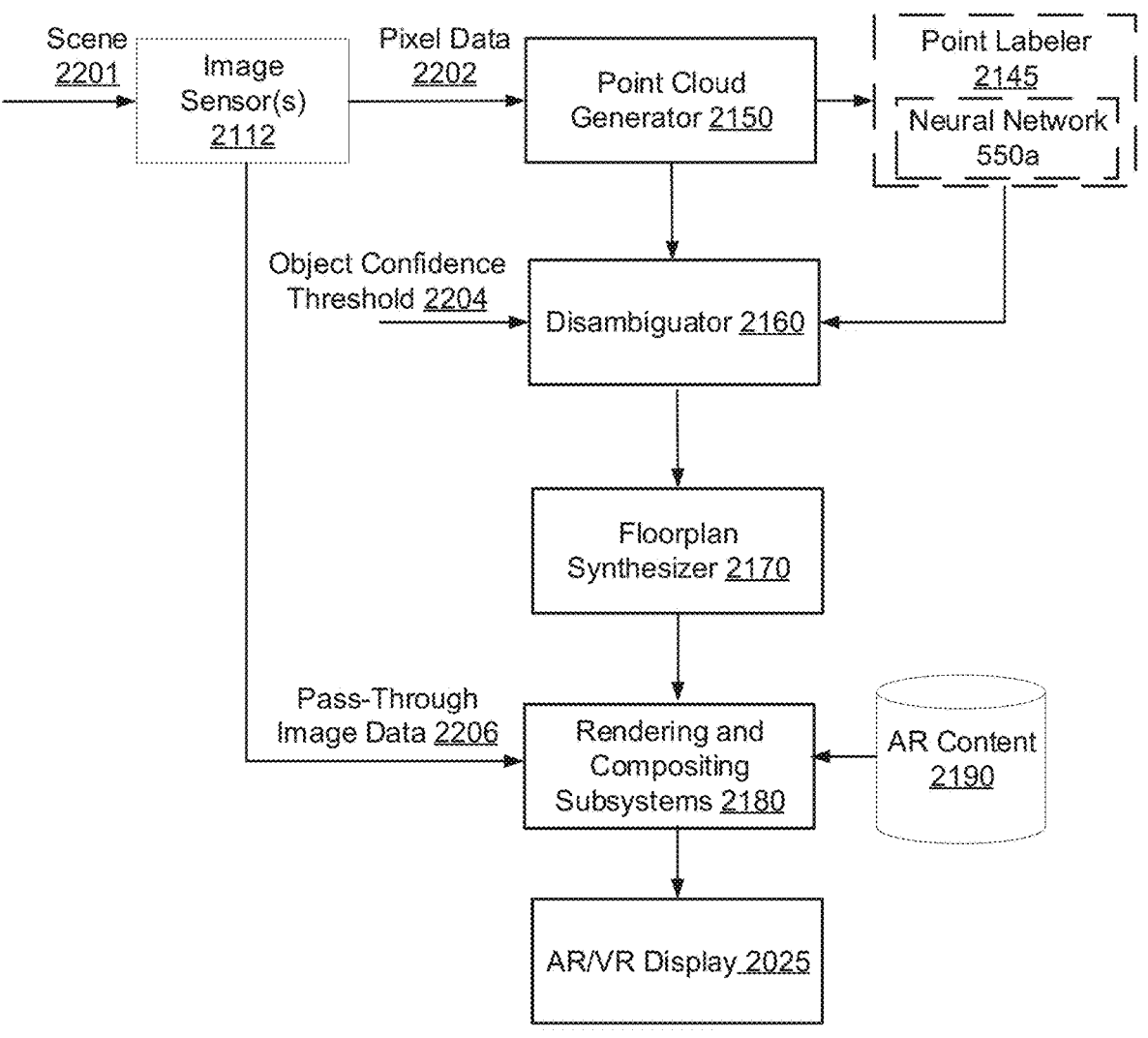
FIG. 22 is an example data flow diagram of a device according to some implementations.

FIG. 22 is an example data flow diagram 2200 of a device (e.g., the device 2020, such as a HMD, mobile device, etc.) according to some implementations. In some implementations, the image sensor 2112 obtains image information associated with a scene 2201. In some implementations, the image sensor(s) 2112 provide pixel data 2202 to the point cloud generator 2150. In some implementations, the image sensor 2112 provides pass-through image data 2206 characterized by a plurality of poses associated with respective fields of view of the image sensor 2112 to the rendering and compositing subsystems 2180. In some implementations, the pixel data 2202 includes a portion of the pass-through image data 2206. In some implementations, the pixel data 2202 is equivalent to the pass-through image data 2206.

The point cloud generator 2150 generates, from the pixel data 2202, a three-dimensional (3D) point cloud for the space (e.g., scene 2201). Each of the plurality of poses of the space is associated with a respective field of view of the image sensor 2112.

The disambiguator 2160 disambiguates a group of points from the 3D point cloud based on characterization vectors (e.g., pixel characterization vectors 410a-410M in FIG. 4). In some implementations, the disambiguator 2160 obtains the 3D point cloud from the point cloud generator 2150. In some implementations, the disambiguator 2160 obtains characterization vectors obtained from a point labeler 2145. Based on the characterization vectors, the disambiguator 2160 disambiguates a group of points associated with characterization vectors that points satisfy an object confidence threshold 2204. In some implementations, the disambiguator 2160 disambiguates a plurality of groups of points, each group corresponding to a different object in the scene 2201.

In some implementations, the object confidence threshold 2204 is satisfied when a sufficient number of characterization vectors include substantially similar label information. In some implementations, the object confidence threshold 2204 is satisfied when a sufficient number of pixel characterization vectors include substantially similar label information and correspond to pixels that are sufficiently close to each other. For example, the disambiguator 2160 disambiguates two points because the corresponding two characterization vectors include primary labels corresponding to a table and sub-labels corresponding to glass.

In some implementations, the floorplan synthesizer 2170 obtains the group of points from the disambiguator 2160. The floorplan synthesizer 2170 generates a volumetric region for the group of points, wherein the volumetric region corresponds to a 3D representation of an object in the space. The floorplan synthesizer 2170 further synthesizes a two-dimensional (2D) floorplan of the space corresponding to a virtualized top-down pose of the image sensor 2112 associated with the volumetric region.

In some implementations, rendering and composting subsystem 2180 composite rendered AR content corresponding to the 2D floorplan with pass-through image data 2206. In some implementations, the rendered AR content corresponds to a top down representation of the volumetric region. For example, in FIG. 20H, the rendered AR content 2033 corresponds to a representation (e.g., outline) of the table 2003. In some implementations, the rendered AR content corresponds to content within a representation of an object(s).

In some implementations, the AR/VR display 2025 displays the 2D floorplan. In some implementations, the AR/VR display 2025 displays a portion of the 2D floorplan, sometimes referred to as a mini-map. In some implementations, the AR/VR display 2025 displays AR content providing measurement information about objects and/or features thereof within the scene 2021 overlaid on the pass-through image data.

Figure 23:
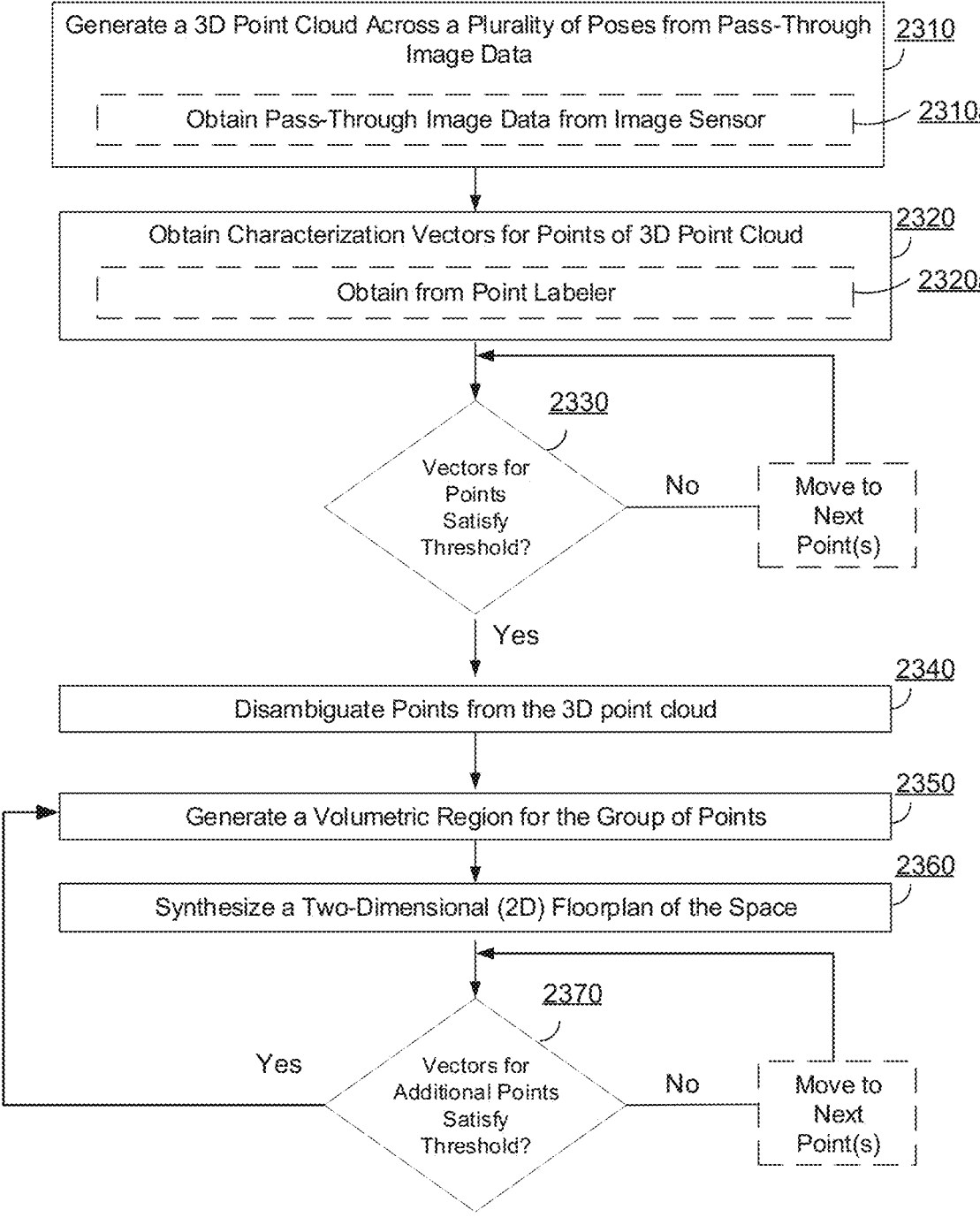
FIG. 23 is flow diagram of a method of extracting a two-dimensional (2D) floorplan according to some implementations.

FIG. 23 is flow diagram of a method 2300 of extracting a two-dimensional (2D) floorplan (e.g., floorplan 2000h) according to some implementations. In various implementations, the method 2300 is performed by a device (e.g., the device 2020). For example, in some implementations, the method 2300 is performed at a mobile device (e.g., tablet, mobile phone, laptop), HMD (e.g., AR/VR headset), etc. Briefly, the method 2300 includes synthesizing a 2D floorplan corresponding to a top-down view of a space (e.g., a scene 2001). The device synthesizes the 2D floorplan based on a volumetric region for a group of points of a 3D point cloud that correspond to one or more objects in the space. The device generates the volumetric regions based on points disambiguated from the 3D point cloud As represented by block 2310, the method 2300 includes generating, from pass-through image data characterized by a plurality of poses of a space, a three-dimensional (3D) point cloud for the space. Each of the plurality of poses of the space is associated with a respective field of view of an image sensor. In some implementations, the pass-through image data corresponds to a first image frame. In some implementations, the pass-through image data corresponds to optical information. In some implementations, the 3D point cloud is generated using visual inertial odometry (VIO). As represented by block 2310*a*, in various implementations, the method 2300 includes obtaining, from the image sensor, the pass-through image data.

In various implementations, the image sensor is separate from the device, and thus the image sensor is separate from an AR/VR display of the device (e.g., AR/VR display 2025). For example, in some implementations, the image sensor resides at an unmanned aerial vehicle (UAV), sometimes referred to as a drone. Continuing with this example, the image sensor wirelessly provides pass-through image data to the device, and the device displays, on the AR/VR display (e.g., goggles or a headset worn by the user), the pass-through image data. In this example, the user of the device effectively perceives what the remote image sensor is sensing.

As represented by block 2320, the method 2300 includes obtaining characterization vectors (e.g., pixel characterization vectors 410*a*-410M in FIG. 4) for points of the 3D point cloud. Each of the characterization vectors includes one or more labels. In some implementations, the device obtains the characterization vectors for all pints (e.g., pixels) in the pass-through image data. In some implementations, the device obtains characterization vectors for a subset of points in the pass-through image data and filters out the other points. For example, in some implementations, the device obtains characterization vectors for points within a certain distance (e.g., radius) from a predetermined point (e.g., a point corresponding to a corner of a table). As another example, in some implementations, the device obtains characterization vectors for points within a certain distance (e.g., radius) of a point corresponding to an identified object or a feature thereof.

As represented by block 2320*a*, in some implementations, the characterization vectors are obtained from a point labeler (e.g., point labeler 2145 in FIG. 21). In various implementations, the point labeler corresponds to a machine learning system, such as a deep learning neural network system. In some implementations, the point labeler corresponds to a machine learning segmentation system. In some implementations, the point labeler selects an object model among a plurality of object models and compares the object model to a pixel (e.g., in order to generate the characterization vectors for the pixel. In some implementations, object models corresponding to sufficiently relevant objects are used for selection. For example, in response to determining that the scene corresponds to a kitchen, object models corresponding to objects commonly found in a kitchen, such as a refrigerator, cabinets, stoves, etc. are utilized. On the other hand, irrelevant object models, such as those corresponding to rocks and trees, are not utilized. In some implementations, the point labeler utilizes object models according to user input. For example, the device receives a user input specifying walls, so the point labeler focuses on wall models.

As represented by block 2330, in some implementations, the method 2300 includes determining whether the characterization vectors for a group of points satisfy an object confidence threshold. As represented by block 2340, the method includes disambiguating the group of points from the 3D point cloud. The characterization vectors for the group of points satisfy an object confidence threshold. In some implementations, the object confidence threshold is satisfied if labels included in the characterization vectors for respective points are sufficiently similar to each other. For example, the primary label for the characterization vectors indicate a window. In some embodiments, multiple clusters of points for multiple candidate objects are identified. In some implementations, the object confidence threshold is satisfied when the 3D point cloud includes a sufficient number of points whose characterization vectors indicate the same object and/or feature thereof. In some implementations, the object confidence threshold is satisfied when the 3D point cloud includes a sufficient number of points whose characterization vectors indicate the same object and/or feature thereof and the points are sufficiently close to each other.

As represented by block 2350, the method 2300 includes generating a volumetric region for the group of points. The volumetric region corresponds to a 3D representation of an object in the space. For example, with reference to FIG. 20G, the device generates the third volumetric region 2024 for the third subgroup of points 2014 corresponding to the second chair 2004.

As represented by block 2360, the method 2300 includes synthesizing a two-dimensional (2D) floorplan of the space corresponding to a virtualized top-down pose of the image sensor associated with the volumetric region. In some implementations, the 2D floorplan includes room boundaries (e.g., a closed space). In some implementations, the 2D floorplan includes one or more objects within the space. For example, with reference to FIG. 20H, the floorplan 2000*h* includes the top-down representations 2032-2034 of the first chair 2002, table 2003, and second chair 2004, respectively.

In some implementations, the method 2300 continues to block 2370. As represented by block 2370, in some implementations, the method 2300 includes determining whether the characterization vectors for an additional (e.g., second) group of points satisfy an object confidence threshold.

In some implementations, in response to determining that the characterization vectors for the additional group of points satisfy the object confidence threshold, the method 2300 continues back to block 2350. Accordingly, in some implementations, the method 2300 includes generating a second volumetric region for the additional group of points. The second volumetric region corresponds to a 3D representation of a second object in the space. In some implementations, the method 2300 continues to block 2360, wherein the device resynthesizes the 2D floorplan of the space corresponding to a virtualized top-down pose of the image sensor associated with the volumetric region and the second volumetric region.

FIG. 24 is flow diagram of a method 2400 of displaying AR content associated with a 2D floorplan (e.g., floorplan 2000*h*) according to some implementations. In various implementations, the method 2400 is performed by a device (e.g., the device 2020). For example, in some implementations, the method 2400 is performed at a mobile device (e.g., tablet, mobile phone, laptop), HMD (e.g., AR/VR headset), etc. Briefly, the method 2400 includes displaying AR content, including the extracted 2D floorplan.

As represented by block 2410, the method 2400 includes generating, from pass-through image data characterized by a plurality of poses of a space, a three-dimensional (3D) point cloud for the space. Each of the plurality of poses of the space is associated with a respective field of view of an image sensor. As represented by block 2420, the method 2400 includes obtaining characterization vectors (e.g., pixel characterization vectors 410*a*-410M in FIG. 4) for points of the 3D point cloud. Each of the characterization vectors includes one or more labels. As represented by block 2430, the method 2400 includes disambiguating the group of points from the 3D point cloud. The characterization vectors for the group of points satisfy an object confidence threshold.

As represented by block 2440, in some implementations, the method 2400 includes computing a measurement associated with the object based on the group of points. For example, with reference to FIG. 20I, the device computes the dimensions of the table 2003 to be 3 feet×1 foot. In various implementations, the measurement provides information about relative positions of objects and/or features thereof. For example, in some implementations, the measurement provides information about the midpoint between two ends of a wall.

As represented by block 2450, the method 2400 includes generating a volumetric region for the group of points. The volumetric region corresponds to a 3D representation of an object in the space. As represented by block 2460, the method 2400 includes synthesizing a two-dimensional (2D) floorplan of the space corresponding to a virtualized top-down pose of the image sensor associated with the volumetric region.

As represented by block 2470, in some implementations, the method 2400 includes displaying, on the display, the 2D floorplan of the space. In some implementations, the displayed 2D floorplan corresponds to a top-down (e.g., bird's eye) view of the scene, such as the floorplan 2000h illustrated in FIG. 20H.

As represented by block 2480, in some implementations, the method 2400 includes displaying, on the display, AR content overlaid on the 2D floorplan of the space. In some implementations, the AR content provides information about objects in a scene and/or features thereof. For example, with reference to FIG. 20I, the floorplan 2000i includes AR content providing the dimensions 2090b of the table 2003, characteristics 2090c of the first chair 2002, and shading 2090a in order to indicate the outline (e.g., perimeter) of the second chair 2004.

In some implementations, the AR content includes an indicator indicating scanned portions of the scene in order to encourage other, cooperating application(s) to scan more of the scene. In various embodiments, scanning corresponds to the image sensors sensing light reflecting off of objects in the scene. Based on the sensed light, the image sensors provide pass-through image data to the reminder of the device. For example, a wall is shaded as the one or more image sensors scan the wall with the device. In some implementations, the AR content is displayed according to one or more display criteria, including a certain amount of time scanned (e.g., display AR content after 2 seconds of scanning), a certain amount of an object scanned (e.g., scanned at least 25% of a wall), user input, etc. For example, in some implementations, the device receives a user input specifying to display AR content for certain objects and/or features thereof. As another example, in some implementations, the device receives a user input specifying to forego displaying AR content associated with other objects/features.

As represented by block 2480a, in some implementations, the method 2400 includes displaying a measurement indicator overlaid on the 2D floorplan of the space and proximate to the object. The measurement indicator indicates the measurement associated with the object. In some implementations, the measurement indicator indicates at least one of the following: dimensions of object(s), area of object(s), dimensions of scene, area of scene, distance between one or more objects and/or features thereof, distance of a feature (e.g., length of an edge of a table), important parts of an object (e.g., midpoint between two ends of a wall), and/or a user-specified overlay (e.g., 20 inch×20 inch square overlaid based on a user input).

As represented by block 2480b, in some implementations, the method 2400 includes displaying a miniature version of the 2D floorplan, sometimes referred to as a mini-map. In some implementations, displaying the mini-map corresponds to displaying a portion of the 2D floorplan corresponding to a virtualized top-down pose of the image sensor associated with a portion of the volumetric region. The portion of the volumetric region of the volumetric portion satisfies one or more display criteria. In various implementations, the displayed portion of the 2D floorplan is characterized by a subset of the group of points of the 3D point cloud that satisfy the one or more display criteria. For example, in some implementations, the portion includes 3D points corresponding to at least a threshold number of objects. As represented by block 2480c, in some implementations, the displayed portion of the 2D floorplan corresponds to an area of the 2D floorplan within a threshold distance from the image sensor. In some implementations, the threshold distance corresponds to a radial distance from the image sensor. For example, with reference to FIG. 20H, the displayed portion of the floorplan 2000h include the area of the floorplan 2000h within the circle 2060. The circle 2060 corresponds to a particular radial distance from the image sensor 2050. In some implementations, the threshold distance is a straight line distance from the image sensor.

In some implementations, the displayed portion of the 2D floorplan corresponds to a vertical and/or horizontal portion of the 2D floorplan. For example, with reference to FIG. 20H, the device displays a portion of the floorplan 2000h to the left of the marker 2040.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an electronic device with one or more processors, a non-transitory memory, and a display:

generating, from pass-through image data characterized by a plurality of poses of a space, a three-dimensional (3D) point cloud for the space, wherein each of the plurality of poses of the space is associated with a respective field of view of an image sensor;

obtaining characterization vectors for points of the 3D point cloud, wherein each of the characterization vectors includes one or more labels;

disambiguating a first group of points from the 3D point cloud corresponding to a first object in the space, wherein characterization vectors for the first group of points satisfy an object confidence threshold based on the labels included in the characterization vectors for the first group of points;

generating a first volumetric region for the first group of points, wherein the first volumetric region corresponds to a 3D representation of the first object; and synthesizing a two-dimensional (2D) floorplan of the space including a 2D boundary of the space and a 2D representation of the first object within the 2D boundary of the space corresponding to a top-down view of the first volumetric region.

2. The method of claim 1, further comprising displaying, on the display, at least a portion of the 2D floorplan of the space.

3. The method of claim 2, further comprising displaying, on the display AR content overlaid on the portion of the 2D floorplan of the space.

4. The method of claim 3, wherein displaying the AR content includes:

computing a measurement associated with the first object based on the first group of points; and displaying a measurement indicator overlaid on the portion of the 2D floorplan of the space and proximate to the 2D representation of the first object, wherein the measurement indicator indicates the measurement associated with the object.

5. The method of claim 1, further comprising:

disambiguating a second group of points from the 3D point cloud corresponding to a second object in the space, wherein characterization vectors for the second group of points satisfy the object confidence threshold based on the labels included in the characterization vectors for the second group of points;

generating a second volumetric region for the second group of points, wherein the second volumetric region corresponds to a 3D representation of the second object; and resynthesizing the 2D floorplan of the space to further include a 2D representation of the second object within the 2D boundary of the space corresponding to a top-down view of the second volumetric region.

6. The method of claim 2, wherein the portion of the 2D floorplan satisfies one or more display criteria.

7. The method of claim 6, wherein the portion of the 2D floorplan is within a threshold distance from the image sensor.

8. The method of claim 1, wherein the characterization vectors are obtained from a point characterizer.

9. The method of claim 1, further comprising obtaining, from the image sensor, the pass-through image data.

10. The method of claim 1, wherein the electronic device corresponds to a mobile device.

11. The method of claim 1, wherein the display corresponds to a head-mounted display (HMD).

12. The method of claim 1, wherein the display is separate from the image sensor.

13. An electronic device, comprising:

a display;

one or more processors;

a non-transitory memory; and one or more programs stored in the non-transitory memory and configured to be executed by the one or more processors, the one or more programs including instructions, which, when executed by the electronic device, cause the electronic device to perform operations comprising:

generating, from pass-through image data characterized by a plurality of poses of a space, a three-dimensional (3D) point cloud for the space, wherein each of the plurality of poses of the space is associated with a respective field of view of an image sensor;

obtaining characterization vectors for points of the 3D point cloud, wherein each of the characterization vectors includes one or more labels;

disambiguating a first group of points from the 3D point cloud corresponding to a first object in the space, wherein characterization vectors for the first group of points satisfy an object confidence threshold based on the labels included in the characterization vectors for the first group of points;

generating a first volumetric region for the first group of points, wherein the first volumetric region corresponds to a 3D representation of the first object; and synthesizing a two-dimensional (2D) floorplan of the space including a 2D boundary of the space and a 2D representation of the first object within the 2D boundary of the space corresponding to a top-down view of the first volumetric region.

14. The electronic device of claim 13, wherein the operations further comprise displaying, on the display, at least a portion of the 2D floorplan of the space.

15. The electronic device of claim 14, wherein the operations further comprise displaying, on the display, AR content overlaid on the portion of the 2D floorplan of the space.

16. The electronic device of claim 15, wherein displaying the AR content includes:

computing a measurement associated with the first object based on the first group of points; and displaying a measurement indicator overlaid on the portion of the 2D floorplan of the space and proximate to the 2D representation of the first object, wherein the measurement indicator indicates the measurement associated with the object.

17. A non-transitory computer readable storage medium storing one or more programs, the one or more programs comprising instructions, which, when executed by an electronic device with a display, cause the electronic device to:

generate, from pass-through image data characterized by a plurality of poses of a space, a three-dimensional (3D) point cloud for the space, wherein each of the plurality of poses of the space is associated with a respective field of view of an image sensor;

obtain characterization vectors for points of the 3D point cloud, wherein each of the characterization vectors includes one or more labels;

disambiguate a first group of points from the 3D point cloud corresponding to a first object in the space, wherein characterization vectors for the first group of points satisfy an object confidence threshold based on the labels included in the characterization vectors for the first group of points;

generate a first volumetric region for the first group of points, wherein the first volumetric region corresponds to a 3D representation of the first object; and synthesize a two-dimensional (2D) floorplan of the space including a 2D boundary of the space and a 2D representation of the first object within the 2D boundary of the space corresponding to a top-down view of the first volumetric region.

18. The non-transitory computer readable storage medium of claim 17, wherein the instructions further cause the electronic device to:

disambiguate a second group of points from the 3D point cloud corresponding to a second object in the space, wherein characterization vectors for the second group of points satisfy the object confidence threshold based on the labels included in the characterization vectors for the second group of points;

generate a second volumetric region for the second group of points, wherein the second volumetric region corresponds to a 3D representation of the second object; and resynthesize the 2D floorplan of the space to further include a 2D representation of the second object within the 2D boundary of the space corresponding to a top-down view of the second volumetric region.

19. The non-transitory computer readable storage medium of claim 17, wherein the instructions further cause the electronic device to display at least a portion of the 2D floorplan, wherein the portion of the 2D floorplan satisfies one or more display criteria.

20. The non-transitory computer readable storage medium of claim 19, wherein the portion of the 2D floorplan is within a threshold distance from the image sensor.

* * * * *